(12) United States Patent
Tonyan et al.

(10) Patent No.: US 7,870,698 B2
(45) Date of Patent: *Jan. 18, 2011

(54) NON-COMBUSTIBLE REINFORCED CEMENTITIOUS LIGHTWEIGHT PANELS AND METAL FRAME SYSTEM FOR BUILDING FOUNDATIONS

(75) Inventors: Timothy D. Tonyan, Wheaton, IL (US); James M. Ullett, McHenry, IL (US); James E. Reicherts, Cary, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/763,548

(22) Filed: Jun. 15, 2007

(65) Prior Publication Data

US 2007/0294974 A1 Dec. 27, 2007

Related U.S. Application Data

(60) Provisional application No. 60/816,641, filed on Jun. 27, 2006.

(51) Int. Cl.
*E04B 2/30* (2006.01)

(52) U.S. Cl. ............... 52/483.1; 52/309.13; 52/653.1; 428/192; 106/735

(58) Field of Classification Search ............... 52/653.1, 52/232, 309.12, 309.13, 343, 344, 293, 309, 52/414, 474, 483.1, 633; 428/60, 70, 192, 428/325; 106/735; 260/29.6
See application file for complete search history.

(56) References Cited

U.S. PATENT DOCUMENTS

| 1,684,624 | A | * | 9/1928 | Hayden | .................. 428/70 |
| 2,230,823 | A | | 2/1941 | Clements | |
| 2,276,237 | A | | 3/1942 | Lowrey | |
| 2,410,922 | A | | 11/1946 | Balduf | |
| 2,541,784 | A | | 2/1951 | Shannon | |
| 2,590,687 | A | | 3/1952 | Crafton | |

(Continued)

FOREIGN PATENT DOCUMENTS

CL 33183 9/1982

(Continued)

OTHER PUBLICATIONS

Grabberman.com (http://web.archive.org/web/20040111002211/www.grabberman.com/metalscrews.htm, dated Oct. 23, 2003). See p. 3.*

(Continued)

*Primary Examiner*—Richard E Chilcot, Jr.
*Assistant Examiner*—William V Gilbert
(74) *Attorney, Agent, or Firm*—Novak Druce + Quigg LLP; David F. Janci

(57) ABSTRACT

A foundation system includes metal framing members that support a reinforced, lightweight, dimensionally stable cementitious panel. The foundation system is non-combustible, water durable, mold and rot resistant, and termite resistant. The panels employ one or more layers of a continuous phase resulting from the curing of an aqueous mixture of inorganic binder, for example, calcium sulfate alpha hemihydrate, hydraulic cement, an active pozzolan and lime. The continuous phase is reinforced with glass fibers and contains lightweight filler particles, for example, ceramic microspheres.

32 Claims, 24 Drawing Sheets

U.S. PATENT DOCUMENTS

| | | | |
|---|---|---|---|
| 2,856,766 A | | 10/1958 | Huntley |
| 2,883,852 A | * | 4/1959 | Midby ..................... 52/236.8 |
| 3,216,163 A | | 11/1965 | Carew |
| 3,397,497 A | | 8/1968 | Shea |
| 3,780,482 A | | 12/1973 | De Lange |
| 3,797,179 A | | 3/1974 | Jackson |
| 3,826,051 A | * | 7/1974 | Miller et al. ............... 52/223.7 |
| 3,956,861 A | * | 5/1976 | Rasmussen ............... 52/288.1 |
| 3,974,607 A | | 8/1976 | Balinski |
| 4,016,697 A | | 4/1977 | Ericson |
| 4,052,829 A | | 10/1977 | Chapman |
| 4,142,340 A | * | 3/1979 | Howard ....................... 52/262 |
| 4,239,396 A | | 12/1980 | Arribau et al. |
| 4,241,555 A | | 12/1980 | Dickens et al. |
| 4,276,730 A | | 7/1981 | Lewis |
| 4,379,729 A | | 4/1983 | Cross |
| 4,435,940 A | | 3/1984 | Davenport |
| 4,601,151 A | | 7/1986 | Nunley et al. |
| 4,647,496 A | | 3/1987 | Lehnert et al. |
| 4,707,961 A | | 11/1987 | Nunley et al. |
| 4,736,561 A | | 4/1988 | Lehr et al. |
| 4,783,942 A | | 11/1988 | Nunley et al. |
| 4,852,316 A | | 8/1989 | Webb |
| 4,982,545 A | | 1/1991 | Stromback |
| 4,986,051 A | | 1/1991 | Meyer et al. |
| 5,100,258 A | | 3/1992 | VanWagoner |
| 5,353,560 A | | 10/1994 | Heydon |
| 5,463,873 A | | 11/1995 | Early et al. |
| 5,507,427 A | | 4/1996 | Burgett |
| 5,584,153 A | | 12/1996 | Nunley et al. |
| 5,596,860 A | | 1/1997 | Hacker |
| 5,609,416 A | | 3/1997 | Duckworth |
| 5,657,597 A | | 8/1997 | Loftus |
| 5,687,538 A | | 11/1997 | Frobosilo et al. |
| 5,743,056 A | | 4/1998 | Balla-Goddard et al. |
| 5,768,841 A | | 6/1998 | Swartz et al. |
| 5,842,314 A | | 12/1998 | Porter |
| 5,913,788 A | | 6/1999 | Herren |
| 6,000,194 A | | 12/1999 | Nakamura |
| 6,073,410 A | | 6/2000 | Schimpf et al. |
| 6,151,855 A | | 11/2000 | Campbell |
| 6,187,409 B1 | | 2/2001 | Mathieu |
| 6,192,639 B1 | | 2/2001 | Germain |
| 6,226,946 B1 | | 5/2001 | Stough et al. |
| 6,241,815 B1 | | 6/2001 | Bonen |
| 6,260,322 B1 | | 7/2001 | Lindsay |
| 6,260,329 B1 | | 7/2001 | Mills |
| 6,301,854 B1 | | 10/2001 | Daudet et al. |
| 6,412,247 B1 | | 7/2002 | Menchetti |
| 6,418,694 B1 | | 7/2002 | Daudet et al. |
| 6,421,968 B2 | | 7/2002 | Degelsegger |
| 6,488,792 B2 | | 12/2002 | Mathieu |
| 6,510,667 B1 | | 1/2003 | Cottier et al. |
| 6,536,168 B1 | | 3/2003 | Cugini et al. |
| 6,620,487 B1 | * | 9/2003 | Tonyan et al. ............... 428/192 |
| 6,691,478 B2 | | 2/2004 | Daudet et al. |
| 6,694,695 B2 | | 2/2004 | Collins |
| 6,761,001 B2 | | 7/2004 | Mueller |
| 6,761,005 B1 | | 7/2004 | Daudet et al. |
| 6,799,407 B2 | | 10/2004 | Saldana |
| 2002/0088199 A1 | * | 7/2002 | Linn ....................... 52/745.19 |
| 2003/0084637 A1 | | 5/2003 | Daudet et al. |
| 2003/0200721 A1 | * | 10/2003 | Gleeson et al. ............. 52/746.1 |
| 2004/0050006 A1 | * | 3/2004 | Park et al. ....................... 52/514 |
| 2004/0074178 A1 | | 4/2004 | Daudet et al. |
| 2005/0064055 A1 | | 3/2005 | Porter |
| 2005/0086905 A1 | | 4/2005 | Ralph et al. |

FOREIGN PATENT DOCUMENTS

| | | |
|---|---|---|
| CL | 44335 | 11/1999 |
| CN | 1425836 A | 6/2003 |
| GB | 2334045 | 8/1999 |
| JP | 59000430 | 1/1984 |
| JP | 7259243 | 10/1995 |
| JP | 2001107488 | 4/2001 |
| JP | 2001262773 | 9/2001 |
| JP | 2002 180580 | 6/2002 |
| WO | 9708111 | 3/1997 |

OTHER PUBLICATIONS

ConcreteNetwork.com, Sheet Membranes, [online], [retrieved on May 15, 2007]. Retrieved from the Internet: < URL:http://www.concretenetwork.com/concrete/waterproofing_concrete_foundations/sheet_membranes.htm >.

ConcreteNetwork.com, Liquid Membranes, [online], [retrieved on May 15, 2007]. Retrieved from the Internet: < URL: http://www.concretenetwork.com/concrete/waterproofing_concrete_foundations/liquid_membranes.htm >.

TREMCO Global Sealants Division, [online], May 23, 2007 [retrieved on May 23, 2007]. Retrieved from the Internet: < http://www.tremcosealants.com/pressroom/kits.asp?id=4 >.

Applied Technologies, "Why Use a Polymer-modified Foundation Waterproofing Membrane?", [online], May 15, 2007 [retrieved on May 15, 2007]. Retrieved from the Internet: < http://www.appliedtechnologies.com/pages_blocks_ v3_ exp/index.cgi?Key=570&Field=ke . . . >.

Hydra-Guard Waterproofing System, published on or before May 19, 2007.

Hydra-Guard Waterproofing Membrane, published on or before May 19, 2007.

Protective Coatings, Poly Wall Crack Guard Systems, Dec. 9, 2005.

TREMCO Global Sealants Division, Fight Basement Moisture three ways, published on or before May 19, 2007.

"Differences in Drywall", Construction Dimensions pp. 27-29 (Sep. 1983).

Submittal Sheet 09210, Imperial Brand Gypsum Base (Firecode and Firecode C Core), USG (1999).

Proprietary Gypsum Panel Products For Use in UL Classified Systems, Gypsum Association, GA-605 (Rev. Aug. 1, 2008).

Greenwall et al., Moisture Movement (Wicking) within Gypsum Wallboard, AWMA Control# 05-A-580-AWMA Abstract Submitted Sep. 17, 2004; URL:<oaspub.epa.gov/eims/eimscomm.getfile?p_download_id =446305>, retrieved from the internet Apr. 11, 2010.

Russian Office Action of Dec. 25, 2009, for RU 2007132186/03 (corresponding to U.S. Appl. No. 11/321,069) with concise statement of relevance.

USG, "Fire Resistance", pp. 1-5, [online], [retrieved on Jan. 14, 2005]. Retrieved from the Internet <URL: http:// www.usg.com/Design_Solutions/2_2_10_fire_endure.asp>.

USG, "Fire Wall Stands Up to Ultimate Test", 1995, pp. 1-3, [online], [retrieved on Jan. 14, 2005]. Retrieved from the Internet <URL: http://www.usg.com/Design_Solutions/2_2_4_ultimatetestasp>.

USG, "Specifying the Most Important Walls in Your Building", 1991, pp. 1-8, [online], [retrieved on Jan. 14, 2005]. Retrieved from the Internet <URL: http://www.usg_com/Design_Solutions/2_2_7_importantwall.asp>.

USG, "How to Select the Best Residential Fire Separation Walls", 1990, pp. 1-6, [online], [retrieved on Jan. 14, 2005 ]. Retrieved from the Internet <URL: http://www.usg.com/Design_Solutions/2_2_8_separation wall.asp>.

ICC Evaluation Service, Inc., Legacy Report ER-5762, entitled Legacy report on the 1997 Uniform Building Code TM, the 2000 International Building Code, and the 2000 International Residential Code, pp. 1-2 Reissued Jul. 1, 2003.

Saruh Mazure editor/publisher, Walls & Ceilings, Higher Value, Posted on Sep. 27, 2001 on http://www.wconline.com/ CDA/ArticleInformation/features/BNP by BNP Media, pp. 1-4, copyright 2004, BNP Media.

How Do I Design the Best Shear Wall, http://www.sureboard.com pp. 1-2 printed on Sep. 16, 2005, last modified Nov. 6, 2004 at 6:52 PM.

Saruh Mazure editor/publisher, Walls & Ceilings, Higher Value, Posted on Sep. 27, 2001 on http://www.wconline.com/ CDA/ArticleInformation/features/BNP by BNP Media, pp. 1-5, copyright 2005, BNP Media.

Gypsum Association, "Fire Resistance Design Manual", Apr. 2003, 17th Edition GA-600-2003, pp. 1-19 and 71-84, Washington D.C., United States.

Brick Industry Association, Technical Notes 21 "Brick Masonry Cavity Walls", Technical Notes on Brick Construction, Aug. 1998, pp. 1-16, [online], [retrieved on Nov. 1, 2005]. Retrieved from the Internet <URL: http:// www.bia.org/BIA/technotes/t21.htm>.

Brick Industry Association, Technical Notes 16B "Calculated Fire Resistance", Technical Notes on Brick Construction, [Jun. 1991] (Reissued Aug. 1991), pp. 1-13, [online], [retrieved on Nov. 1, 2005]. Retrieved from the Internet <URL: http://www.bia.org/BIA/technotes/t16.htm>.

Brick Industry Association, Technical Notes 16 "Fire Resistance", Technical Notes on Brick Construction, Apr. 2002, pp. 1-12, [online], [retrieved on Jan. 1, 2005]. Retrieved from the Internet <URL: http://www..bia.org/BIA/ technotes/t16.htm>.

Gyptek, "Glass Microspheres", pp. 1-3, [online], [retrieved on Dec. 14, 2004]. Retrieved from the Internet <URL: http://www.gyptek.com/new_page_5.htm>.

Wood Floors OnLine.com, "Wood Floor Installation and Finishing Procedures", pp. 1-3, [online], [retrieved on Dec. 12, 2004]. Retrieved from the Internet <URL: http://www.woodfloorsonline.com/techtalk/installfin.html>.

NOFMA The Wood Flooring Manufacturers Association, EST. 1909, "Laying and Fastening the Flooring", pp. 1-3, [online], [retrieved on Dec. 15, 2004]. Retrieved from the Internet <URL: http://www.nofma.org/installation2.htm>.

CEM-Steel, pp. 1-2, [online], [retrieved on Dec. 12, 2004]. Retrieved from the Internet <URL: http://www. architecturalproducts.com/cemsteel.htm>.

USG, "Fiberock Brand Underlayment—Aqua— Tough", pp. 1-2, [online], [retrieved on Dec. 15, 2004]. Retrieved from the Internet.

Underwriters Laboratories Inc. (UL), "Fire Tests of Building Construction and Materials", UL Standard for Safety, Dated Jun. 2, 1998, pp. tr1-tr4, 1-26 and A1-C2, Twelfth Edition, Northbrook, IL, United States.

Underwriters Laboratories Inc. (UL), Fire Resistance Ratings—ANSI/UL 263, Dec. 17, 2005, pp. 1-7, [online], [retrieved on Jan. 14, 2005]. Retrieved from the Internet <URL: http://database.ul.com/cgi-bin/XYV/template/ LISEXT/1FRAM E/showpage2.html?...>.

USG, "Important Fire Safety Information", pp. 1-5, [online], [retrieved on Jan. 14, 2005]. Retrieved from the Internet <URL: http://www.usg.com/Design_Solutions/2_2_13_typeXstdstestcerts.asp>.

* cited by examiner

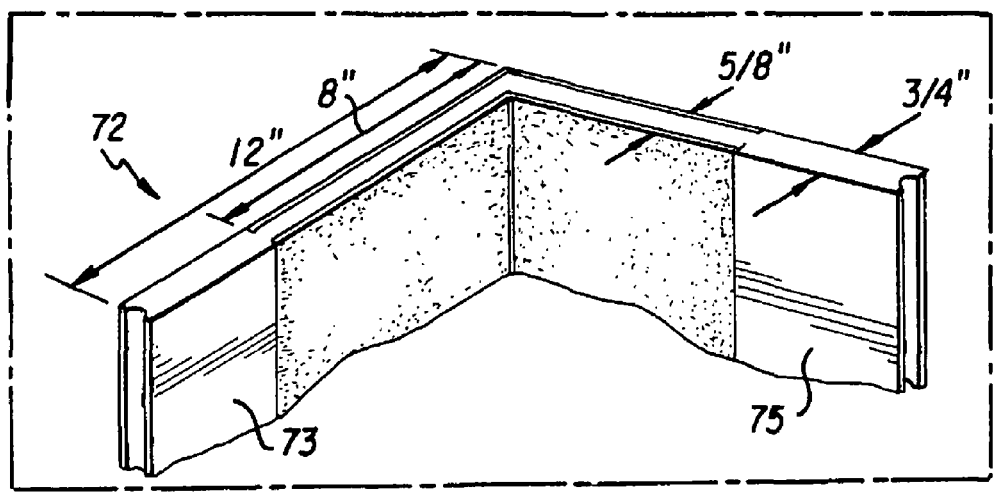
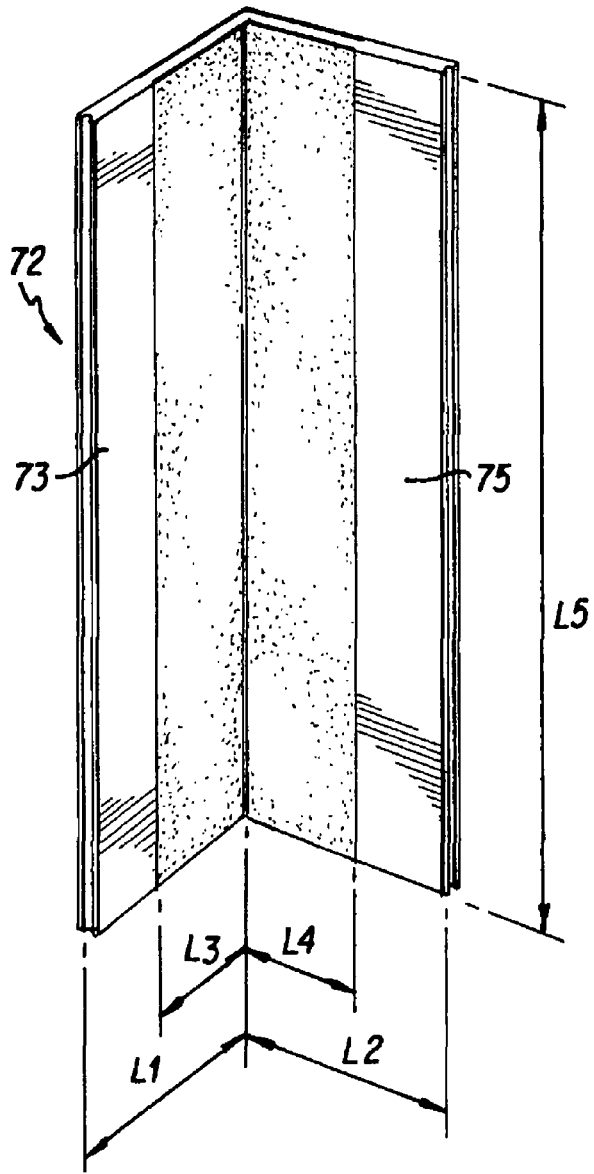
FIG. 10A

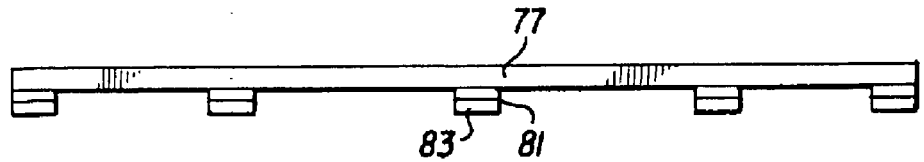
FIG. 12
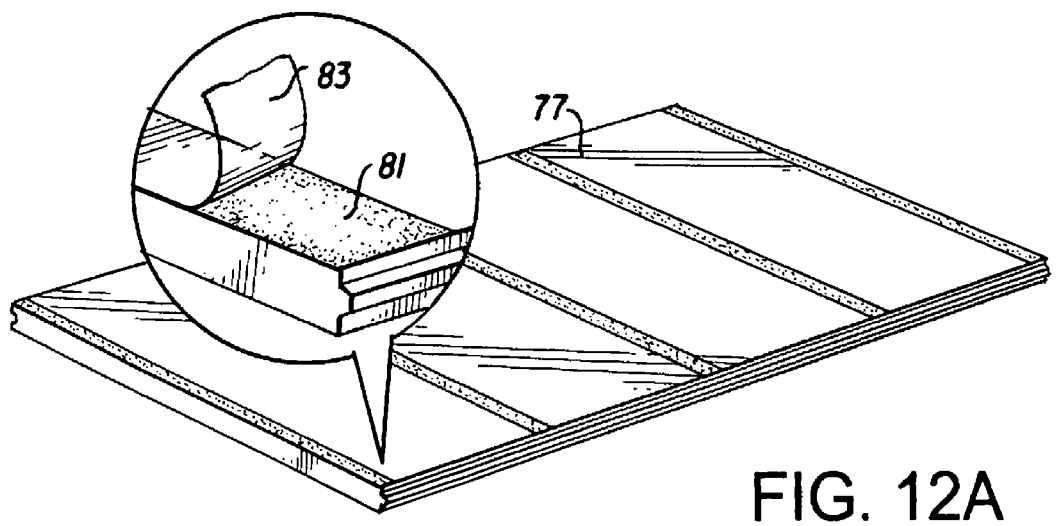
FIG. 12A
FIG. 12B
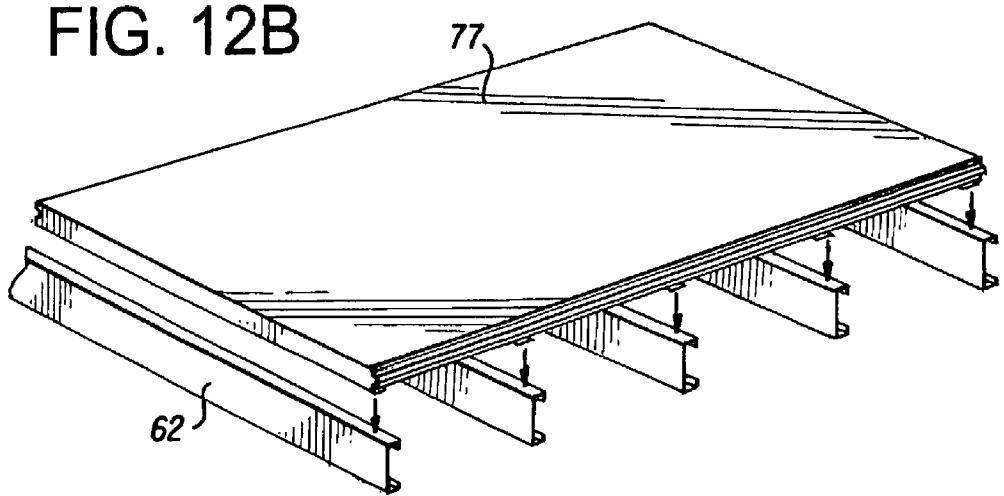

BB

DD

CC

EE

TEST AT DESIGN LOAD

FLOOR AT FAILURE

NON-COMBUSTIBLE REINFORCED CEMENTITIOUS LIGHTWEIGHT PANELS AND METAL FRAME SYSTEM FOR BUILDING FOUNDATIONS

CROSS-REFERENCE TO RELATED APPLICATION

This claims the benefit of U.S. provisional patent application No. 60/816,641, filed Jun. 27, 2006, incorporated herein by reference in its entirety.

FIELD OF THE INVENTION

This invention relates generally to a foundation system comprising metal framing and lightweight structural cementitious panels, termed here as SCP panels, in residential and commercial construction. More particularly, the invention relates to a non-combustible foundation system, having panels mechanically or adhesively fastened to steel frame systems. The panels provide a shear resistant diaphragm and gravity load carrying foundation element.

The system provides the following advantageous performance attributes when used with steel framing: non-combustibility, water durability, mold resistance, high specific strength and stiffness, economy of building design that results in speed of assembly, reduced foundation size due to reduced building weight, and increased ratios of useable building volume for a given building footprint. It is also advantageous for a foundation wall to be a cavity wall so that it permits being filled with insulation as well as permits running electrical wires, plumbing or other utilities through the cavity. The present invention also provides for a foundation inner wall with a finished appearance. It also avoids the potential shrinkage, and shrinkage cracks, which can occur with poured foundations when the water initially added to the foundation material prior to pouring, which is not used to hydrate the poured concrete, evaporates. This also avoids environmental concerns associated with cast in place poured foundations.

BACKGROUND OF THE INVENTION

Interior residential and light commercial foundation systems commonly include cast in place poured concrete slabs and poured concrete or masonry walls supported on cast in place footings.

Typical foundation floors are cast in place slabs resting on cast in place footings.

Framing in metal, both when building out commercial spaces and when erecting entire structures, is becoming more and more common. Probably the best known and most prevalent method of framing in metal involves the use of metal channeling, typically rolled from sheet steel and sometimes aluminum. These metal framing members or studs, often used to erect and reinforce commercial and residential structures, are channels having a substantially U-shaped cross section with a broad base and narrow sides of uniform height. To enhance the stud or framing member's strength and rigidity, the edges of the sides of the U-channel component are bent over to form lips parallel to the plane of the U-channel base to form a C-shaped component.

The outside dimensions of the metal framing members and studs, and the weight or gauge of the member or stud, vary. Typically the members are fabricated to be approximately 4 inches (10 cm) wide by 2 inches (5 cm) deep, corresponding thereby to the width and depth of wood framing and stud members, in which case the lips may extend ¼ to ½ inch (0.63 to 1.3 cm) from the sides of the studs. Eighteen to 20 gauge metal may be used for light gauge, residential construction and commercial wall construction. A heavier range of metal gauge is used in some residential and commercial framing and particularly in multiple story commercial construction.

There has developed a variety of methods for connecting and securing metal frames and wall studs. At the most basic level, metal studs are inserted into and secured within metal tracks by drilling and screwing, from the outside wall of the track into an adjoining metal stud. Similarly, commercially available devices for interconnecting metal framing members, as for example tie brackets, shear connectors and plate connectors, typically use screws and bolts applied from the outside of the track or stud member inwards.

Metal studs and framing members have been modified to include saw or punch slots, tabs and brackets intended to facilitate the interconnection of these studs and framing members to adjoining studs and framing members and/or to cross-bars and other non-framing members that serve to reinforce the studs and framing members. Known connectors, including bracket, plate and tie connectors, presently used to tie together and interconnect metal studs, are generally drilled and screwed on site. Drilling and screwing unsecured connectors pose a safety risk to the worker since the connectors tend to be small and light, and thus easily grabbed and spun by a hand drill.

U.S. Pat. No. 6,799,407 discloses, a system for interconnecting metal framing members, tracks and studs by way of a variety of connectors and tracks. The connectors are specially configured and designed to fit within and interlock with the framing members, tracks and studs. The connectors serve to secure one member, track or stud to another member, track or stud, by fasteners applied from within the connector outwards into the non-surface aspects of the member, track or stud. The tracks are specially configured to interconnect with other tracks or studs using fasteners applied from both the inside out, and the outside in, in three dimensions, while still leaving the surface aspects of tracks and studs free of fastener heads or other protrusions. It employs traditional U-channel shaped framing members or studs, made of sheet steel or aluminum. According to the system, the U-channel members comprise many or all framing components for commercial and residential construction as, for example, wall studs, tracks, headers, hips, floor joists, ceiling joists, roof trusses, fascia, stud blocking, etc.

U.S. Pat. No. 5,687,538 discloses a structural framing member with a C-shaped cross section comprising of a main planar surface and two planar side walls at right angles. The side walls present an inwardly turned lip formed substantially parallel to the base. The capacity of the metal framing joist sections is increased by embossing longitudinal stiffeners perpendicular to the top and bottom side walls, with a minimum depth of 0.01 inch (0.025 cm), continuous along the face of the main planar surface for the full length of the section. By bridging these longitudinal stiffeners with, but not limited to, diagonal embossed stiffeners, a series of adjoining geometric shapes between longitudinal chords has been created to increase the rigidity of the web via adjoining geometric stiffeners which will carry the load by axial deformation rather than pure shear deformation.

U.S. Pat. No. 6,620,487 to Tonyan et al., incorporated herein by reference in its entirety, discloses a reinforced, lightweight, dimensionally stable structural cement panel (SCP) capable of resisting shear loads when fastened to framing equal to or exceeding shear loads provided by plywood or oriented strand board panels. The panels employ a core of a continuous phase resulting from the curing of an aqueous mixture of calcium sulfate alpha hemihydrate, hydraulic cement, an active pozzolan and lime, the continuous phase being reinforced with alkali-resistant glass fibers and containing ceramic microspheres, or a blend of ceramic and polymer microspheres, or, if desired, additional water may be used instead of polymer microspheres to adjust density and nailability (for example by forming the continuous phase from an aqueous mixture having a weight ratio of water-to-reactive powder of $0.6/1$ to $0.7/1$), or a combination thereof. At least one outer surface of the panels may include a cured continuous phase reinforced with glass fibers and containing sufficient polymer spheres to improve nailability or made with a water-to-reactive powders ratio to provide an effect similar to polymer spheres, or a combination thereof.

U.S. Pat. No. 6,241,815 to Bonen, incorporated herein by reference in its entirety, also discloses formulations useful for SCP panels.

US patent application publication number 2005/0064164 to Dubey et al (U.S. patent application Ser. No. 10/666,294), incorporated herein by reference, discloses a multi-layer process for producing structural cementitious panels (SCP's or SCP panels), and SCP's produced by such a process. After one of an initial deposition of loosely distributed, chopped fibers or a layer of slurry upon a moving web, fibers are deposited upon the slurry layer. An embedment device mixes the recently deposited fibers into the slurry, after which additional layers of slurry, then chopped fibers are added, followed by more embedment. The process is repeated for each layer of the board, as desired.

For use in construction, SCP panels should meet building code standards for shear resistance, load capacity, water-induced expansion and resistance to combustion, as measured by recognized tests, such as ASTM E72, ASTM 661, and ASTM C 1185 or equivalent, as applied to structural plywood sheets. SCP panels are also tested under ASTM E-136 for non-combustibility—plywood does not meet this test.

The panel when tested according to ASTM 661 and American Plywood Association (APA) Test Method S-1 over a span of 16 inches (40.6 cm) on centers, should have an ultimate load capacity greater than 550 lbs (250 kg) under static loading, an ultimate load capacity greater than 400 lbs (182 kg) under impact loading and a deflection of less than 0.078 inches (1.98 mm) under both static and impact loading with a 200 lb (90.9 kg) load.

The racking shear strength of a 0.5 inch (12.7 mm) thick panel measured by the ASTM E72 test using the nail size and spacing described above should be at least 720 lbs/ft (1072 kg/m).

A 4×8 foot, ½ inch thick panel (1.22 m×2.44 m, 12.7 mm thick) should weigh no more than 99 lbs (44.9 kg) and preferably no more than 85 lbs (38.6 kg).

The panel should be capable of being cut with the circular saws used to cut wood.

The panel should be capable of being fastened to framing with nails or screws.

The panel should be machinable so that tongue and groove edges can be produced in the panel.

The panel should be dimensionally stable when exposed to water, i.e., it should expand as little as possible, preferably less than 0.1% as measured by ASTM C 1185.

The panel should not be biodegradable or subject to attack by insects or rot.

The panel should provide a bondable substrate for exterior finish systems.

The panel should be non-combustible as determined by ASTM E136.

After curing for 28 days, the flexural strength of a 0.5 inch (12.7 mm) thick panel having a dry density of no more than 65 to 95 lb/ft$^3$ (1041 to 1520 kg/m$^3$) after being soaked in water for 48 hours should be at least 1700 psi (11.7 MPa), preferably at least 2500 psi (17.2 MPa), as measured by ASTM C 947. The panel should retain at least 75% of its dry strength.

There is a need for an economical, easy to assemble, durable and non-combustible foundation system.

SUMMARY OF THE INVENTION

The present invention relates to a foundation system for residential and light commercial construction including a metal frame and lightweight SCP panels for its shear walls. The foundation floor may be lightweight SCP panels on a metal frame or may be a poured concrete floor.

Typical compositions for embodiments of SCP panels of the present invention which achieve a desired combination of low density, improved flexural strength, and nailability/cutability comprise inorganic binder (examples—gypsum-cement, Portland cement or other hydraulic cements) having, distributed throughout the full thickness of the panel, selected glass fibers, lightweight fillers (examples—hollow glass microspheres, hollow ceramic microspheres and/or perlite uniformly), and superplasticizer/high-range water reducing admixtures (examples—polynapthalene sulfonates, poly acrylates, etc.). Other additives such as accelerating and retarding admixtures, viscosity control additives may optionally be added to the mixture to meet the demands of the manufacturing process involved.

The system of the present invention may employ single layer or multi-layer SCP panels. A single or multi layer panel may also be provided with a sheet of mesh, e.g., fiber glass mesh if desired.

In embodiments having multiple (two or more) layers, the composition of the layers may be the same or different. For example, the SCP panel may have an inner layer of a continuous phase and at least one outer layer of a continuous phase on each opposed side of the inner layer, wherein at least one outer layer on each opposed side of the inner layer has a higher percentage of glass fibers than the inner layer. This has the ability to stiffen, strengthen and toughen the panel. The glass fibers can be used alone or in combination with other types of non-combustible fibers such as steel fibers.

In another example, a multi-layer panel structure may be created to contain at least one outer layer having improved nailability and cutability. This is provided by using a higher water-to-reactive powder (defined below) ratio in making the outer layer(s) relative to the core of the panel. A small thickness of the skin coupled with a small dosage of polymer content may improve the nailability without necessarily failing the non-combustibility test. Of course, high dosages of polymer content would lead to failure of the product in the non-combustibility test.

The SCP panels may be connected to the metal framing members, e.g., studs or joists, by mechanical fasteners such as, for example, screws, rivets, etc., or by adhesive. The adhesive may be applied to the panels on site or offsite. If the adhesive is pre-applied offsite it may be provided as adhesive strips covered with strips of removable tape.

Connecting the SCP panels to the metal framing members may achieve a composite action such that the panels and studs or joists work together to carry greater loads than the framing alone.

Selecting a combination of a metal frame with SCP panels achieves a synergy of a completely non-combustible foundation system. By a fully non-combustible SCP panel on light gauge metal frame is meant a system in which all elements pass ASTM E-136. For example, the system may include SCP panels employed with a framing system employing any standard cold rolled light-gauge steel C-channels, U-channels, I-beams, square tubing, and light-gauge prefabricated building sections.

When used for foundation walls, the present SCP metal frame system may have a higher specific stiffness than a system of load bearing masonry. Specific stiffness is defined as the unit weight of a shear wall system in lbs/square foot to satisfy a design deflection requirement and at least one corresponding strength requirement for a particular span and loading condition. Strength in this definition is axial strength, flexural strength and/or shear strength for vertical and/or horizontal loads on the shear wall. Vertical loads include live and/or dead loads.

For instance, a building using SCP combined with steel framing for shear walls will have a reduced dead load compared to a building that uses CMU (concrete masonry unit) walls of the same thickness and height for shear walls. As an example a building requiring 200 linear feet (61 linear m) of shear wall with a nominal racking shear strength requirement of 500 plf (pounds per linear foot) (744 kg/linear m) for the shear walls, using 4" (10 cm) wide shear walls, with a wall height of 8 feet (2.4 m). In this case, the use of SCP combined with metal framing reduces the dead load of the shear walls in the building by 41,600 pounds compared to the use of CMU shear walls. This reduction in dead load may result in a reduction in the size of structural members in the lower floors of the building or reduce the size of the building foundation. A comparable weight savings is achieved when an SCP/metal frame foundation wall is substituted for a conventional masonry or cast in place foundation wall of the same length and height.

The present foundation system having a vertical shear diaphragm on light gauge, typically cold rolled, metal frame also is typically water durable and sealable to prevent seepage by ground water.

Preferably the vertical shear diaphragm load carrying capacity of a system of the present invention will not be lessened by more than 25% (more preferably will not be lessened by more than 20%) when exposed to water in a test wherein a 2 inch (5.1 cm) head of water is maintained over a horizontally oriented diaphragm of ¾ inch (1.9 cm) thick SCP panels fastened on a 10 foot by 20 foot (3×6 m) metal frame for a period of 24 hours. In this test, the 2 inch (5.1 cm) head is maintained by checking, and replenishing water, at 15 minute intervals. Then the system is reoriented vertically and the vertical shear diaphragm load carrying capacity of the system is measured.

Preferably the system of the present invention will not absorb more than 0.7 pounds per square foot (3.4 kg per square meter) of water when exposed to water in a test wherein a 2 inch (5.1 cm) head of water is maintained over ¾ inch (1.9 cm) thick SCP panels fastened on a 10 foot by 20 foot (3×6 m) metal frame for a period of 24 hours. In this test, the 2 inch (5.1 cm) head is maintained by checking, and replenishing water, at 15 minute intervals.

Also, combining non-combustible SCP panels with metal framing results in an entire system that resists swelling due to moisture. Preferably in the system of the present invention a 10 foot wide by 20 foot long (3×6 m) by ¾ inch (1.9 cm) thick diaphragm of the SCP panels attached to a 10 foot by 20 foot (3×6 m) metal frame will not swell more than 5% when exposed to a 2 inch (5.1 cm) head of water maintained over the SCP panels fastened on the metal frame for a period of 24 hours. In this test, the 2 inch (5.1 cm) head is maintained by checking, and replenishing water, at 15 minute intervals.

Also, the present foundation wall and floor system of a vertical or horizontal, respectively, diaphragm of SCP panel on metal frame leads to a mold and mildew resistant system. Preferably every component of the system of the present invention meets ASTM G-21 in which the system achieves approximately a rating of 1 and meets ASTM D-3273 in which the system achieves approximately a rating of 10. Preferably the system of the present invention supports substantially zero bacteria growth when clean.

Another preferred attribute of the present system of SCP panel on metal frame is that preferably it is inedible to termites.

A potential advantage of the present system is that, due to its being lightweight and strong, the combination of the present system of a diaphragm of ¾ or ½ inch (1.9 or 1.3 cm) thick SCP panel on metal frame permits efficient use of building volume for a given building footprint to permit maximization of building volume for the given building footprint. Thus, the present system may allow for more efficient building volume to allow more wall to ceiling height or even a greater number of walls in zoning areas with building height restrictions. For foundations, typical SCP panel thicknesses may range from 0.5 to 1.5 inches (1.3 to 3.8 cm).

A potential advantage of the present system is that, due to its being lightweight and strong, the combination of the present shear wall system of a vertical diaphragm of ¾ or ½ inch (1.9 or 1.3 cm) thick SCP panel on metal frame permits efficient use of building volume for a given building footprint to permit maximization of building volume for the given building footprint. Thus, the present system may allow for more efficient building volume to allow more shear wall to ceiling height or even a greater number of shear walls in zoning areas with building height restrictions.

Building codes and design standards contain minimum thickness requirements for masonry shear walls. The minimum nominal thickness for masonry (CMU) shear walls in a one story building is 6 inches. The minimum thickness of masonry shear walls (CMU) for buildings more than 1 story is 8 inches. SCP with steel framing shear walls do not have a similar minimum requirement, and can be designed per established engineering principles at thicknesses of less than 8 inches (20 cm) for multi-story buildings, and at thicknesses of less than 6 inches (15 cm) for single story buildings. Using a 6 inch (15.2 cm) thick SCP/steel frame shear wall to replace an 8 inch (20 cm) thick masonry shear wall can result in a significant increase in useable building volume.

As an example, a 3 story, 30,000 square foot (2787 sq. m) building may be made with 10,000 square feet (929 sq. m) per floor, with a floor to ceiling height of 10 feet (3 m). The building is assumed to be a square 100 feet (30.5 m) on each side, resulting in a perimeter of 400 linear feet (122 m). This example assumes there are 100 linear feet (30.5 linear meters) of shear walls required in the core of the building to satisfy shear requirements for the building design. Using 6 inch (15.2 cm) thick SCP/steel frame shear walls (including the perimeter walls) instead of 8 inch (20.3 cm) thick masonry shear walls (including the perimeter walls) results in an increase of 2500 cubic feet (71 cubic meters) of useable building volume in the 3 story, 30,000 square foot (2787 sq. m) example.

The lightweight nature of this system typically avoids the dead load associated with masonry or concrete systems. Less dead load also allows building comparable size structures on less stable soil possessing relatively low bearing capacities.

Also, the present system has the advantage of potentially being non-directional. In other words, the panels of the present system may be placed with their long dimension parallel or perpendicular to the metal joists or studs of the frame without losing strength or load carrying characteristics. Thus, the ability of the system to support dead and live loads without breaking is the same regardless of the orientation of the SCP panel on the metal framing.

As the thickness of the board affects its physical and mechanical properties, e.g., weight, load carrying capacity, racking strength and the like, the desired properties vary according to the thickness of the board. Thus, for example, the desired properties which a shear rated panel with a nominal thickness of 0.5 inch (12.7 mm) should meet include the following.

When used for walls, the nominal racking shear strength of a 0.5 inch (12.7 mm) thick panel measured by the ASTM E72 test using the appropriate metal studs, fasteners, stud spacing and fastener spacing typically is at least 720 lbs per lineal foot (1072 kg per lineal meter).

A 4×8 ft, ½ inch thick panel (1.22×2.44 m, 19.1 mm thick) typically weighs no more than about 104 lbs (about 47 kg) and preferably no more than about 96 lbs (about 44 kg).

BRIEF DESCRIPTION OF THE DRAWINGS

FIG. 10A shows a perspective view of a prefabricated corner piece as well as an enlarged view of an upper portion of the prefabricated corner piece.

FIG. 12 shows an embodiment of SCP panel that can be employed in the foundation floor system of FIG. 4 or FIG. 11B in which adhesive strips are pre-applied to the SCP panel and, prior to use, the adhesive strips are covered by removable tape.

FIG. 12A shows a perspective view of the embodiment of FIG. 12.

FIG. 12B shows the panel of FIG. 12A placed on joists.

DETAILED DESCRIPTION OF THE INVENTION

Figure 1:
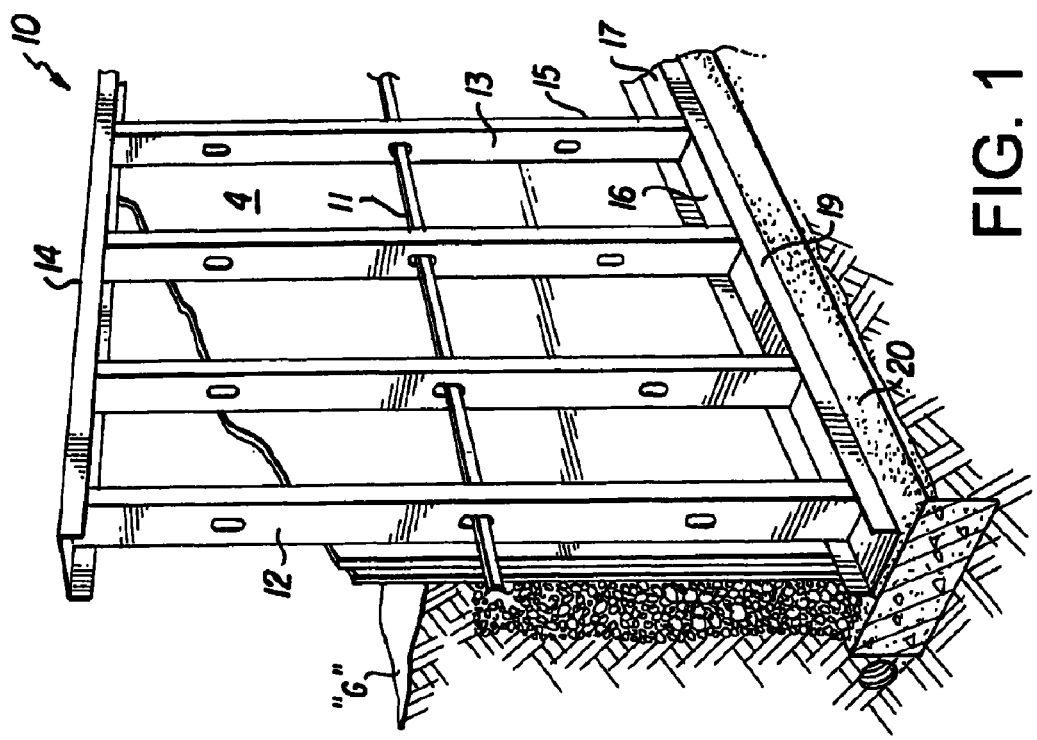
FIG. 1 is a perspective view of a typical arrangement of components for a first embodiment of a foundation wall of the present invention.

FIG. 1 is a perspective view of a typical arrangement of components for the first embodiment of a foundation wall 10 of the present invention. The foundation 10 of the first embodiment having SCP panels 4 for the vertical foundation outer walls attached to C-studs 12 attached to a lower track 16 and an upper track 14. The SCP panels 4, 40 (FIG. 3A) may be secured in any known manner to the outer side, and if desired the inner side, of the studs 12. The lower track 16 rests on footings 20. In this embodiment, the footings 20 are below ground level "G". A waterproof coating, e.g., tar or polymer, may be applied to the outer surface of the outer SCP panel 4.

Along with other requirements for withstanding shear load and gravity, foundation walls are typically made to withstand freeze thaw stress, moisture, resistance to impact with gravel, and ability to withstand pressure from surrounding earth.

The studs 12 are generally C-shaped. More particularly, the studs 12 have a web 13 and a pair of L-shaped flanges 15 perpendicular to the web 13. The metal studs 12 are secured at one end to lower track 16 by mechanical fasteners such as, for example, screws or rivets. Likewise the metal studs 12 are attached to the upper track 14. The lower track 16 is U-shaped or C-shaped with a central web portion 17 and two legs 19 protruding from web 17. In the present foundation system, the web 19 of the bottom track 16 is typically affixed to the footers 20 with conventional fasteners such as screws, bolts, rivets, etc.

An optional stud spacer member 11 is inserted through the aligned openings provided through the webs 13 of the respective studs 12. Typically the stud spacer member 11 is an elongated bar member, which is generally U-shaped or V-shaped in cross-section along its length and has notches (not shown) in each planar side portion of the spacer member. The notches open to the longitudinal outer edge of the respective side portion, to engage the respective stud opening. The spacer member need not necessarily be U-shaped or V-shaped.

Figure 2:
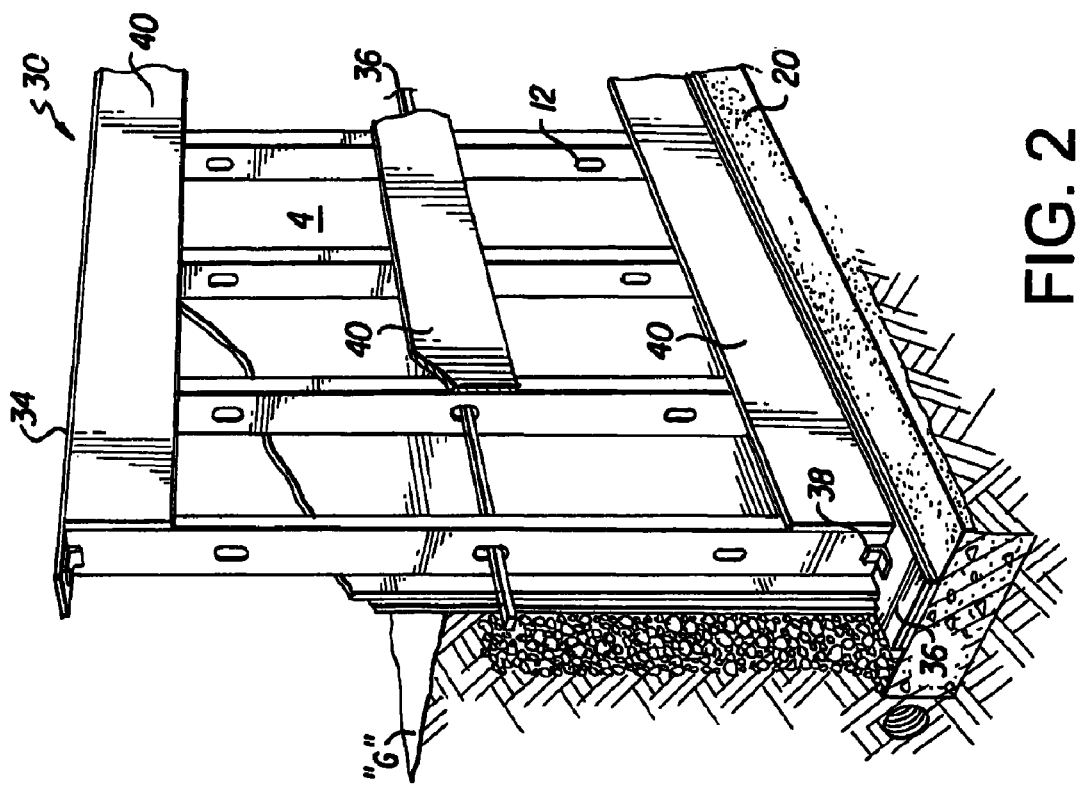
FIG. 2 is a perspective view of a typical arrangement of components for a second embodiment of a foundation wall of the present invention.

FIG. 2 is a perspective view of a typical arrangement of components for the second embodiment of a foundation wall 30 of the present invention. The foundation wall 30 has SCP panels 4 for the vertical foundation outer walls attached to C-studs 12 attached to a lower metal plate 36 and an upper metal plate 34. Strips of SCP panels 40 are attached to the inner side of the studs 12. The SCP panels 4, 40 may be secured in any known manner to the outer side, and the inner side, of the studs 12. The lower plate 36 rests on footings 20. In this embodiment, the footings 20 are below ground level "G".

The metal studs 12 are secured at one end to lower plate 36 by mechanical fasteners such as, for example, screws, rivets, etc. typically employed with L-shaped brackets 38. Likewise the metal studs 12 are attached to the upper plate 34. In the present foundation system, the web 19 of the bottom plate 36 is typically affixed to the footers 20 with conventional fasteners such as screws, bolts, rivets, etc.

Figure 3:
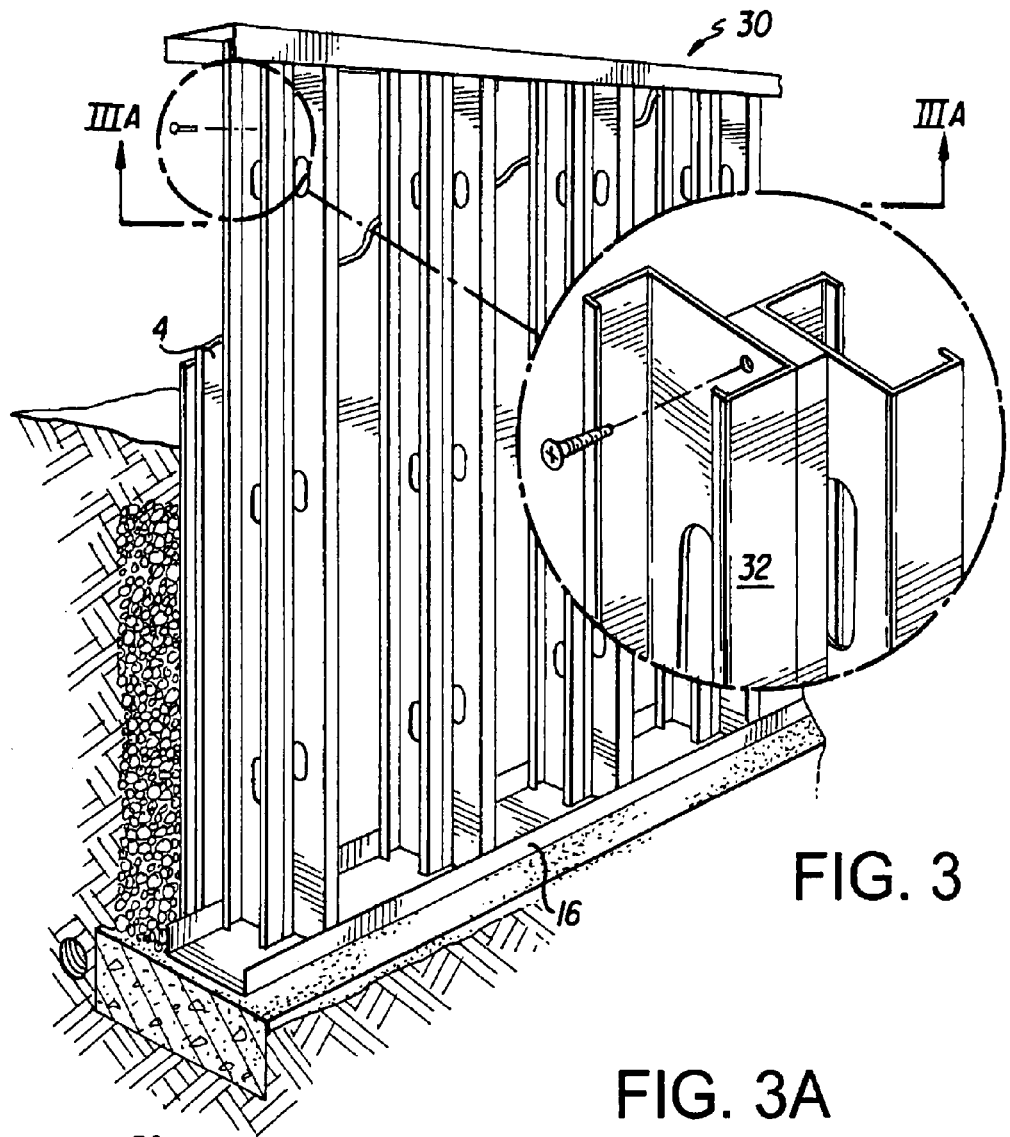
FIG. 3 is a perspective view of a typical arrangement of components for a third embodiment of a foundation wall of the present invention having a staggered stud wall construction.

FIG. 3 is a perspective view of a typical arrangement of components for a third embodiment of a foundation wall of the present invention having a staggered stud wall 30.

Figure 3A:
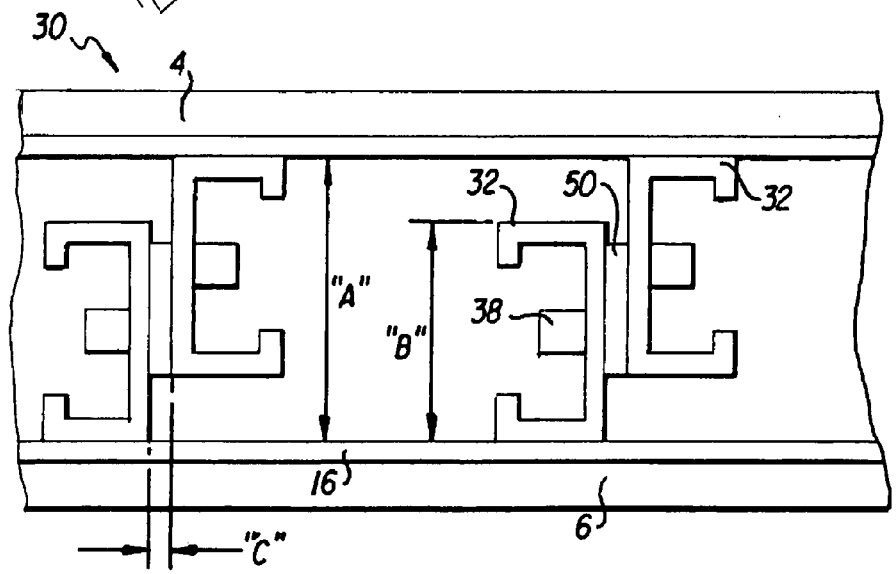
FIG. 3A is a top view along view IIIA-IIIA of the embodiment of FIG. 3 modified to show inner and outer walls.

FIG. 3A is a top view along view IIIA-IIIA of the embodiment of FIG. 3 modified to show inner and outer walls. This is a "staggered" stud wall 30 having opposed facing C-studs 32 with SCP panels 4, 6 on opposed sides. This has the advantage of providing additional strength to withstand forces exerted by the earth contacting the foundation SCP panel walls 4. Typically the exterior wall 4 and interior wall 6 are a distance "A" apart ranging from 6 to 12 inches (15-30 cm), e.g. 8 inches (20 cm) apart. Typically the studs 32 have a width "B" ranging from 4 to 8 inches (10-20 cm), e.g. 6 inches (15 cm). Also, typically the studs 12 are a distance "C" apart of 0.25 to 0.5 inches (0.6-1.3 cm) apart. A spacer 50 may be provided in the space between the back to back studs 32. The studs 32 may be attached to a lower track 16 by L-shaped fasteners 38.

Figure 3B:
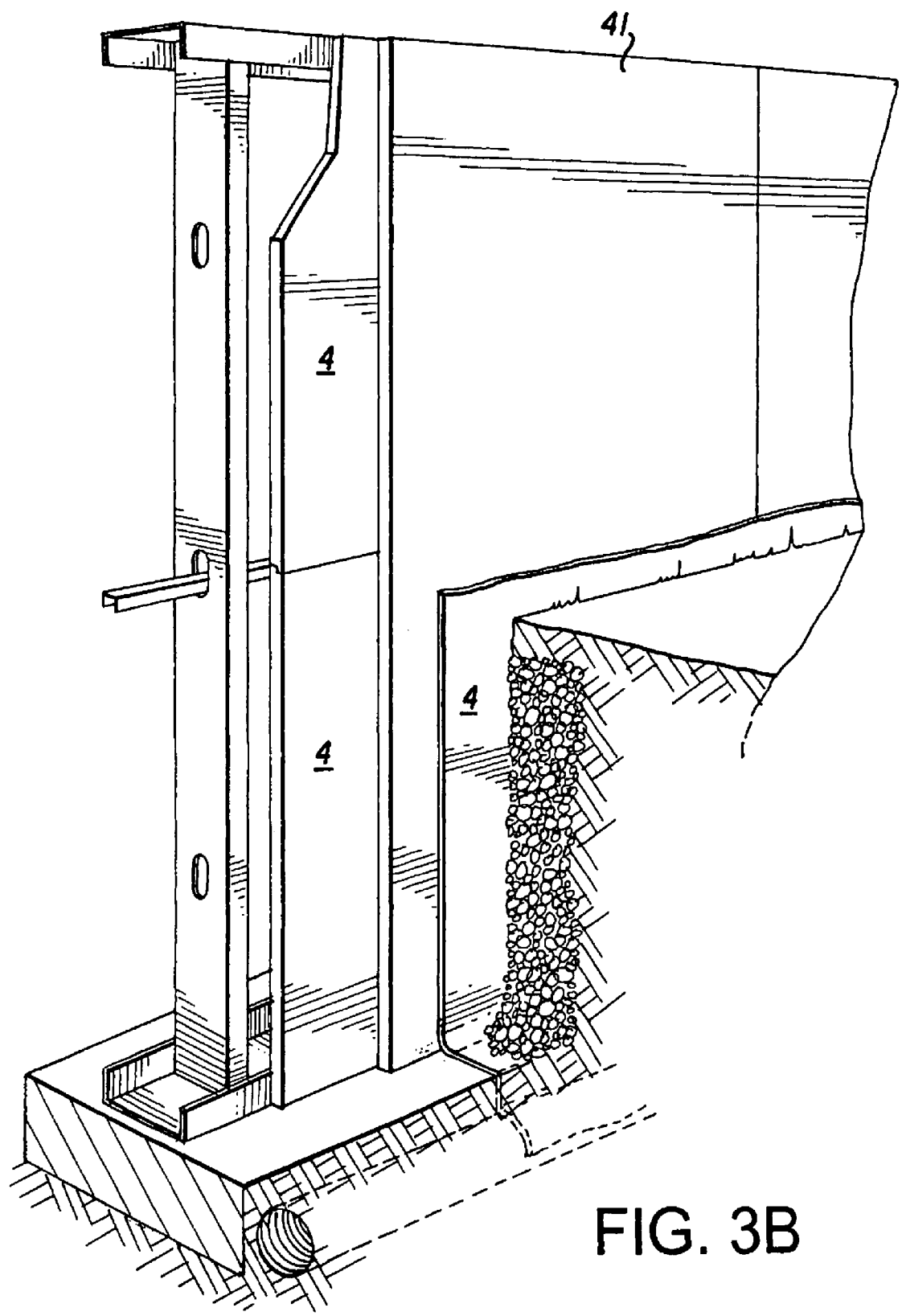
FIG. 3B is a perspective view of a typical arrangement of components for a fourth embodiment of a foundation wall of the present invention having two layers of SCP board one horizontal and one vertical.

FIG. 3B is a perspective view of a typical arrangement of components for a fourth embodiment of a foundation wall of the present invention having two layers of SCP board 4 one layer horizontal and one layer vertical.

The exterior walls of the foundation may have one (FIG. 1) or two (FIG. 3B) layers of SCP panels. If desired the double layers of exterior panels may be arranged to offset the seams of the first layer of foundation wall panels from the seams of the second layer of foundation wall panels between the building corners. This may assist in preventing seepage of ground water through the underground foundation walls.

Figure 4:
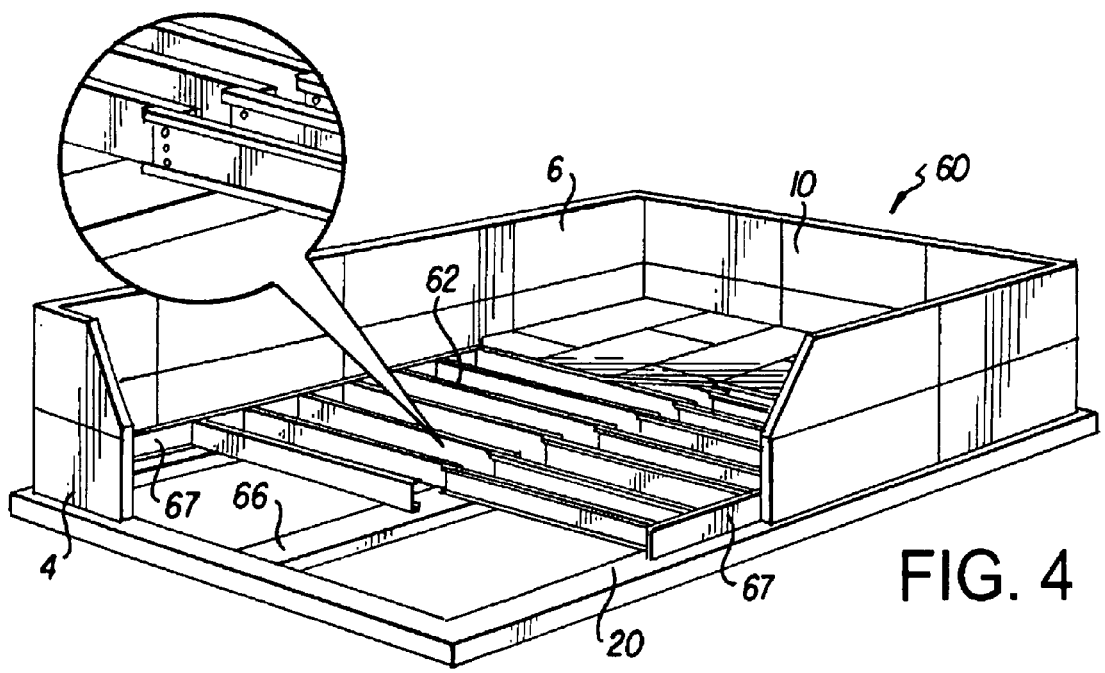
FIG. 4 shows a perspective view of a basement floor employed with the wall of FIG. 1.

FIG. 4 shows a perspective view of a foundation 60 employing a basement floor and the wall 10 of FIG. 1. This floor includes joists 62 attached to rim joists 67 resting on perimeter footing 20. The joists 62 also rest on a median footing 66. The wall 10 has outer SCP panels 4 and inner SCP panels 6.

Figure 5:
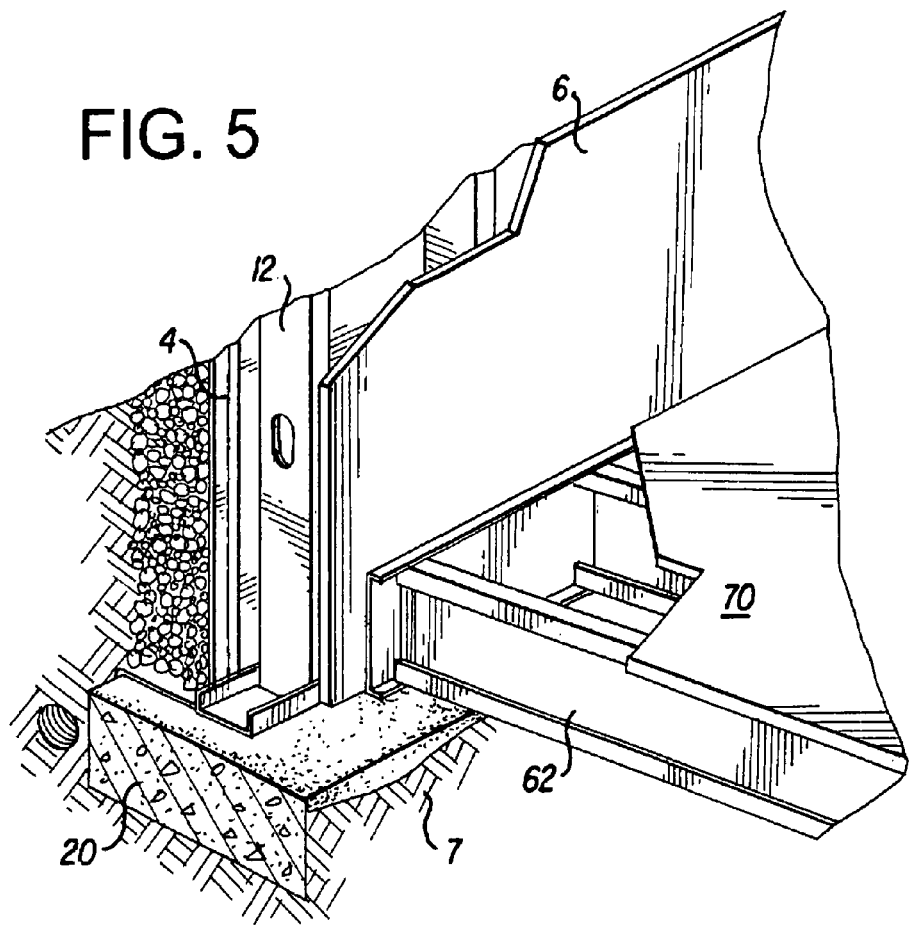
FIG. 5 shows a perspective view of an enlarged section of a portion of the basement floor of FIG. 4 in which joists sit on the footing.

FIG. 5 shows a perspective view of an enlarged section of a portion of the basement floor of FIG. 4 in which the joists 62 sit on the footing 20. The footing is sitting in compacted earth 7. FIG. 5 also shows the SCP panel 70 laid on the joists 62. The SCP panel 70 may be attached to the joists 62 by mechanical fasteners or adhesive. If desired, expansion joint material (normally supplied in rolled or rigid form) may be placed between the end of the joist 62 and the inner SCP panel 6. Typically a vapor barrier sheet is placed under the joists 62.

Figure 6:
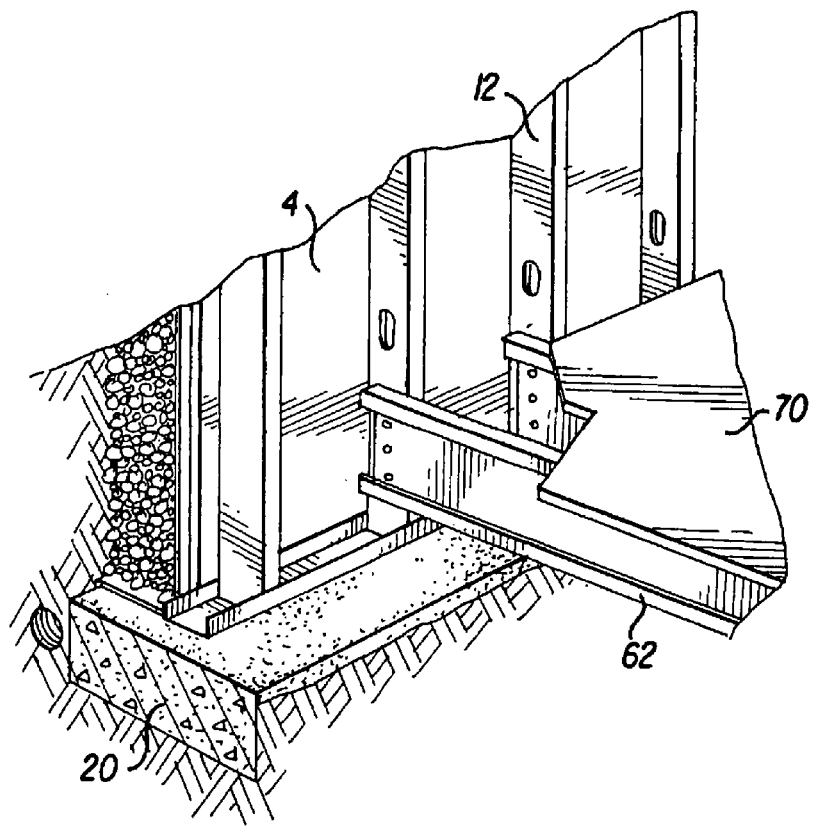
FIG. 6 shows a perspective view of an enlarged section of a portion of the basement floor of FIG. 4 modified to have the joists attached to the wall framing.

FIG. 6 shows a perspective view of an enlarged section of a portion of the basement floor of FIG. 4 modified to have the joists 62 attached to the studs 12 at a level above that of the footer 20. FIG. 6 also shows the SCP panel 70 laid on the joists 62. The joists 62 may be attached to the studs 12 by mechanical fasteners, e.g., rivets. The SCP panel 70 may be attached to the joists 62 by mechanical fasteners or adhesive.

Figure 6A:
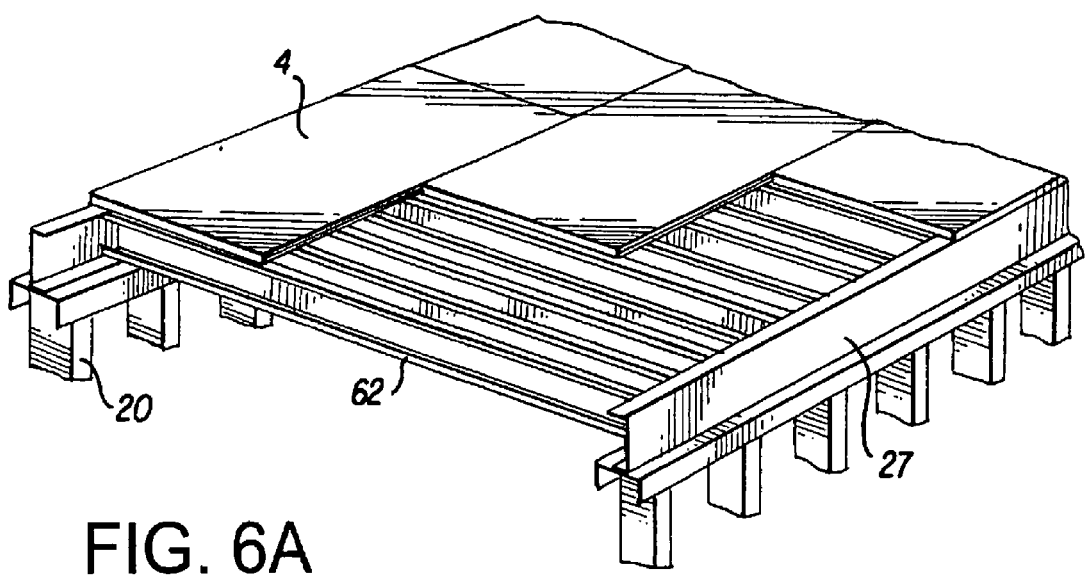
FIG. 6A shows a perspective view of an enlarged section of a portion of the basement floor of FIG. 4 modified to have the joists sit on a header supported on footers.

FIG. 6A shows a perspective view of an enlarged section of a portion of the basement floor of FIG. 4 modified to have the joists 62 sit on a header 27 resting on the footer 20. If desired the joists may also sit on an upright piece of SCP panel (not shown).

Figure 7:
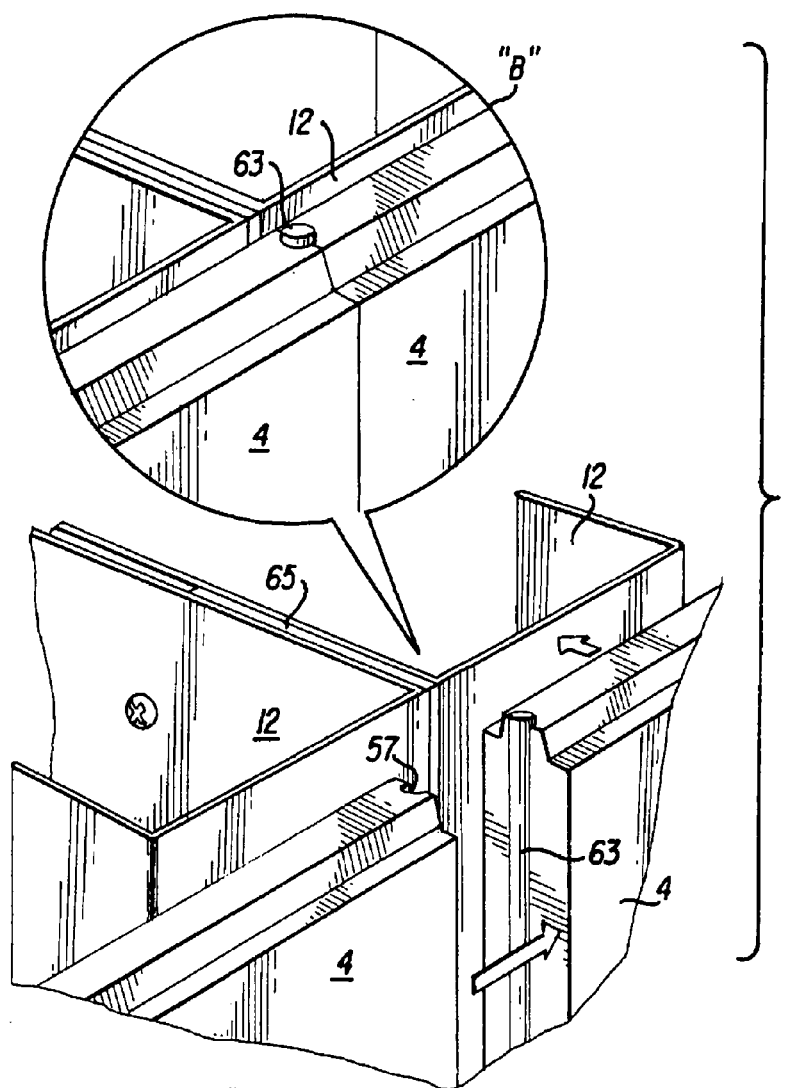
FIG. 7 shows two perspective views of an enlarged section of a portion of the walls of FIG. 4 with the SCP panels arranged horizontally, which shows backer rods and gaskets applied to the SCP panels, wherein one view shows the SCP panels just prior to being placed together and the other view shows the SCP panels after being placed together.

FIG. 7 shows two perspective views of an enlarged section of a portion of the walls of FIG. 4 with the SCP panels 4 arranged horizontally. As shown in FIG. 7, a first edge of a first panel 4 has a first groove 57 and a second edge of a second panel 4 has a second groove 57. A backer rod 63 is placed in grooves 57 of the SCP panels 4.

One view in FIG. 7 shows the SCP panels 4 just prior to being placed together. The other view "B" in FIG. 7 shows the SCP panels 4 after being placed together such that the first groove 57 and the second groove 57 are opposed and adjacent and contain the backer rod 63.

Also, FIG. 7 shows a first framing member (stud 12) and a second framing member (stud 12) are adjacent and a gasket 65 is located between opposed sides of these framing members (studs 12, 12).

The backer rods 63 and gaskets 65 are typically made of closed cell polymer material.

Figure 8:
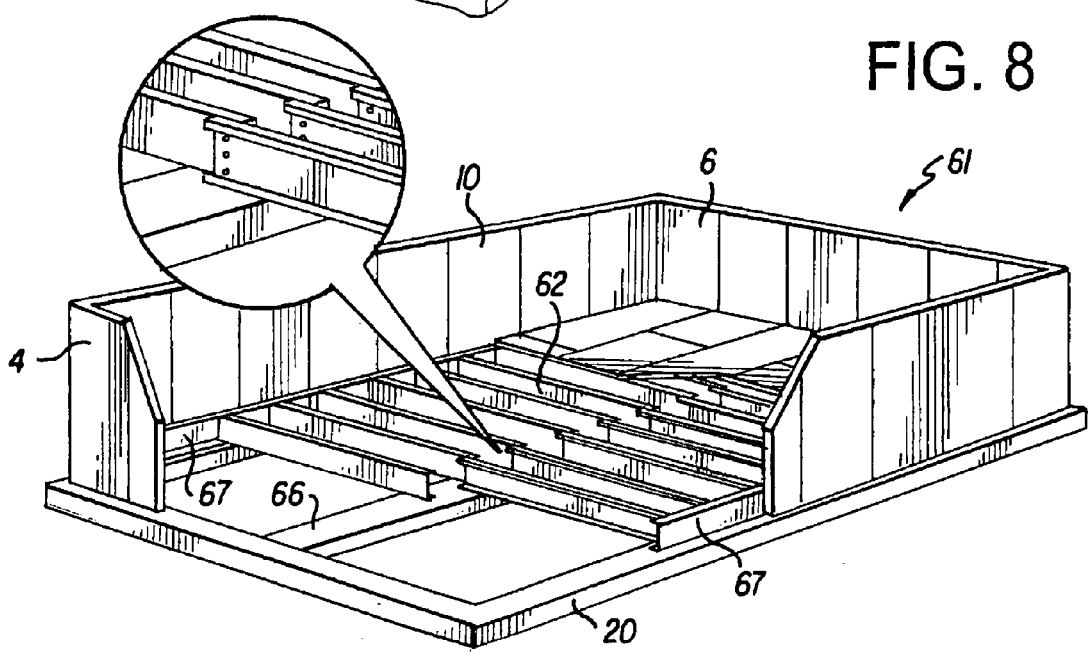
FIG. 8 shows a perspective view of a basement floor employed with the wall of FIG. 1 in which the wall SCP panels are oriented vertically.

FIG. 8 shows a perspective view of a foundation 61 employing a basement floor and the wall 10 of FIG. 1 modified to orient the SCP panels 4, 6 vertically. This floor includes joists 62 attached to rim joists 67 resting on perimeter footing 20. The joists 62 also rest on a median footing 66.

Figure 9:
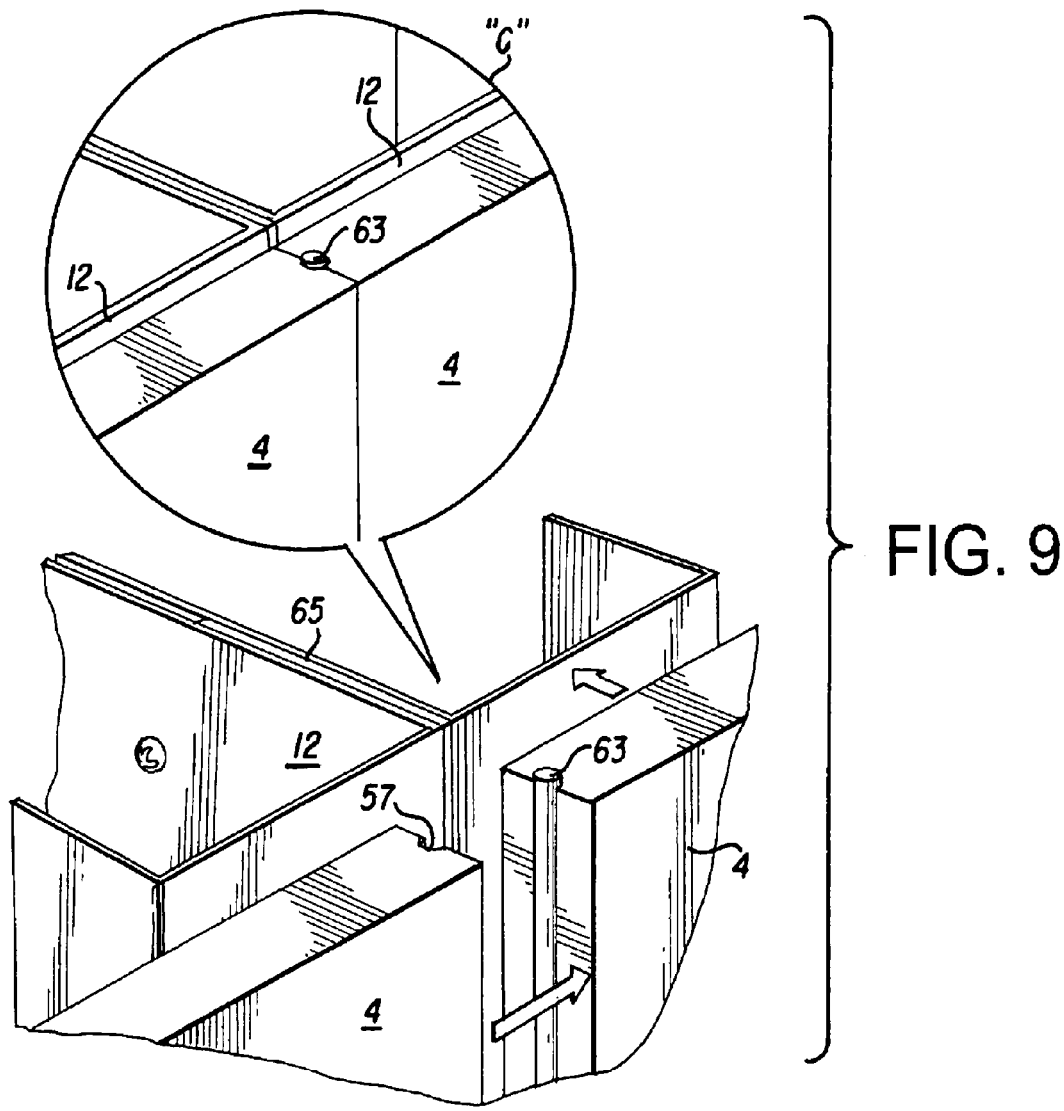
FIG. 9 shows two perspective views of an enlarged section of a portion of the walls of FIG. 8 with the SCP panels arranged vertically, which shows backer rods and gaskets applied to the SCP panels, wherein one view shows the SCP panels just prior to being placed together and the other view shows the SCP panels after being placed together.

FIG. 9 shows two perspective views of an enlarged section of a portion of the walls of FIG. 8 with the SCP panels 4 arranged vertically, which shows backer rod 63 placed in grooves 57 of the SCP panels 4 and gasket 65 applied between studs 12, 12. One view of FIG. 9 shows the SCP panels 4 just prior to being placed together. The other view "C" of FIG. 9 shows the SCP panels 4 after being placed together. The backer rods 63 and gaskets 65 are typically made of closed cell polymer material.

Figure 10:
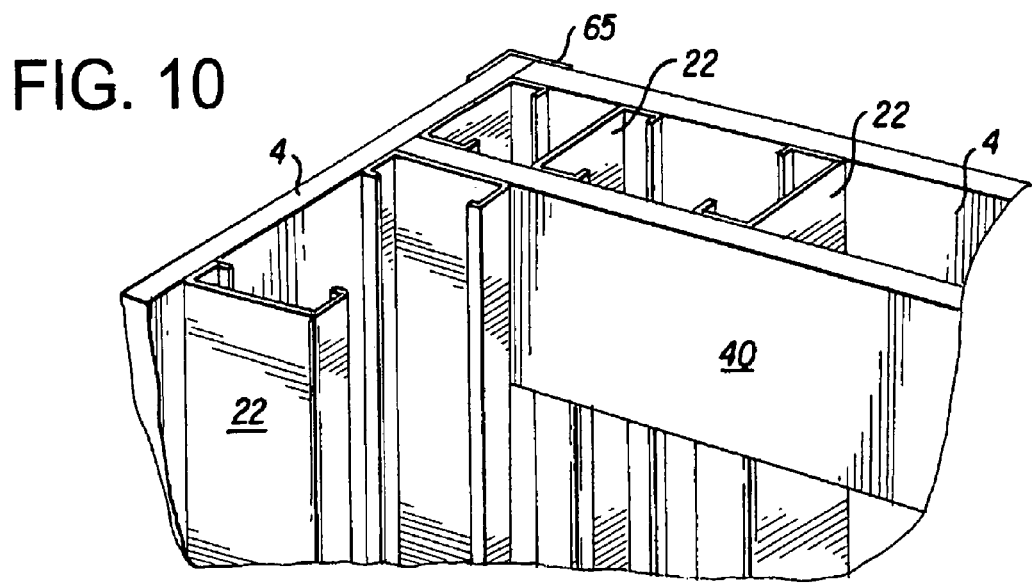
FIG. 10 shows a perspective view of an arrangement for a corner of the foundation of the present invention.

FIG. 10 shows an example of a construction for the outside corner of the foundation. The corner has SCP panels 4 as outer walls, SCP panel portions 40 as inner surfaces, and studs 22. Where the SCP panels 4 meet to form the corner, the joint formed by the overlapping SCP panels is waterproofed by applying a continuous waterproof tape 65 from the top of the wall to bottom of the wall. The waterproof tape 63 is a glass fiber reinforced bitumen or polymer fabric.

FIG. 10A shows a perspective view of a prefabricated elongate corner piece 72 with some typical dimensions as well as an enlarged view of an upper portion of the corner piece 72. Corner piece 72 has legs 73, 75 which define an L-shaped cross-section. If desired, elongate corner piece 72 may be employed so there is no vertical seam at the wall corners. The length L1 of leg 73 may be of the same size or different that the length L2 of leg 75. This may assist in preventing seepage of ground water through the underground foundation walls. Prefabricated corner panel 72 may be made by machining a 6-8 inch (about 15-20 cm) relief (lengths L3, L4) in the front and back surfaces of SCP panels 73, 75 that are 8-10 feet (about 2.4-3 m) long (length L5) and 12-24 inches (about 30.5-61 cm) wide (lengths L1, L2). Two panels are then joined together using a fiber glass polymer cement embedded into the surface relief to create a single corner panel that has a finished panel thickness of the same dimension as the foundation panels that create the straight wall sections.

Figure 10B:
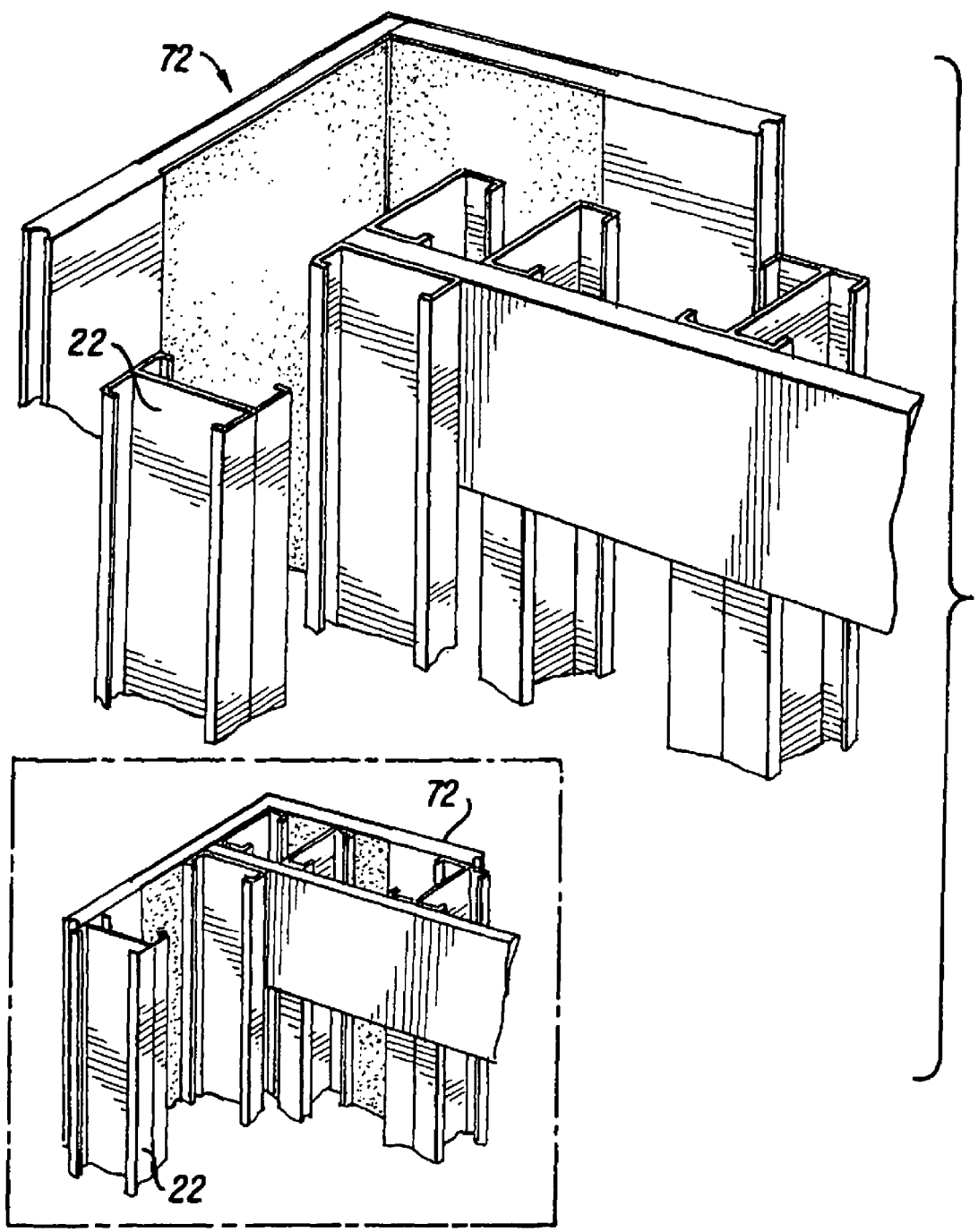
FIG. 10B shows a disassembled view and an assembled view of the installation of the prefabricated corner panel onto studs in the construction of a foundation wall.

FIG. 10B shows a disassembled view and an assembled view of the installation of the prefabricated corner panel 72 onto studs 22 in the construction of a foundation wall.

Figure 11A:
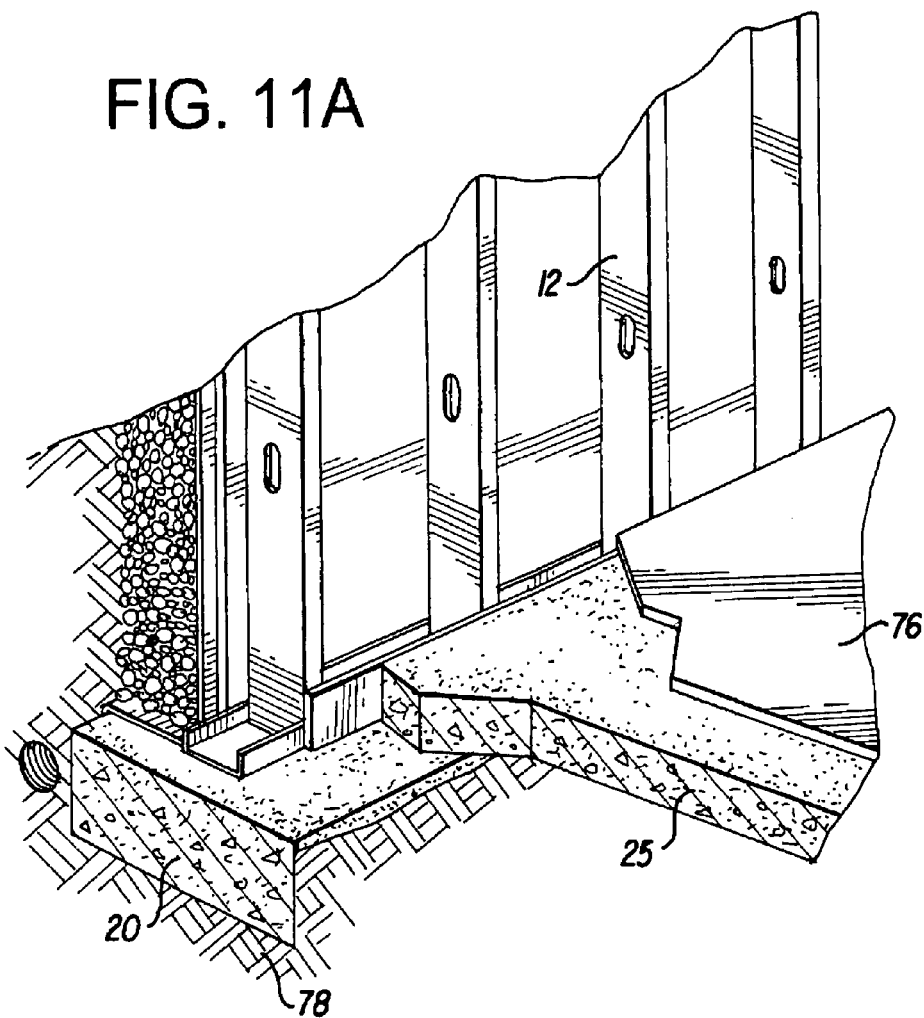
FIG. 11A shows a footing detail together with a cement or concrete floor.

FIG. 11A shows a perspective view of an enlarged section of a portion of the basement floor of FIG. 4 modified to replace the floor of joists 62 and SCP panels 70 with a poured cement or concrete floor 25. Typically the floor is a slab of cement or concrete 25 poured onto a vapor barrier sheet (not shown) placed over compacted earth 78. If desired a floor 76 of finishing material or SCP panels may be placed over the cement floor 25.

Figure 11B:
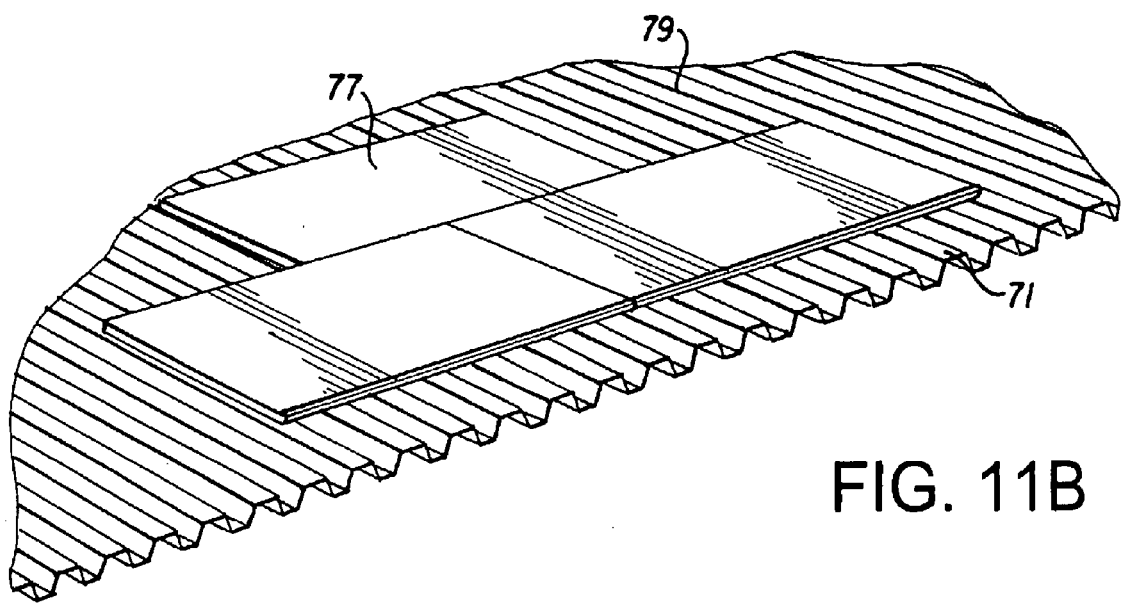
FIG. 11B shows another embodiment of a floor of the foundation of the present invention comprising SCP panels placed on a corrugated metal sheet.

FIG. 11B shows another embodiment of a foundation floor of the present invention comprising SCP panels 77 placed on a corrugated metal sheet 79, having upper flat portions 71 and fastened mechanically (screws, etc.) or with adhesive applied onsite or pre-applied offsite.

FIGS. 12 and 12A show an embodiment of SCP panel 77 that can be employed in the foundation floor system of FIG. 11 having adhesive strips 81 pre-applied to the SCP panel 77 at locations for engaging at least a number of the upper flat portions 71. Prior to use the adhesive strips 81 are covered by removable tape 83. FIG. 12B shows use of the panel 77 on joists 62.

Figure 13:
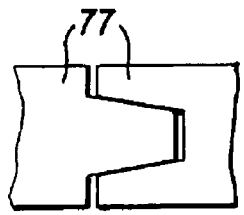
FIGS. 13, 14 and 15 show a typical design and dimensions of tongue and groove employed in a 0.75 inch (1.9 cm) thick SCP panel.
Figure 14:
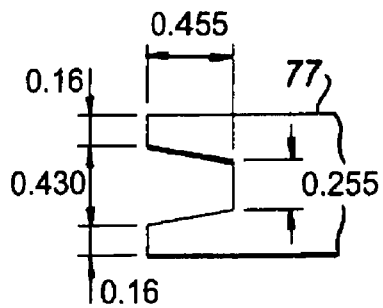
Figure 15:
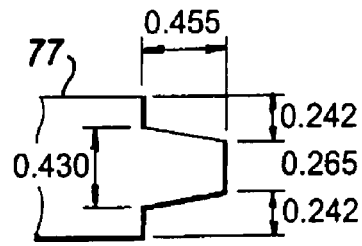

The wall SCP panels 4, 6, 40 and floor SCP panels 70, 77 may have a tongue and groove construction, which may be made by shaping the edges of the panel during casting or before use by cutting the tongue and groove with a router. For example, the tongue and groove of panel 77 may be tapered, as shown in FIGS. 13, 14 and 15 (with dimensions in inched), the taper providing easy installation of the panels of the invention. The wall panels are typically 0.5 to 1 inch thick. The floor panels are typically 0.75 to 1 inch (1.9 to 2.5 cm) thick. Any opposed pair of edges of the panels may be provided with mating tongue and groove construction.

Waterproofing

To assist in waterproofing the foundations of the present invention, the seams between the SCP panels, e.g., SCP panels 4, 70, 77, are typically sealed with a liquid applied bitumen-type water barrier or an adhered waterproof polymer sheet.

In general, waterproofing the foundation system could be achieved using either sheet membranes or liquid membranes. Sheet membranes are typically about 60 mil or more, e.g., 60-100 mil, thick membranes composed of rubberized asphalt laminated to a waterproof polyethylene film. A typical sheet material is a self-adhering rubberized asphalt membrane. This typically 60-mil-thick membrane is composed of rubberized asphalt laminated to a waterproof polyethylene film. The asphalt side is sticky but covered by a release paper which is removed during use.

An example of a sheet membrane is CRACK GUARD waterproofing sheet membrane available form Protective Coatings Technology, Inc., Menomonie, Wis. It is a cold applied self adhesive elastomeric membrane consisting of a layer of polymer-modified asphalt laminated to a layer of high-density polyethylene.

Liquid applied membranes are typically either polymer-modified asphalts or polyurethane liquid membrane. Polymer-modified asphalt generally is a liquid asphalt that has rubber polymers added. The rubber polymers enhance the asphalt to allow it to stretch over shrinkage cracks. The liquid cures into a rubbery coating on the wall. Both may be provided in separate grades for trowel, roller or spray application. The typical application thickness is about 60 mils or more.

An example of spray applied asphalt membrane is TUFF-N-DRY polymer-enhanced asphalt membrane available from Tremco Barrier Solutions, Reynoldsburg, Ohio.

Another example of liquid applied asphalt membrane is HYDRA-GUARD polymer modified asphalt membrane, available from Applied Technologies, Fairfield, Ohio, which may be brush, roll or spray applied. Typically the application thickness is about 60 mils wet, 40 mils cured. If desired this may be used together with FibR-DRI fiberglass protection panels also available from Applied Technologies, Fairfield, Ohio. For example the HYDRA-GUARD polymer modified asphalt membrane may be applied to the walls and then the FibR-DRI fiberglass protection panels are applied. The FibR-DRI fiberglass protection panels are provided to protect the HYDRA Guard membrane from damage and provide drainage and insulation.

SCP Panel Composition

Figure 16:
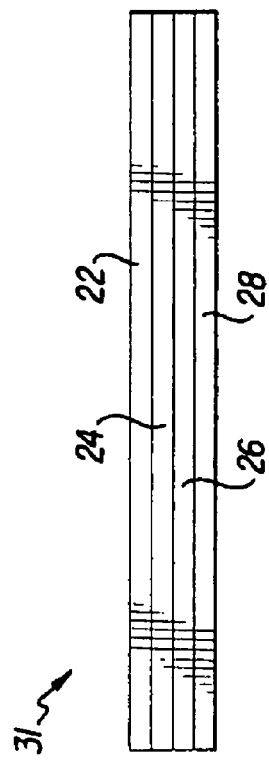
FIG. 16 is a side view of a multilayer SCP panel.

The SCP panels employed with metal framing in the present invention may be a homogeneous single layer. However, the panel typically is made by a process which applies multiple layers. Depending upon how the layers are applied and cured as well as whether the layers have the same or different compositions, the final panel product may or may not retain distinct layers. FIG. 16 shows a multi-layer structure of a panel 31 having layers 22, 24, 26 and 28. In the multi-layer structure the composition of the layers may be the same or different. The typical thickness of the layer(s) ranges between about 1/32 to 1.0 inches (about 0.79 to 25.4 mm). Where only one outer layer is used, it typically will be less than 3/8 of the total panel thickness.

The principal starting materials used to make SCP panels are inorganic binder, e.g., calcium sulfate alpha hemihydrate, hydraulic cement, and pozzolanic materials, lightweight filler, e.g., one or more of perlite, ceramic microspheres, or glass microspheres, as well as superplasticizer, e.g., polynapthalene sulphonates and/or poly acrylates, water, and optional additives.

Calcium Sulfate Hemihydrate

Calcium sulfate hemihydrate, which may be used in panels of the invention, is made from gypsum ore, a naturally occurring mineral, (calcium sulfate dihydrate $CaSO_4.2H_2O$). Unless otherwise indicated, "gypsum" will refer to the dihydrate form of calcium sulfate. After being mined, the raw gypsum is thermally processed to form a settable calcium sulfate, which may be anhydrous, but more typically is the hemihydrate, $CaSO_4.\frac{1}{2}H_2O$. For the familiar end uses, the settable calcium sulfate reacts with water to solidify by forming the dihydrate (gypsum). The hemihydrate has two recognized morphologies, termed alpha hemihydrate and beta hemihydrate. These are selected for various applications based on their physical properties and cost. Both forms react with water to form the dihydrate of calcium sulfate. Upon hydration, alpha hemihydrate is characterized by giving rise to rectangular-sided crystals of gypsum, while beta hemihydrate is characterized by hydrating to produce needle-shaped crystals of gypsum, typically with large aspect ratio. In the present invention either or both of the alpha or beta forms may be used depending on the mechanical performance desired. The beta hemihydrate forms less dense microstructures and is preferred for low density products. The alpha hemihydrate forms more dense microstructures having higher strength and density than those formed by the beta hemihydrate. Thus, the alpha hemihydrate could be substituted for beta hemihydrate to increase strength and density or they could be combined to adjust the properties.

A typical embodiment for the inorganic binder used to make panels of the present invention comprises hydraulic cement such as Portland cement, high alumina cement, pozzolan-blended Portland cement, or mixtures thereof.

Another typical embodiment for the inorganic binder used to make panels of the present invention comprises a blend containing calcium sulfate alpha hemihydrate, hydraulic cement, pozzolan, and lime.

Hydraulic Cement

ASTM defines "hydraulic cement" as follows: a cement that sets and hardens by chemical interaction with water and is capable of doing so under water. There are several types of hydraulic cements that are used in the construction and building industries. Examples of hydraulic cements include Portland cement, slag cements such as blast-furnace slag cement and super-sulfated cements, calcium sulfoaluminate cement, high-alumina cement, expansive cements, white cement, and rapid setting and hardening cements. While calcium sulfate hemihydrate does set and harden by chemical interaction with water, it is not included within the broad definition of hydraulic cements in the context of this invention. All of the aforementioned hydraulic cements can be used to make the panels of the invention.

The most popular and widely used family of closely related hydraulic cements is known as Portland cement. ASTM defines "Portland cement" as a hydraulic cement produced by pulverizing clinker consisting essentially of hydraulic calcium silicates, usually containing one or more of the forms of calcium sulfate as an interground addition. To manufacture Portland cement, an intimate mixture of limestone, argallicious rocks and clay is ignited in a kiln to produce the clinker, which is then further processed. As a result, the following four main phases of Portland cement are produced: tricalcium silicate ($3CaO.SiO_2$, also referred to as $C_3S$), dicalcium silicate ($2CaO.SiO_2$, called $C_2S$), tricalcium aluminate ($3CaO.Al_2O_3$ or $C_3A$), and tetracalcium aluminoferrite ($4CaO.Al_2O_3.Fe_2O_3$ or $C_4AF$). Other compounds present in minor amounts in Portland cement include calcium sulfate and other double salts of alkaline sulfates, calcium oxide, and magnesium oxide. Of the various recognized classes of Portland cement, Type III Portland cement (ASTM classification) is preferred for making the panels of the invention; because of its fineness it has been found to provide greater strength. The other recognized classes of hydraulic cements including slag cements such as blast-furnace slag cement and super-sulfated cements, calcium sulfoaluminate cement, high-alumina cement, expansive cements, white cement, rapidly setting and hardening cements such as regulated set cement and VHE cement, and the other Portland cement types can also be successfully used to make the panels of the present invention. The slag cements and the calcium sulfoaluminate cement have low alkalinity and are also suitable to make the panels of the present invention.

Fibers

Glass fibers are commonly used as insulating material, but they have also been used as reinforcing materials with various matrices. The fibers themselves provide tensile strength to materials that may otherwise be subject to brittle failure. The fibers may break when loaded, but the usual mode of failure of composites containing glass fibers occurs from degradation and failure of the bond between the fibers and the continuous phase material. Thus, such bonds are important if the reinforcing fibers are to retain the ability to increase ductility and strengthen the composite over time. It has been found that glass fiber reinforced cements do lose strength as time passes, which has been attributed to attack on the glass by the lime which is produced when cement is cured. One possible way to overcome such attack is to cover the glass fibers with a protective layer, such as a polymer layer. In general, such protective layers may resist attack by lime, but it has been found that the strength is reduced in panels of the invention and, thus, protective layers are not preferred. A more expensive way to limit lime attack is to use special alkali-resistant glass fibers (AR glass fibers), such as Nippon Electric Glass (NEG) 350Y. Such fibers have been found to provide superior bonding strength to the matrix and are, thus, preferred for panels of the invention. The glass fibers are monofilaments that have a diameter from about 5 to 25 microns (micrometers) and typically about 10 to 15 microns (micrometers). The filaments generally are combined into 100 filament strands, which may be bundled into rovings containing about 50 strands. The strands or rovings will generally be chopped into suitable filaments and bundles of filaments, for example, about 0.25 to 3 inches (6.3 to 76 mm) long, typically 1 to 2 inches (25.4 to 50.8 mm).

It is also possible to include other non-combustible fibers in the panels of the invention, for example, steel fibers are also potential additives.

Pozzolanic Materials

As has been mentioned, most Portland and other hydraulic cements produce lime during hydration (curing). It is desirable to react the lime to reduce attack on glass fibers. It is also known that when calcium sulfate hemihydrate is present, it reacts with tricalcium aluminate in the cement to form ettringite, which can result in undesirable cracking of the cured product. This is often referred to in the art as "sulfate attack." Such reactions may be prevented by adding "pozzolanic" materials, which are defined in ASTM C618-97 as " . . . siliceous or siliceous and aluminous materials which in themselves possess little or no cementitious value, but will, in finely divided form and in the presence of moisture, chemically react with calcium hydroxide at ordinary temperatures to form compounds possessing cementitious properties." One often used pozzolanic material is silica fume, a finely divided amorphous silica which is the product of silicon metal and ferro-silicon alloy manufacture. Characteristically, it has a high silica content and a low alumina content. Various natural and man-made materials have been referred to as having pozzolanic properties, including pumice, perlite, diatomaceous earth, tuff, trass, metakaolin, microsilica, ground granulated blast furnace slag, and fly ash. While silica fume is a particularly convenient pozzolan for use in the panels of the invention, other pozzolanic materials may be used. In contrast to silica fume, metakaolin, ground granulated blast furnace slag, and pulverized fly ash have a much lower silica content and large amounts of alumina, but can be effective pozzolanic materials. When silica fume is used, it will constitute about 5 to 20 wt. %, preferably 10 to 15 wt. %, of the reactive powders (i.e., hydraulic cement, calcium sulfate alpha hemihydrate, silica fume, and lime). If other pozzolans are substituted, the amounts used will be chosen to provide chemical performance similar to silica fume.

Lightweight Fillers/Microspheres

The lightweight panels employed in systems of the present invention typically have a density of 65 to 90 pounds per cubic foot (1.04 to 1.44 grams/cc, preferably 65 to 85 pounds per cubic foot (1.04 to 1.36 g/cc), more preferably 72 to 80 pounds per cubic foot (1.15 to 1.28 g/cc). In contrast, typical Portland cement based panels without wood fiber will have densities in the 95 to 110 pounds per cubic foot (1.52 to 1.76 g/cc) range, while the Portland Cement based panels with wood fibers will be about the same as SCP (about 65 to 85 pcf) (1.04 to 1.36 g/cc).

To assist in achieving these low densities the panels are provided with lightweight filler particles. Such particles typically have an average diameter (average particle size) of about 10 to 500 microns (micrometers). More typically they have a mean particle diameter (mean particle size) from 50 to 250 microns (micrometers) and/or fall within a particle diameter (size) range of 10 to 500 microns. They also typically have a particle density (specific gravity) in the range from 0.02 to 1.00. Microspheres or other lightweight filler particles serve an important purpose in the panels of the invention, which would otherwise be heavier than is desirable for building panels. Used as lightweight fillers, the microspheres help to lower the average density of the product.

When the microspheres are hollow, they are sometimes referred to as microballoons.

The microspheres are either non-combustible themselves or, if combustible, added in sufficiently small amounts to not make the SCP panel combustible. Typical lightweight fillers for including in mixtures employed to make panels of the present invention are selected from the group consisting of ceramic microspheres, polymer microspheres, perlite, glass microspheres, and/or fly ash cenospheres.

Ceramic microspheres can be manufactured from a variety of materials and using different manufacturing processes. Although a variety of ceramic microspheres can be utilized as a filler component in the panels of the invention, the preferred ceramic microspheres of the invention are produced as a coal combustion by-product and are a component of the fly ash found at coal fired utilities, for example, EXTENDOSPHERES-SG made by Kish Company Inc., Mentor, Ohio or FILLITE® Brand ceramic microspheres made by Trelleborg Fillite Inc., Norcross, Ga. USA. The chemistry of the preferred ceramic microspheres of the invention is predominantly silica ($SiO_2$) in the range of about 50 to 75 wt. % and alumina ($Al_2O_3$) in the range of about 15 to 40 wt. %, with up to 35 wt. % of other materials. The preferred ceramic microspheres of the invention are hollow spherical particles with diameters in the range of 10 to 500 microns (micrometers), a shell thickness typically about 10% of the sphere diameter, and a particle density preferably about 0.50 to 0.80 g/mL. The crushing strength of the preferred ceramic microspheres of the invention is greater than 1500 psi (10.3 MPa) and is preferably greater than 2500 psi (17.2 MPa).

Preference for ceramic microspheres in the panels of the invention primarily stems from the fact that they are about three to ten times stronger than most synthetic glass microspheres. In addition, the preferred ceramic microspheres of invention are thermally stable and provide enhanced dimensional stability to the panel of invention. Ceramic microspheres find use in an array of other applications such as adhesives, sealants, caulks, roofing compounds, PVC flooring, paints, industrial coatings, and high temperature-resistant plastic composites. Although they are preferred, it should be understood that it is not essential that the microspheres be hollow and spherical, since it is the particle density and compressive strength which provide the panel of the invention with its low weight and important physical properties. Alternatively, porous irregular particles may be substituted, provided that the resulting panels meet the desired performance.

The polymer microspheres, if present, are typically hollow spheres with a shell made of polymeric materials such as polyacrylonitrile, polymethacrylonitrile, polyvinyl chloride or polyvinylidine chloride, or mixtures thereof. The shell may enclose a gas used to expand the polymeric shell during manufacture. The outer surface of the polymer microspheres may have some type of an inert coating such as calcium carbonate, titanium oxides, mica, silica, and talc. The polymer microspheres have a particle density preferably about 0.02 to 0.15 g/mL and have diameters in the range 10 to 350 microns (micrometers). The presence of polymer microspheres may facilitate simultaneous attainment of low panel density and enhanced cutability and nailability.

Other lightweight fillers, for example glass microspheres, perlite or hollow alumino-silicate cenospheres or microspheres derived from fly ash, are also suitable for including in mixtures in combination with or in place of ceramic microspheres employed to make panels of the present invention.

The glass microspheres typically are made of alkali resistant glass materials and may be hollow. Typical glass microspheres are available from GYPTEK INC., Suite 135, 16 Midlake Blvd SE, Calgary, AB, T2X 2X7, CANADA.

In an embodiment of SCP material for use in the invention, only ceramic microspheres are used throughout the full thickness of the panel. The panel typically contains about 35 to 42 weight % of ceramic microspheres uniformly distributed throughout the thickness of the panel.

In another embodiment of SCP material for use in the invention, a blend of lightweight ceramic and glass microspheres is used throughout the full thickness of the panel. The volume fraction of the glass microspheres in the panel of the second embodiment of the invention will typically be in the range of 0 to 15% of the total volume of the dry ingredients, where the dry ingredients of the composition are the reactive powders (examples of reactive powders: hydraulic cement only; blend of hydraulic cement and pozzolan; or blend of hydraulic cement, calcium sulfate alpha hemihydrate, pozzolan, and lime), ceramic microspheres, polymer microspheres, and alkali-resistant glass fibers. A typical aqueous mixture has a ratio of water-to-reactive powders from greater than 0.3/1 to 0.7/1.

Formulation of SCP Panels

The components used to make the shear resistant panels of the invention include hydraulic cement, calcium sulfate alpha hemihydrate, an active pozzolan such as silica fume, lime, ceramic microspheres, alkali-resistant glass fibers, superplasticizer (e.g., sodium salt of polynapthalene sulfonate), and water. Typically, both hydraulic cement and calcium sulfate alpha hemihydrate are present. Long term durability of the composite is compromised if calcium sulfate alpha hemihydrate is not present along with silica fume. Water/moisture durability is compromised when Portland cement is not present. Small amounts of accelerators and/or retarders may be added to the composition to control the setting characteristics of the green (i.e., uncured) material. Typical non-limiting additives include accelerators for hydraulic cement such as calcium chloride, accelerators for calcium sulfate alpha hemihydrate such as gypsum, retarders such as DTPA (diethylene triamine pentacetic acid), tartaric acid or an alkali salt of tartaric acid (e.g., potassium tartrate), shrinkage reducing agents such as glycols, and entrained air.

Panels of the invention will include a continuous phase in which alkali-resistant glass fibers and light weight filler, e.g., microspheres, are uniformly distributed. The continuous phase results from the curing of an aqueous mixture of the reactive powders, i.e., blend of hydraulic cement, calcium sulfate alpha hemihydrate, pozzolan, and lime), preferably including superplasticizer and/or other additives.

Typical weight proportions of embodiments of the reactive powders (inorganic binder), e.g., hydraulic cement, calcium sulfate alpha hemihydrate, pozzolan and lime, in the invention, based on dry weight of the reactive powders, are shown in TABLE 1. TABLE 1A lists typical ranges of reactive powders, lightweight filler, and glass fibers in compositions of the present invention.

TABLE 1

| Reactive Powder | Weight Proportion % | |
| --- | --- | --- |
| | Broad | Typical |
| Hydraulic Cement | 20-55 | 25-40 |
| Calcium Sulfate Alpha Hemihydrate | 35-75 | 45-65 |
| Pozzolan | 5-25 | 10-15 |
| Lime | up to 3.5 or 0.2 to 3.5 | 0.75-1.25 |

TABLE 1A

| SCP Composition (dry basis) | Typical Weight Proportion (%) | Typical Weight Proportion (%) |
| --- | --- | --- |
| Reactive Powder | 35-70 | 35-68 |
| Lightweight Filler | 20-50 | 23-49 |
| Glass Fibers | 5-20 | 5-17 |

Lime is not required in all formulations of the invention, but it has been found that adding lime provides superior panels and it usually will be added in amounts greater than about 0.2 wt. %. Thus, in most cases, the amount of lime in the reactive powders will be about 0.2 to 3.5 wt. %.

In the a embodiment of an SCP material for use in the invention, the dry ingredients of the composition will be the reactive powders (i.e., blend of hydraulic cement, calcium sulfate alpha hemihydrate, pozzolan, and lime), ceramic microspheres and alkali-resistant glass fibers, and the wet ingredients of the composition will be water and superplasticizer. The dry ingredients and the wet ingredients are combined to produce the panel of the invention. The ceramic microspheres are uniformly distributed in the matrix throughout the full thickness of the panel. Of the total weight of dry ingredients, the panel of the invention is formed from about 49 to 56 wt. % reactive powders, 35 to 42 wt. % ceramic microspheres and 7 to 12 wt. % alkali-resistant glass fibers. In a broad range, the panel of the invention is formed from 35 to 58 wt. % reactive powders, 34 to 49 wt. % lightweight filler, e.g., ceramic microspheres, and 6 to 17 wt. % alkali-resistant glass fibers of the total dry ingredients. The amounts of water and superplasticizer added to the dry ingredients will be sufficient to provide the desired slurry fluidity needed to satisfy processing considerations for any particular manufacturing process. The typical addition rates for water range from about 35 to 60% of the weight of reactive powders and those for superplasticizer range from about 1 to 8% of the weight of reactive powders.

The glass fibers are monofilaments having a diameter of about 5 to 25 microns (micrometers), preferably about 10 to 15 microns (micrometers). The monofilaments typically are combined in 100 filament strands, which may be bundled into rovings of about 50 strands. The length of the glass fibers will typically be about 0.25 to 1 or 2 inches (6.3 to 25.5 or 50.8 mm) or about 1 to 2 inches (25.4 to 50.8 mm) and broadly about 0.25 to 3 inches (6.3 to 76 mm). The fibers have random orientation, providing isotropic mechanical behavior in the plane of the panel.

A second embodiment of an SCP material suitable for use in the invention contains a blend of ceramic and glass microspheres uniformly distributed throughout the full thickness of the panel. Accordingly, the dry ingredients of the composition will be the reactive powders (hydraulic cement, calcium sulfate alpha hemihydrate, pozzolan, and lime), ceramic microspheres, glass microspheres, and alkali-resistant glass fibers, and the wet ingredients of the composition will be water and superplasticizer. The dry ingredients and the wet ingredients will be combined to produce the panel of the invention. The volume fraction of the glass microspheres in the panel will typically be in the range of 7 to 15% of the total volume of dry ingredients. Of the total weight of dry ingredients, the panel of the invention is formed from about 54 to 65 wt. % reactive powders, 25 to 35 wt. % ceramic microspheres, 0.5 to 0.8 wt. % glass microspheres, and 6 to 10 wt. % alkali-resistant glass fibers. In the broad range, the panel of the invention is formed from 42 to 68 wt. % reactive powders, 23 to 43 wt. % lightweight fillers, e.g., ceramic microspheres, 0.2 to 1.0 wt. % glass microspheres, and 5 to 15 wt. % alkali-resistant glass fibers, based on the total dry ingredients. The amounts of water and superplasticizer added to the dry ingredients will be adjusted to provide the desired slurry fluidity needed to satisfy the processing considerations for any particular manufacturing process. The typical addition rates for water range between 35 to 70% of the weight of reactive powders, but could be greater than 60% up to 70% (weight ratio of water to reactive powder of 0.6/1 to 0.7/1), preferably 65% to 75%, when it is desired to use the ratio of water-to-reactive powder to reduce panel density and improve cutability. The amount of superplasticizer will range between 1 to 8% of the weight of reactive powders. The glass fibers are monofilaments having a diameter of about 5 to 25 microns (micrometers), preferably about 10 to 15 microns (micrometers). They typically are bundled into strands and rovings as discussed above. The length of the glass fibers typically is about 1 to 2 inches (25.4 to 50.8 mm) and broadly about 0.25 to 3 inches (6.3 to 76 mm). The fibers will have random orientation providing isotropic mechanical behavior in the plane of the panel.

A third embodiment of SCP material suitable for use in the invention, contains a multi-layer structure in the panel created where the outer layer(s) have improved nailability (fastening ability)/cutability. This is achieved by increasing the water-to-cement ratio in the outer layer(s), and/or changing the amount of filler, and/or adding an amount of polymer microspheres sufficiently small such that the panel remains noncombustible. The core of the panel will typically contain ceramic microspheres uniformly distributed throughout the layer thickness or alternatively, a blend of one or more of ceramic microspheres, glass microspheres and fly ash cenospheres.

The dry ingredients of the core layer of this third embodiment are the reactive powders (typically hydraulic cement, calcium sulfate alpha hemihydrate, pozzolan, and lime), lightweight filler particles (typically microspheres such as ceramic microspheres alone or one or more of ceramic microspheres, glass microspheres and fly ash cenospheres), and alkali-resistant glass fibers, and the wet ingredients of the core layer are water and superplasticizer. The dry ingredients and the wet ingredients will be combined to produce the core layer of the panel of the invention. Of the total weight of dry ingredients, the core of the panel of the invention preferably is formed from about 49 to 56 wt. % reactive powders, 35 to 42 wt. % hollow ceramic microspheres and 7 to 12 wt. % alkali-resistant glass fibers, or alternatively, about 54 to 65 wt. % reactive powders, 25 to 35 wt. % ceramic microspheres, 0.5 to 0.8 wt. % glass microspheres or fly ash cenospheres, and 6 to 10 wt. % alkali-resistant glass fibers. In the broad range, the core layer of the panel of this embodiment of SCP material for use in the present invention is typically formed by about 35 to 58 wt. % reactive powders, 34 to 49 wt. % lightweight fillers, e.g., ceramic microspheres, and 6 to 17 wt. % alkali-resistant glass fibers, based on the total dry ingredients, or alternatively, about 42 to 68 wt. % of reactive powders, 23 to 43 wt. % ceramic microspheres, up to 1.0 wt. %, preferably 0.2 to 1.0 wt. %, other lightweight filler, e.g., glass microspheres or fly ash cenospheres, and 5 to 15 wt. % alkali-resistant glass fibers. The amounts of water and superplasticizer added to the dry ingredients will be adjusted to provide the desired slurry fluidity needed to satisfy the processing considerations for any particular manufacturing process. The typical addition rates for water will range from about 35 to 70% of the weight of reactive powders but will be greater than 60% up to 70% when it is desired to use the ratio of water-to-reactive powders to reduce panel density and improve nailability and those for superplasticizer will range between 1 to 8% of the weight of reactive powders. When the ratio of water-to-reactive powder is adjusted, the slurry composition will be adjusted to provide the panel of the invention with the desired properties.

There is generally an absence of polymer microspheres and an absence of polymer fibers that would cause the SCP panel to become combustible.

The dry ingredients of the outer layer(s) of this third embodiment will be the reactive powders (typically hydraulic cement, calcium sulfate alpha hemihydrate, pozzolan, and lime), lightweight filler particles (typically microspheres such as ceramic microspheres alone or one or more of ceramic microspheres, glass microspheres and fly ash cenospheres), and alkali-resistant glass fibers, and the wet ingredients of the outer layer(s) will be water and superplasticizer. The dry ingredients and the wet ingredients are combined to produce the outer layers of the panel of the invention. In the outer layer(s) of the panel of this embodiment of the present invention, the amount of water is selected to furnish good fastening and cutting ability to the panel. Of the total weight of dry ingredients, the outer layer(s) of the panel of the invention preferably are formed from about 54 to 65 wt. % reactive powders, 25 to 35 wt. % ceramic microspheres, 0 to 0.8 wt. % glass microspheres, and 6 to 10 wt. % alkali-resistant glass fibers. In the broad range, the outer layers of the panel of the invention are formed from about 42 to 68 wt. % reactive powders, 23 to 43 wt. % ceramic microspheres, up to 1.0 wt. % glass microspheres (and/or fly ash cenospheres), and 5 to 15 wt. % alkali-resistant glass fibers, based on the total dry ingredients. The amounts of water and superplasticizer added to the dry ingredients are adjusted to provide the desired slurry fluidity needed to satisfy the processing considerations for any particular manufacturing process. The typical addition rates for water range from about 35 to 70% of the weight of reactive powders and particularly greater than 60% up to 70% when the ratio of water-to-reactive powders is adjusted to reduce panel density and improve nailability, and typical addition rates for superplasticizer will range from about 1 to 8% of the weight of reactive powders. The preferable thickness of the outer layer(s) ranges from about 1/32 to 4/32 inches (0.8 to 3.2 mm) and the thickness of the outer layer when only one is used will be less than 3/8 of the total thickness of the panel.

In both the core and outer layer(s) of this embodiment of the present invention, the glass fibers are monofilaments having a diameter of about 5 to 25 microns (micrometers), preferably 10 to 15 microns (micrometers). The monofilaments typically are bundled into strands and rovings as discussed above. The length typically is about 1 to 2 inches (25.4 to 50.8 mm) and broadly about 0.25 to 3 inches (6.3 to 76 mm). The fiber orientation will be random, providing isotropic mechanical behavior in the plane of the panel.

A fourth embodiment of SCP material for use in the present invention provides a multi-layer panel having a density of 65 to 90 pounds per cubic foot (1.04 to 1.44 g/cc) and capable of resisting shear loads when fastened to framing and comprising a core layer of a continuous phase resulting from the curing of an aqueous mixture, a continuous phase resulting from the curing of an aqueous mixture comprising, on a dry basis, 35 to 70 weight % reactive powder, 20 to 50 weight percent lightweight filler, and 5 to 20 weight % glass fibers, the continuous phase being reinforced with glass fibers and containing the lightweight filler particles, the lightweight filler particles having a particle specific gravity of from 0.02 to 1.00 and an average particle size of about 10 to 500 microns (micrometers); and at least one outer layer of respectively another continuous phase resulting from the curing of an aqueous mixture comprising, on a dry basis, 35 to 70 weight % reactive powder, 20 to 50 weight percent lightweight filler, and 5 to 20 weight % glass fibers, the continuous phase being reinforced with glass fibers and containing the lightweight filler particles, the lightweight filler particles having a particle specific gravity of from 0.02 to 1.00 and an average particle size of about 10 to 500 microns (micrometers) on each opposed side of the inner layer, wherein the at least one outer layer has a higher percentage of glass fibers than the inner layer.

Making a Panel of the Invention

The reactive powders, e.g., blend of hydraulic cement, calcium sulfate alpha hemihydrate, pozzolan, and lime), and lightweight filler, e.g., microspheres, are blended in the dry state in a suitable mixer.

Then, water, a superplasticizer (e.g., the sodium salt of polynapthalene sulfonate), and the pozzolan (e.g., silica fume or metakaolin) are mixed in another mixer for 1 to 5 minutes. If desired, a retarder (e.g., potassium tartrate) is added at this stage to control the setting characteristics of the slurry. The dry ingredients are added to the mixer containing the wet ingredients and mixed for 2 to 10 minutes to form smooth homogeneous slurry.

The slurry is then combined with glass fibers, in any of several ways, with the objective of obtaining a uniform slurry mixture. The cementitious panels are then formed by pouring the slurry containing fibers into an appropriate mold of desired shape and size. If necessary, vibration is provided to the mold to obtain good compaction of material in the mold. The panel is given required surface finishing characteristics using an appropriate screed bar or trowel.

One of a number of methods to make multi-layer SCP panels is as follows. The reactive powders, e.g., blend of hydraulic cement, calcium sulfate alpha hemihydrate, pozzolan, and lime), and lightweight filler, e.g., microspheres, are blended in the dry state in a suitable mixer. Then, water, a superplasticizer (e.g., the sodium salt of polynapthalene sulfonate), and the pozzolan (e.g., silica fume or metakaolin) are mixed in another mixer for 1 to 5 minutes. If desired, a retarder (e.g., potassium tartrate) is added at this stage to control the setting characteristics of the slurry. The dry ingredients are added to the mixer containing the wet ingredients and mixed for 2 to 10 minutes to form a smooth homogeneous slurry.

The slurry may be combined with the glass fibers in several ways, with the objective of obtaining a uniform mixture. The glass fibers typically will be in the form of rovings that are chopped into short lengths. In a preferred embodiment, the slurry and the chopped glass fibers are concurrently sprayed into a panel mold. Preferably, spraying is done in a number of passes to produce thin layers, preferably up to about 0.25 inches (6.3 mm) thick, which are built up into a uniform panel having no particular pattern and with a thickness of ¼ to 1 inch (6.3 to 25.4 mm). For example, in one application, a 3×5 ft (0.91×1.52 m) panel was made with six passes of the spray in the length and width directions. As each layer is deposited, a roller may be used to assure that the slurry and the glass fibers achieve intimate contact. The layers may be leveled with a screed bar or other suitable means after the rolling step. Typically, compressed air will be used to atomize the slurry. As it emerges from the spray nozzle, the slurry mixes with glass fibers that have been cut from a roving by a chopper mechanism mounted on the spray gun. The uniform mixture of slurry and glass fibers is deposited in the panel mold as described above.

If desired the outer surface layers of the panel may contain polymer spheres, or be otherwise constituted, in order that the fasteners used to attach the panel to framing can be driven easily. The preferable thickness of such layers will be about $\frac{1}{32}$ inches to $\frac{4}{32}$ inches (0.8 to 3.2 mm). The same procedure described above by which the core of the panel is made may be used to apply the outer layers of the panel.

Other methods of depositing a mixture of the slurry and glass fibers will occur to those familiar with the panel-making art. For example, rather than using a batch process to make each panel, a continuous sheet may be prepared in a similar manner, which after the material has sufficiently set, can be cut into panels of the desired size. The percentage of fibers relative to the volume of slurry typically constitutes approximately in the range of 0.5% to 3%, for example 1.5%. Typical panels have a thickness of about ¼ to 1½ inches (6.3 to 38.1 mm).

Another method of making panels of the present invention is by using the process steps disclosed in US patent application publication number 2005/0064164 to Dubey et al incorporated herein by reference. US patent application publication number 2005/0064164 to Dubey et al, discloses after one of an initial deposition of loosely distributed, chopped fibers or a layer of slurry upon a moving web, fibers are deposited upon the slurry layer. An embedment device compacts the recently deposited fibers into the slurry, after which additional layers of slurry, then chopped fibers are added, followed by more embedment. The process is repeated for each layer of the board, as desired. Upon completion, the board has a more evenly distributed fiber component, which results in relatively strong panels without the need for thick mats of reinforcing fibers, as taught in prior art production techniques for cementitious panels.

More specifically, US patent application publication number 2005/0064164 to Dubey et al discloses a multi-layer process for producing structural cementitious panels, including: (a.) providing a moving web; (b.) one of depositing a first layer of loose fibers and (c.) depositing a layer of settable slurry upon the web; (d.) depositing a second layer of loose fibers upon the slurry; (e.) embedding the second layer of fibers into the slurry; and (f.) repeating the slurry deposition of step (c.) through step (d.) until the desired number of layers of settable fiber-enhanced slurry in the panel is obtained.

Figure 29:
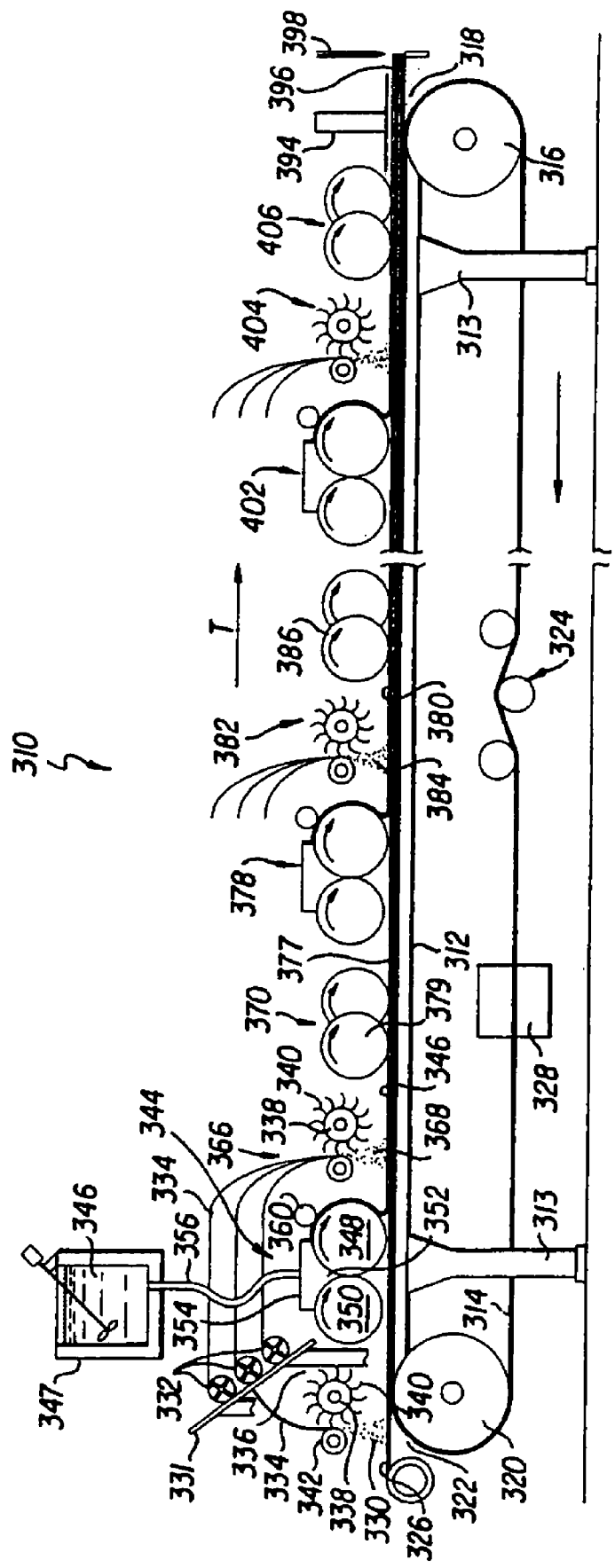
FIG. 29 is a diagrammatic elevational view of an apparatus which is suitable for performing a process for making SCP panels.

FIG. 29 is a diagrammatic elevational view of an apparatus which is suitable for performing the process of US patent application publication number 2005/0064164 to Dubey et al. Referring now to FIG. 29, a structural panel production line is diagrammatically shown and is generally designated 310. The production line 310 includes a support frame or forming table 312 having a plurality of legs 313 or other supports. Included on the support frame 312 is a moving carrier 314, such as an endless rubber-like conveyor belt with a smooth, water-impervious surface, however porous surfaces are contemplated. As is well known in the art, the support frame 312 may be made of at least one table-like segment, which may include designated legs 313. The support frame 312 also includes a main drive roll 316 at a distal end 318 of the frame, and an idler roll 320 at a proximal end 322 of the frame. Also, at least one belt tracking and/or tensioning device 324 is preferably provided for maintaining a desired tension and positioning of the carrier 314 upon the rolls 316, 320.

Also, in the preferred embodiment, a web 326 of Kraft paper, release paper, and/or other webs of support material designed for supporting slurry prior to setting, as is well known in the art, may be provided and laid upon the carrier 314 to protect it and/or keep it clean. However, it is also contemplated that the panels produced by the present line 310 are formed directly upon the carrier 314. In the latter situation, at least one belt washing unit 328 is provided. The carrier 314 is moved along the support frame 312 by a combination of motors, pulleys, belts or chains which drive the main drive roll 316 as is known in the art. It is contemplated that the speed of the carrier 314 may vary to suit the application.

In the apparatus of FIG. 29, structural cementitious panel production is initiated by one of depositing a layer of loose, chopped fibers 330 or a layer of slurry upon the web 326. An advantage of depositing the fibers 330 before the first deposition of slurry is that fibers will be embedded near the outer surface of the resulting panel. A variety of fiber depositing and chopping devices are contemplated by the present line 310. However, FIG. 29 shows a system which employs at least one rack 331 holding several spools 332 of fiberglass cord, from each of which a cord 334 of fiber is fed to a chopping station or apparatus, also referred to as a chopper 336.

The chopper 336 includes a rotating bladed roll 338 from which project radially extending blades 340 extending transversely across the width of the carrier 314, and which is disposed in close, contacting, rotating relationship with an anvil roll 342. In the preferred embodiment, the bladed roll 338 and the anvil roll 342 are disposed in relatively close relationship such that the rotation of the bladed roll 338 also rotates the anvil roll 342, however the reverse is also contemplated. Also, the anvil roll 342 is preferably covered with a resilient support material against which the blades 340 chop the cords 334 into segments. The spacing of the blades 340 on the roll 338 determines the length of the chopped fibers. As is seen in FIG. 29, the chopper 336 is disposed above the carrier 314 near the proximal end 322 to maximize the productive use of the length of the production line 310. As the fiber cords 334 are chopped, the fibers 330 fall loosely upon the carrier web 326.

Next, a slurry feed station, or a slurry feeder 344 receives a supply of slurry 346 from a remote mixing location 347 such as a hopper, bin or the like. It is also contemplated that the process may begin with the initial deposition of slurry upon the carrier 314. The slurry is preferably comprised of varying amounts of Portland cement, gypsum, aggregate, water, accelerators, plasticizers, foaming agents, fillers and/or other ingredients, and described above and in the patents listed above which have been incorporated by reference for producing SCP panels. The relative amounts of these ingredients, including the elimination of some of the above or the addition of others, may vary to suit the use.

Various configurations of slurry feeders 344 are contemplated which evenly deposit a thin layer of slurry 346 upon the moving carrier 314. FIG. 29 shows a slurry feeder 344 which includes a main metering roll 348 disposed transversely to the direction of travel of the carrier 314. A companion or back up roll 350 is disposed in close parallel, rotational relationship to the metering roll 348 to form a nip 352 there between. A pair of sidewalls 354 (FIG. 30, one shown), preferably of non-stick material such as Teflon® brand material or the like, prevents slurry 346 poured into the nip 352 from escaping out the sides of the feeder 344.

The feeder 344 deposits an even, relatively thin layer of the slurry 346 upon the moving carrier 314 or the carrier web 326. Suitable layer thicknesses range from about 0.05 inch to 0.20 inch (0.127 to 0.508 cm). However, with four layers preferred in the preferred structural panel produced by the present process, and a suitable building panel being approximately 0.5 inch (1.27 cm), an especially preferred slurry layer thickness is approximately 0.125 inch (0.318 cm).

Figure 30:
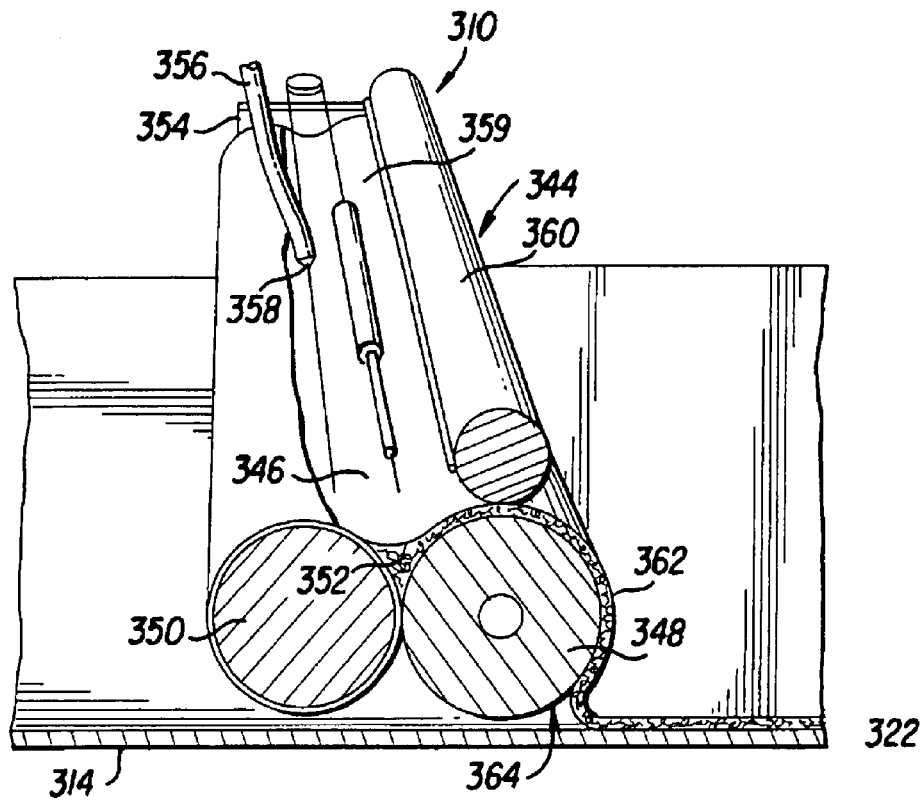
FIG. 30 is a perspective view of a slurry feed station of the type used in a process for making SCP panels.

Referring now to FIGS. 29 and 30, to achieve a slurry layer thickness as described above, several features are provided to the slurry feeder 344. First, to ensure a uniform disposition of the slurry 346 across the entire web 326, the slurry is delivered to the feeder 344 through a hose 356 located in a laterally reciprocating, cable driven, fluid powered dispenser 358 of the type well known in the art. Slurry flowing from the hose 356 is thus poured into the feeder 344 in a laterally reciprocating motion to fill a reservoir 359 defined by the rolls 348, 350 and the sidewalls 354. Rotation of the metering roll 348 thus draws a layer of the slurry 346 from the reservoir 359.

Next, a thickness monitoring or thickness control roll 360 is disposed slightly above and/or slightly downstream of a vertical centerline of the main metering roll 348 to regulate the thickness of the slurry 346 drawn from the feeder reservoir 359 upon an outer surface 362 of the main metering roll 348. Also, the thickness control roll 360 allows handling of slurries with different and constantly changing viscosities. The main metering roll 348 is driven in the same direction of travel "T" as the direction of movement of the carrier 314 and the carrier web 326, and the main metering roll 348, the backup roll 350 and the thickness monitoring roll 360 are all rotatably driven in the same direction, which minimizes the opportunities for premature setting of slurry on the respective moving outer surfaces. As the slurry 346 on the outer surface 362 moves toward the carrier web 326, a transverse stripping wire 364 located between the main metering roll 348 and the carrier web 326 ensures that the slurry 346 is completely deposited upon the carrier web and does not proceed back up toward the nip 352 and the feeder reservoir 359. The stripping wire 364 also helps keep the main metering roll 348 free of prematurely setting slurry and maintains a relatively uniform curtain of slurry.

A second chopper station or apparatus 366, preferably identical to the chopper 336, is disposed downstream of the feeder 344 to deposit a second layer of fibers 368 upon the slurry 346. In the embodiment of FIG. 29, the chopper apparatus 366 is fed cords 334 from the same rack 331 that feeds the chopper 336. However, it is contemplated that separate racks 331 could be supplied to each individual chopper, depending on the application.

Figure 31:
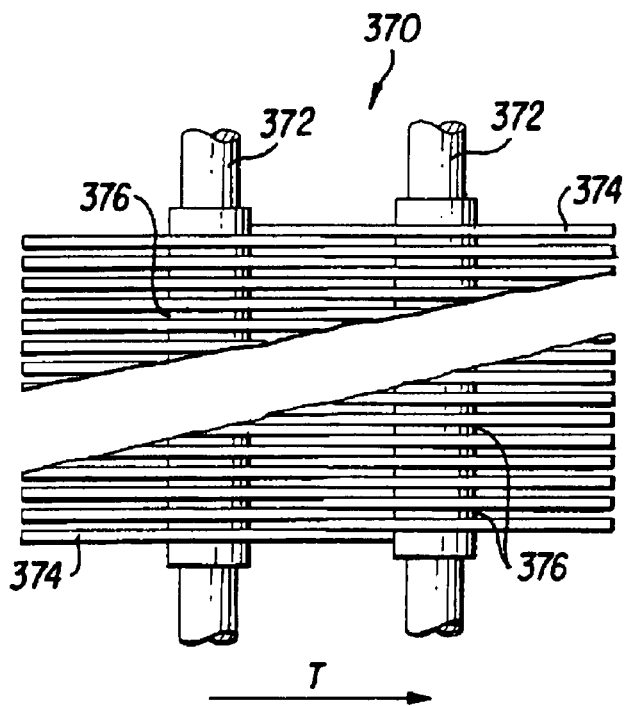
FIG. 31 is a fragmentary overhead plan view of an embedment device suitable for use with a process for making SCP panels.

Referring now to FIGS. 29 and 31, next, an embedment device, generally designated 370 is disposed in operational relationship to the slurry 346 and the moving carrier 314 of the production line 310 to embed the fibers 368 into the slurry 346. While a variety of embedment devices are contemplated, including, but not limited to vibrators, sheep's foot rollers and the like, in the embodiment of FIG. 31, the embedment device 370 includes at least a pair of generally parallel shafts 372 mounted transversely to the direction of travel "T" of the carrier web 326 on the frame 312. Each shaft 372 is provided with a plurality of relatively large diameter disks 374 which are axially separated from each other on the shaft by small diameter disks 376.

During SCP panel production, the shafts 372 and the disks 374, 376 rotate together about the longitudinal axis of the shaft. As is well known in the art, either one or both of the shafts 372 may be powered, and if only one is powered, the other may be driven by belts, chains, gear drives or other known power transmission technologies to maintain a corresponding direction and speed to the driving roll. The respective disks 374, 376 of the adjacent, preferably parallel shafts 372 are intermeshed with each other for creating a "kneading" or "massaging" action in the slurry, which embeds the fibers 368 previously deposited thereon. In addition, the close, intermeshed and rotating relationship of the disks 372, 374 prevents the buildup of slurry 346 on the disks, and in effect creates a "self-cleaning" action which significantly reduces production line downtime due to premature setting of clumps of slurry.

The intermeshed relationship of the disks 374, 376 on the shafts 372 includes a closely adjacent disposition of opposing peripheries of the small diameter spacer disks 376 and the relatively large diameter main disks 374, which also facilitates the self-cleaning action. As the disks 374, 376 rotate relative to each other in close proximity (but preferably in the same direction), it is difficult for particles of slurry to become caught in the apparatus and prematurely set. By providing two sets of disks 374 which are laterally offset relative to each other, the slurry 346 is subjected to multiple acts of disruption, creating a "kneading" action which further embeds the fibers 368 in the slurry 346.

Once the fibers 368 have been embedded, or in other words, as the moving carrier web 326 passes the embedment device 370, a first layer 377 of the SCP panel is complete. In the preferred embodiment, the height or thickness of the first layer 377 is in the approximate range of 0.05-0.20 (0.127 to 0.508 cm) inches. This range has been found to provide the desired strength and rigidity when combined with like layers in a SCP panel. However, other thicknesses are contemplated depending on the application.

To build a structural cementitious panel of desired thickness, additional layers are needed. To that end, a second slurry feeder 378, which is substantially identical to the feeder 344, is provided in operational relationship to the moving carrier 314, and is disposed for deposition of an additional layer 380 of the slurry 346 upon the existing layer 377.

Next, an additional chopper 382, substantially identical to the choppers 336 and 366, is provided in operational relationship to the frame 312 to deposit a third layer of fibers 384 provided from a rack (not shown) constructed and disposed relative to the frame 312 in similar fashion to the rack 331. The fibers 384 are deposited upon the slurry layer 380 and are embedded using a second embedment device 386. Similar in construction and arrangement to the embedment device 370, the second embedment device 386 is mounted slightly higher relative to the moving carrier web 314 so that the first layer 377 is not disturbed. In this manner, the second layer 380 of slurry and embedded fibers is created.

Referring now to FIG. 29, with each successive layer of settable slurry and fibers, an additional slurry feeder station 344, 378, 402 followed by a fiber chopper 336, 366, 382, 404 and an embedment device 370, 386, 406 is provided on the production line 310. In a preferred embodiment, four total layers (see for example, the panel 31 of FIG. 16) are provided to form the SCP panel. Upon the disposition of the four layers of fiber-embedded settable slurry as described above, a forming device 394 is preferably provided to the frame 312 to shape an upper surface 396 of the panel. Such forming devices 394 are known in the settable slurry/board production art, and typically are spring-loaded or vibrating plates which conform the height and shape of the multi-layered panel to suit the desired dimensional characteristics.

The panel made has multiple layers (see for example layers 22, 24, 26, 28 of panel 31 of FIG. 16) which upon setting form an integral, fiber-reinforced mass. Provided that the presence and placement of fibers in each layer are controlled by and maintained within certain desired parameters as is disclosed and described below, it will be virtually impossible to delaminate the panel.

At this point, the layers of slurry have begun to set, and the respective panels are separated from each other by a cutting device 398, which in the embodiment of FIG. 29 is a water jet cutter. Other cutting devices, including moving blades, are considered suitable for this operation, provided that they can create suitably sharp edges in the present panel composition. The cutting device 398 is disposed relative to the line 310 and the frame 312 so that panels are produced having a desired length, which may be different from the representation shown in FIG. 29. Since the speed of the carrier web 314 is relatively slow, the cutting device 398 may be mounted to cut perpendicularly to the direction of travel of the web 314. With faster production speeds, such cutting devices are known to be mounted to the production line 310 on an angle to the direction of web travel. Upon cutting, the separated panels 321 are stacked for further handling, packaging, storage and/or shipment as is well known in the art.

In quantitative terms, the influence of the number of fiber and slurry layers, the volume fraction of fibers in the panel, and the thickness of each slurry layer, and fiber strand diameter on fiber embedment efficiency has been investigated. In the analysis, the following parameters were identified:

$v_T$=Total composite volume
$v_s$=Total panel slurry volume
$v_f$=Total panel fiber volume
$v_{f,l}$=Total fiber volume/layer
$v_{T,l}$=Total composite volume/layer
$v_{s,l}$=Total slurry volume/layer
$N_l$=Total number of slurry layers; Total number of fiber layers
$v_f$=Total panel fiber volume fraction
$d_f$=Equivalent diameter of individual fiber strand
$l_f$=Length of individual fiber strand
t=Panel thickness
$t_l$=Total thickness of individual layer including slurry and fibers
$t_{s,l}$=Thickness of individual slurry layer
$n_{f,l}, n_{f1,l}, n_{f2,l}$=Total number of fibers in a fiber layer
$s_{f,l}{}^P, s_{f1,l}{}^P, s_{f2,l}{}^P$=Total projected surface area of fibers contained in a fiber layer
$S_{f,l}{}^P, S_{f1,l}{}^P, S_{f2,1}{}^P$=Projected fiber surface area fraction for a fiber layer.

Projected Fiber Surface Area Fraction, $S_{f,l}{}^P$

Assume a panel composed of equal number of slurry and fiber layers. Let the number of these layers be equal to $N_l$, and the fiber volume fraction in the panel be equal to $v_f$.

In summary, the projected fiber surface area fraction, $S_{f,l}{}^P$ of a layer of fiber network being deposited over a distinct slurry layer is given by the following mathematical relationship:

$$S_{f,l}^P = \frac{4V_f t}{\pi N_l d_f} = \frac{4V_f * t_{s,l}}{\pi d_f (1 - V_f)}$$

where, $v_f$ is the total panel fiber volume fraction, t is the total panel thickness, $d_f$ is the diameter of the fiber strand, $N_l$ is the total number of fiber layers and $t_{s,l}$ is the thickness of the distinct slurry layer being used.

Accordingly, to achieve good fiber embedment efficiency, the objective function becomes keeping the fiber surface area fraction below a certain critical value. It is noteworthy that by varying one or more variables in the equation, the projected fiber surface area fraction can be tailored to achieve good fiber embedment efficiency.

Different variables that affect the magnitude of projected fiber surface area fraction are identified and approaches have been suggested to tailor the magnitude of "projected fiber surface area fraction" to achieve good fiber embedment efficiency. These approaches involve varying one or more of the following variables to keep projected fiber surface area fraction below a critical threshold value: number of distinct fiber and slurry layers, thickness of distinct slurry layers and diameter of fiber strand.

Based on this fundamental work, the preferred magnitudes of the projected fiber surface area fraction, $S_{f,l}{}^P$, have been discovered to be as follows:

Preferred projected fiber surface area fraction, $S_{f,l}{}^P < 0.65$

Most preferred projected fiber surface area fraction, $S_{f,l}{}^P < 0.45$

For a design panel fiber volume fraction, $v_f$, achievement of the aforementioned preferred magnitudes of projected fiber surface area fraction can be made possible by tailoring one or more of the following variables—total number of distinct fiber layers, thickness of distinct slurry layers and fiber strand diameter. In particular, the desirable ranges for these variables that lead to the preferred magnitudes of projected fiber surface area fraction are as follows:

Thickness of Distinct Slurry Layers in Multiple Layer SCP Panels, $t_{s,l}$

Preferred thickness of distinct slurry layers, $t_{s,l} \leq 0.20$ inches (5.1 mm)

More Preferred thickness of distinct slurry layers, $t_{s,l} \leq 0.12$ inches (3.0 mm)

Most preferred thickness of distinct slurry layers, $t_{s,l} \leq 0.08$ inches (2.0 mm)

Number of Distinct Fiber Layers in Multiple Layer SCP Panels, $N_l$

Preferred number of distinct fiber layers, $N_l \geq 4$

Most preferred number of distinct fiber layers, $N_l \geq 6$

Fiber Strand Diameter, $d_f$

Preferred fiber strand diameter, $d_f \geq 30$ tex

Most preferred fiber strand diameter, $d_f \geq 70$ tex

In using the panels as structural subflooring or flooring underlayment, they preferably will be made with a tongue and groove construction, which may be made by shaping the edges of the panel during casting or before use by cutting the tongue and groove with a router. Preferably, the tongue and groove will be tapered, as shown for example in FIG. 12A, the taper providing easy installation of the panels of the invention.

Properties

The SCP panel metal frame system of the present invention preferably has one or more of the properties listed in TABLES 2A-2D. The properties are for ½ inch (12.7 mm) thick SCP panel unless otherwise indicated.

TABLE 2A

| Physical Characteristics | ASTM Test Method | Unit | Preferred Target Value | Typical Range | Notes |
|---|---|---|---|---|---|
| Non-Combustibility | E-136 | Weight Loss | $\leq 50\%$ | $\leq 50\%$ | From Sec. 8, E-136 |
| | | Temp Rise | $\leq 54°$ F. | $\leq 54°$ F. | From Sec. 8, E-136 |
| | | 30 seconds | No flaming | No flaming | From Sec. 8, E-136 |
| Water Durability Flex. Strength of Sheathing | | | | | |
| Dry | C-947 | psi | $\geq 1800$ | 1400-3500 | |
| Wet | C-947 | psi | $\geq 1650$ | 1300-3000 | |
| AMOE of Sheathing | | | | | |
| Dry | | ksi | $\geq 700$ | 600-1000 | |
| Wet | | ksi | $\geq 600$ | 550-950 | |
| Screw Withdrawal | | | | | (screw size: #8 wire 1-⅝ inch screw with 0.25 inch diameter head minimum |
| ½" Panel-Dry | D-1761 | pounds | 352 | 250-450 | Equiv. to American Plywood Assoc. (APA) S-4 |
| ½" Panel-Wet | D-1761 | pounds | 293 | 200-400 | % of force for SCP relative to OSB 82%; % of force for SCP relative to Plywood 80% |
| ¾" Panel-Dry | D-1761 | pounds | 522 | 450-600 | Equiv. to American Plywood Assoc. (APA) S-4 |
| ¾" Panel-Wet | D-1761 | pounds | 478 | 450-550 | % of force for SCP relative to OSB 82%; % of force for SCP relative to Plywood 80% |

TABLE 2B

| Physical Characteristics | ASTM Test Method | Unit | Preferred Target Value | Typical Range | Notes |
|---|---|---|---|---|---|
| Lateral Screw Resistance | | | | | Screw size: #8 wire 1-⅝ inch screw with 0.25 inch diameter head minimum |
| ½" Panel-Dry | D-1761 | pounds | 445 | 550-350 | Equiv. to APA S-4 |
| ½" Panel-Wet | D-1761 | pounds | 558 | 400-650 | % of force for SCP relative to OSB 73; % of force for SCP relative to Plywood 82% |
| ¾" Panel-Dry | D-1761 | pounds | 414 | 400-500 | Equiv. to APA S-4 |
| ¾" Panel-Wet | D-1761 | pounds | 481 | 400-500 | % of force for SOP relative to OSB 73; % of force for SOP relative to Plywood 82% |
| Static & Impact Test (¾ inch thick SCP | | | | | |
| Ultimate | | | | | |
| Static | E-661 | pounds | 1286 | 1000-1500 | APA S-1; 16 inch o.c. Span Rating ≧550 lbs. |
| Following Impact | E-661 | pounds | 2206 | 1500-3000 | APA S-1; 16 inch o.c. Span Rating ≧400 lbs |
| Deflection under 200 lb. Load | | | | | |
| Static | E-661 | inches | 0.014 | 0.010-0.060 | APA S-1; 16 inch o.c. Span Rating ≦0.078" |
| Following Impact | E-661 | inches | 0.038 | 0.020-0.070 | APA S-1; 16 inch o.c. Span Rating ≦0.078" |
| Uniform Load | | | | | |
| ¾" Panel-Dry | | psf | 330 | 300-450 | 16 inch o.c. Span Rating ≧330 psf |
| Linear Expansion | | | | | |
| ½" to ¾" Panel | APA P-1 | % | ≦0.1 | ≦0.1 | APA P-1 requires ≦0.5% |

TABLE 2C

| Physical Characteristics | ASTM Test Method | Unit | Preferred Target Value | Typical Range | Notes |
|---|---|---|---|---|---|
| Water absorption | | | | | |
| ½" Panel | APA PRP-108 | % | 11.8 | 7 to 15 | % water absorption of SCP relative to ½ inch thick OSB: 51.5%, % water absorption of SCP relative to ½ inch thick Plywood: 46.2% |
| ¾" Panel | APA PRP-108 | % | 10.8 | 7 to 15 | % water absorption of SCP relative to OSB: 51.3%, % water absorption of SCP relative to Plywood: 48.1% |
| Thickness Swell | | | | | |
| ½" Panel | APA PRP-108 | % | 2.3 | 1 to 5 | % water absorption of SCP relative to ½ inch thick OSB: 22.2%, % water absorption of SCP relative to ½ inch thick Plywood: 7.8% |

TABLE 2C-continued

| Physical Characteristics | ASTM Test Method | Unit | Preferred Target Value | Typical Range | Notes |
|---|---|---|---|---|---|
| ¾" Panel | APA PRP-108 | % | 2.4 | 1 to 5 | % water absorption of SCP relative to OSB: 22.2%, % water absorption of SCP relative to Plywood: 7.8% |
| Mold & Bacteria Resistance | | | | | |
| ½ to ¾" Panel | G-21 | | 0 | 0-1 | OSB & Plywood have food source |
| ½ to ¾" Panel | D-3273 | | 10 | 10 | OSB & Plywood have food source |
| Termite Resistance | | | | | |
| ½ to ¾" Panel | | | No food source | No food source | |

TABLE 2D

| Physical Characteristics | ASTM Test Method | Unit | Preferred Target Value | Typical Range | Notes |
|---|---|---|---|---|---|
| Horizontal Design Shear Capacity of the SCP Diaphragm | | | | | |
| ¾" Panel- 10' × 20' Frame | E-455 | pounds per linear foot | 487.2 | 300-1000 Typically 400-800 | Performance relates to panel properties, joist depth & spacing and fastener type and spacing |
| System Fire Resistance | | | | | |
| ⅝ to ¾" SCP Panel on one side of metal frame | E-119 | Time | 1 hr and 10 min. | 1 to 1.5 hr. | Nominal 4" deep stud, 24" O.C., batt insulation, 1 layer ⅝" FIRECODE Gypsum Board available from USG. |
| ¾" Panel SCP on one side of metal frame | E-119 | Time | 2 hr-9 min. | 2 hr. | Nominal 10" deep joist, 24" O.C., batt insulation, 1 layer ⅝" FIRECODE Gypsum Board available from USG |

Horizontal Design Shear Capacity in TABLE 2D provides for a safety factor of 3.

A system having ⅜-¾ inch (9-19 mm), e.g. ½ inch (12.5 mm), thick SCP panels mechanically and/or adhesively laterally braced metal framing when tested according to ASTM E-72 typically has a nominal wall shear capacity (also known as nominal racking shear strength) of 200 to 1200, or 400 to 1200, or 800 to 1200 pounds per linear foot (298 to 1786, or 595 to 1786, or 1190 to 1786 kg per linear meter).

A typical ¾ inch (19 mm) thick panel when tested according to ASTM E661 and APA S-1 test methods over a span of 16 inches (406.4 mm) on centers, has an ultimate load capacity greater than 550 lb (250 kg), under static loading, an ultimate load capacity greater than 400 lb (182 kg) under impact loading, and a deflection of less than 0.078 inches (1.98 mm) under both static and impact loading with a 200 lb (90.9 kg) load.

After curing for 28 days, the flexural strength of a 0.75 inch (1.9 cm) thick SCP panel having a dry density of 65 lb/ft³ (1.04 g/cm³) to 90 lb/ft³ (1.44 g/cm³) or 65 lb/ft³ (1.04 g/cm³) to 95 lb/ft³ (1.52 g/cm³) after being soaked in water for 48 hours should be at least 1000 psi (7 MPa), e.g. at least 1300 psi (9 MPa) preferably at least 1650 psi (11.4 MPa), more preferably at least 1700 psi (11.7 MPa), as measured by ASTM C 947. The panel should retain at least 75% of its dry strength.

Typically the SCP horizontal floor diaphragm system has a higher specific stiffness than a floor system of open web bar joists, metal deck and poured in place concrete or precast plank with a topping slab on load bearing walls. Also, typically the present system provides higher specific stiffness than wooden floor systems.

Typically the horizontal shear diaphragm load carrying capacity of the system will not be lessened by more than 25%, preferably not be lessened by more than 20%, when exposed to water in a test wherein a 2 inch head of water is maintained over ¾ inch (1.9 cm) thick SCP panels fastened on a 10 foot by 20 foot (3.05 by 6.1 m) metal frame for a period of 24 hours.

Typically the system will not absorb more than 0.7 pounds per square foot (3.4 kg/sq. m) of water when exposed to water in a test wherein a 2 inch (5.1 cm) head of water is maintained over ¾ inch (1.9 cm) thick SCP panels fastened on a 10 foot by 20 foot (3.05 by 6.1 m) metal frame for a period of 24 hours.

Typically an embodiment of the present system having a 10 foot wide by 20 foot long by ¾ inch thick (3.05 m by 6.1 m×1.9 cm) diaphragm of the SCP panels attached to a 10 foot by 20 foot (3.05 by 6.1 m) metal frame will not swell more than 5% when exposed to a 2 inch (1.9 cm) head of water maintained over the SCP panels fastened on the metal frame for a period of 24 hours.

Typically, every component of the present system meets ASTM G-21 in which the system achieves approximately a 1 and meets ASTM D-3273 in which the system achieves approximately a 10. Also, typically the present system supports substantially zero bacteria growth when clean. Also, typically the present system is inedible to termites.

Due to its being lightweight and strong, this combination of the present floor system of a horizontal diaphragm of ¾ inch (1.9 cm) thick SCP panel on metal frame permits efficient use of building volume for a given building footprint to permit maximization of building volume for the given building footprint. The lightweight nature of this system avoids the dead load associated with pan/cement systems. Less dead load allows building comparable size structures on less stable soil. Moreover, the system may be non-directional, in that the panels of the system may be placed with their long dimension parallel or perpendicular to the metal joists of the frame without losing strength or load carrying characteristics. Thus, the ability of the system to support dead and live loads without failure is the same regardless of the orientation of the SCP panel on the metal framing. Also, a potential advantage of the present system is that it may have greater compressive strength. This is useful in building where the walls of the structure rest on portions of the system, e.g., the perimeter of the floor diaphragm formed by the panels. As multiple stories are added the weight of those stories can exert very high compressive forces on the lower floor panels.

The present invention has an unexpected advantage in cold weather performance. Conventional cementitious panels can be brittle in cold weather. Thus, installing such panels in cold weather would require careful handling by the construction workers during installation. However, in the present system the SCP panels can preferably withstand being installed on metal flooring elements when the ambient temperature is less than 32 degrees F. (0 degrees C.), or even less than 20 degrees F. (minus 7.5 degrees C.) without cracking. This is a very significant advantage because it facilitates building in harsh climates in winter thus increasing builder productivity. The present SCP panels can preferably withstand being subjected to normal rough treatment during installation at these cold temperatures. For instance, at these cold temperatures placing the SCP panel may include a step of dropping the panel on the metal flooring elements, e.g., trusses, such that at least one end of the panel falls in free fall at least 2 feet (61 cm), typically at least 3 feet (91 cm), for example, 3 to 6 feet (91 to 183 cm) without cracking. For example, this occurs when one end of the panel is placed on one or more metal flooring elements and then the opposing other end is released to drop in free fall on one or more metal flooring elements.

EXAMPLES

In Examples 1-5 experiment were conducted for fire endurance testing on comparative structural sheathing in the small-scale horizontal furnace (SSHF). Five samples, ½ inch (13 mm). Structural Cement Panel (SCP) of a composition of the present invention, ¾ in. (19 mm) VIROC panel, ½ in. (13 mm) NOVATECH panel (also an SCP panel), 15/32 in. (12 mm) plywood (grade A-C) and 31/64 in. (12 mm) Oriented Strand Board (OSB), were tested as part of 4 ft. by 4 ft. (1.2 by 1.2 m) assemblies.

Each assembly was constructed of metal framing, 20 gauge 358 CR runners and 358 ST studs spaced 24 in. on center. The test material was applied to the exposed surface and one layer of USG's SHEETROCK ⅝ in. (16 mm) FIRECODE Type SCX gypsum wallboard was applied to the unexposed surface for each of the five tests. The exposed surface material is applied perpendicular to the studs with a joint at the mid-span of the assembly. Thermocouples were placed in both cavities underside of the exposed panel and on the unexposed surface for temperature comparison of the assemblies. The furnace temperatures were controlled to the ASTM E119 Time/Temperature Curve. Temperature measurements were made of the finish rating and the unexposed surface for the duration of the test. Observations were made as to the estimated condition of the exposed surface during the test. Standard ASTM E119 temperature limits for the thermocouple readings were 250° F. (136° C.) above ambient for the average and 325° F. (183° C.) above ambient for the individual were used as control limits. The purpose of the testing was to provide a relative comparison of the performance of product material in the fire test. The procedure does not provide a fire endurance rating for a system.

The formulation of the SCP panels used in the small-scale horizontal furnace test is as follows in TABLE 2E:

TABLE 2E

| Ingredient | Weight Proportion (%) |
| --- | --- |
| Reactive Powder Blend | |
| Portland Cement | 29 |
| Calcium Sulfate Alpha Hemihydrate | 58 |
| Silica Fume | 12 |
| Lime | 1 |
| SCP Cementitious Composition | |
| Portland Cement | 12.3 |
| Calcium Sulfate Alpha Hemihydrate | 24.7 |
| Silica Fume | 5.1 |
| Lime | 0.4 |

TABLE 2E-continued

| Ingredient | Weight Proportion (%) |
|---|---|
| Ceramic Microspheres | 26.4 |
| Superplasticizer | 1.9 |
| Water | 21.9 |
| Alkali-Resistant Glass Fibers[1] | 7.2 |

[1]Weight proportion corresponds to 3.06% volume fraction of AR Glass Fibers in the composite
Length of glass fibers used in the small-scale horizontal furnace test-40 mm.

The results from testing of the five samples can be found in TABLE 3. Both the average (A) and the individual (I) readings are in minutes when the temperature criteria limits were exceeded during each test. The SCP board has a composition of a panel of the present invention.

TABLE 3

Data Summary for Examples 1-5

| SSHF Example No. | Sample ID | Finish Rating (Minutes) | Unexposed Surface (Overlimit/ Minutes | Exposed Surface Condition: End of Test |
|---|---|---|---|---|
| 1 | ½ in. (13 mm) SCP board | 09:24 (A) 10:05 (I) | 46:05 (A) 46:16 (I) | Intact Low Shrinkage |
| 2 | ¾ in. (19 mm) VIROC board | 19:16 (A) 21.52 (I) | 48:42 (A) 47:49 (I) | Intact Moderate Shrinkage |
| 3 | ½ in. (13 mm) NOVATECH board | 12:52 (A) 13 27 (I) | 46:42 (A) 47:13 (I) | Panel Delamination No Fall Off |
| 4 | 15/32 in. (12 mm) Plywood board (A-C Grade) | 6:40 (A) 7:10 (I) | 23:42 (A) 23:31 (I) | Board Fall Off |
| 5 | 31/64 in. (12 mm) OSB board | 6:50 (A) 8:12 (I) | 24.25 (A) 23:30 (I) | Board Fall Off |

Example 1

Sample Construction

Size 48 in. (122 cm) by 48⅝ in. (124 cm)
Studs: 358 ST, 20 gauge Spacing: 24 in. (61 cm) on center
Runners: 358 CR, 20 gauge; Cavity: Void
Facing: (Fire Side) One layer ½ in. (13 mm) USG Structural Cement Panel (SCP); (Unexposed Side) One layer ⅝ in. (16 mm) SHEETROCK® FIRECODE® (Type X) panel
TABLE 4 lists the boards employed in this example as test materials. The boards were subjected to heating as presented in TABLE 5. Observations from this heating are presented in TABLE 6.

TABLE 4

Example 1 Test Materials

| | ½" (13 mm) SCP ½" × 48" × 96" (13 mm × 122 cm × 244 cm) | SHEETROCK ® Brand Wallboard ⅝" × 48" 120" (16 mm × 122 cm × 305 cm) Type C |
|---|---|---|
| Lbs/1000 sq. ft | 2736 | 2290 |
| Average board thickness, in. (mm) | 0.528 (13.4) | 0.620 (15.7) |
| Average density, pcf (g/cc) | 62.128 (0.995) | 44.332 (0.710) |
| Average panel weight, lbs. (kgs.) | 22.46 (10.19) | 37.13 (16.84) |

TABLE 5

Example 1 Temperature Information

| | Average | Individual |
|---|---|---|
| Unexposed Surface Limiting Temperature Criteria Degrees 79° F. (29° C.) Ambient | 324° F. (182° C.) | 399° F. (229° C.) |
| Unexposed Surface Temperature Limits Reached | 46:05 (min:sec) | TC #4 at 46:16 (min:sec) |
| Finish Rating Limiting Temperature Criteria Degrees 79° F. (29° C.) Ambient | 323° F. (182° C.) | 398° F. (229° C.) |
| Finish Rating Temperature Limits Reached | 9:24 (min:sec) | TC #8 at 10:05 (min:sec) |

FIRE TEST DURATION: 70 MIN, 0 SEC.
TEST TERMINATED: No Board Fall Off

TABLE 6

Example 1 Observations

| Time (Min:Sec) | Furnace Pressure | Observations |
|---|---|---|
| 4:00 | +0.10 | The exposed board is very light tan in color. |
| 12:00 | +0.07 | Very light smoke and steam vapor emitting from unexposed surface. |
| 18:00 | +0.08 | Butt joint opening is at estimated 1/16 inch max. More smoke and steam vapor emitting from unexposed surface. |
| 22:00 | +0.08 | Very heavy smoke and steam vapor emitting from unexposed surface. Exposed board looks good and is in place. |
| 30:00 | +0.06 | Butt joint opening is at estimated ⅛ inch max. |
| 33:00 | +0.08 | Board sag in between the studs is at estimated ⅛ inch to ¼ inch max. |
| 38:00 | +0.07 | Light smoke and steam vapor emitting from unexposed surface. |
| 41:00 | +0.10 | Board sag in between the studs is at estimated ⅛ to ¼ inch max. |
| 48:00 | +0.07 | Butt joint opining is at 3/16 to ¼ inch max. |
| 51:00 | +0.08 | Board sag in between the studs is at estimated ½ inch max. |
| 53:00 | +0.09 | Can hear audible sound of paper burning on unexposed surface. |
| 63:00 | +0.08 | Board sag in between the studs is at estimated ½ to ⅝ inch max. |
| 70:00 | | Test terminated. No board fall off. |

Example 2

Sample Construction

Size 48 in. (122 cm) by 48⅝ in. (124 cm)
Studs: 358 ST, 20 gauge Spacing: 24 in. (61 cm) on center
Runners: 358 CR, 20 gauge; Cavity: Void
Facing: (Fire Side) One layer ¾ in. VIROC Board (Unexposed Side) One layer ⅝ in. (16 mm) SHEETROCK® FIRECODE® (Type X) panel
TABLE 7 lists the boards employed in this example as test materials. The boards were subjected to heating as presented in TABLE 8. Observations from this heating are presented in TABLE 9.

TABLE 7

Example 2 Test Materials

| | VIROC Board ¾" × 48" × 48-⅝" (13 mm × 122 cm × 124 cm) | SHEETROCK ® Brand Wallboard ⅝" × 48" × 120" (16 mm × 122 cm × 305 cm) Type X |
|---|---|---|
| Lbs/1000 sq. ft | — | 2290 |
| Average board thickness, inches (mm) | 0.760 (19) | 0.620 (15.7) |
| Average density, pcf (g/cc) | 83.00 (1.33) | 44.344 (0.710) |
| Average panel weight, lbs. (kgs.) | 22.46 (10.19) | 37.13 (16.84) |

TABLE 8

Example 2 Temperature Information

| | Average | Individual |
|---|---|---|
| Unexposed Surface Limiting Temperature Criteria Degrees 73° F. (26° C.) Ambient | 323° F. (182° C.) | 398° F. (229° C.) |
| Unexposed Surface Temperature Limits Reached | 48:42 (min:sec) | TC #4 at 47:49 (min:sec) |
| Finish Rating Limiting Temperature Criteria Degrees 79° F. (29° C.) Ambient | 325° F. (183° C.) | 400° F. (230° C.) |
| Finish Rating Temperature Limits Reached | 19:16 (min:sec) | TC #8 at 21:52 (min:sec) |

FIRE TEST DURATION: 60 MIN, 0 SEC.
TEST TERMINATED: No Board Fall Off

TABLE 9

Example 2 Observations

| Time (Min:Sec) | Furnace Pressure | Observations |
|---|---|---|
| 2:30 | +0.08 | The butt joint is smoking and is dark brown in color. Smoke emitting from unexposed surface. |
| 6:00 | +0.08 | Exposed board is charred and black in color. Butt joint opening is an estimated ⅛ inch max. Board crack by west perimeter by center stud. |
| 9:00 | +0.08 | Exposed board is lightly flaming on the entire surface. Butt joint opening is at estimated 3/16 inch to ¼ inch max. Board sag is at estimated ¼ inch to ⅜ inch max. |
| 12:30 | +0.08 | Board sag is at estimated ½ inch to ¾ inch max. Butt joint opening is at estimated ½ inch max. and is peeling away towards fire. Surface is still lightly flaming. |
| 18:00 | +0.08 | Board is still flaming on entire surface. Smoke and steam vapor is emitting from unexposed surface. |
| 19:30 | +0.08 | Butt joint opening is at estimated 1 inch max. and peeling away. Board sag is estimated 1 ½ inch max. Exposed board is still flaming. |
| 24:00 | +0.08 | Butt joint opening is at estimated 1 ½ to 2 inches max. The west board has a crack across the center by stud. Center board screws have pulled away from center stud. |
| 29:00 | +0.08 | Crack opening in the center of the west board is at estimated ½ inch max. Board sag is at estimated 2 ½ to 3 inches max. The board is still flaming. Smoke and steam vapor are emitting from unexposed surface. |
| 34:00 | +0.07 | Board sag is at estimated 4 inches max. East board has a crack at the center by the stud. |
| 40:00 | +0.08 | West board is sagged towards fire an estimated 5 inches max. East board crack opening is an estimated ⅝ inches max. Board is still flaming. |
| 43:00 | +0.08 | Board sample is peeling away towards fire at estimated 5-6 inches max. The sample cavity is seen due to board peel away. |
| 50:00 | +0.0 | Board sag is at estimated 6 to 7 inches max. and still peeling towards fire. Butt joint opening is at estimated 3 inches max. East and west center board cracks are at estimated 1 ½ inches max. |
| 60:00 | | Test terminated. No board fall off. |

Example 3

Sample Construction

Size 48 in. (122 cm) by 48⅝ in. (124 cm)
Studs: 358 ST, 20 gauge Spacing: 24 in. (61 cm) on center
Runners: 358 CR, 20 gauge; Cavity: Void
Facing: (Fire Side) One layer ½ inch NovaTech Board (Unexposed Side) One layer ⅝ in. (16 mm) SHEETROCK® FIRECODE® (Type X) panel.

TABLE 10 lists the boards employed in this example as test materials. The boards were subjected to heating as presented in TABLE 11. Observations from this heating are presented in TABLE 12.

TABLE 10

Example 3 Test Materials

| | NovaTech Board 314" × 48" × 48-⅝" (13 mm × 122 cm × 124 cm) | SHEETROCK ® Brand Brand Wallboard ⅝" × 48" × 120" (16 mm × 122 cm × 305 cm) Type X |
|---|---|---|
| Lbs/1000 sq. ft | 3163 | 2298 |
| Average board thickness, in. (mm) | 0.531 (13) | 0.620 (15.7) |
| Average density, pcf (g/cc) | 71.544 (1.15) | 44.517 (0.713) |
| Average panel weight, lbs. (kgs.) | 25.90 (11.75) | 37.25 (16.9) |

TABLE 11

Example 3 TEMPERATURE INFORMATION

| | Average | Individual |
|---|---|---|
| Unexposed Surface Limiting Temperature Criteria Degrees 74° F, (26° C.) Ambient | 324°F. (182° C.) | 399° F. (229° C.) |
| Unexposed Surface Temperature Limits Reached | 46:42 (min:sec) | TC #2 at 47:13 (min:sec) |
| Finish Rating Limiting Temperature Criteria Degrees 76° F, (27° C.) Ambient | 326° F. (183° C.) | 401° F. (231° C.) |
| Finish Rating Temperature Limits Reached | 12:52 (min:sec) | TC #8 at 13:27 (min:sec) |

FIRE TEST DURATION: 70 MIN, 0 SEC.
TEST TERMINATED—Board Delamination, No Board Fall Off

TABLE 12

Example 3 Observations

| Time (Min:Sec) | Furnace Pressure | Observations |
|---|---|---|
| 2:30 | +0.07 | Exposed south half of west board popped apart and delaminated and has fallen off. Estimated ¼ inch of board thickness is still in place at the cold junction. Exposed glass fibers are seen on remaining board. |
| 8:00 | +0.07 | Light smoke and steam vapor emitting from unexposed surface. |
| 18:00 | +0.08 | More smoke and steam vapor emitting from unexposed surface. More board cracks by center stud screws |
| 24:00 | +0.07 | Heavy smoke and steam vapor emitting from unexposed surface. Butt joint is at estimated 3/16 to ¼ inch max. Northeast corner board is peeling away towards furnace and is estimated at ¼ inch max. Board thickness is falling off |
| 32:00 | +0.07 | Less smoke and steam vapor emitting from unexposed surface. |
| 35:00 | +0.07 | Butt joint opening is at estimated ⅜ inch max. |
| 37:00 | +0.08 | Estimated ¼ inch thick by 12 inch by 24 inch Board has fallen at corner of north east board |
| 45:30 | +0.08 | Very light smoke and steam vapor is emitting from unexposed surface. Exposed board sag is at estimated ½ to ⅝ inch max |
| 53:00 | +0.07 | Butt joint opening is at estimated ⅜ inch to ½ inch max. |
| 57:00 | +0.08 | Unexposed wall board is starting to get brown in color over butt joint location. Very little smoke and steam vapor emitting from unexposed surface |
| 61:00 | +0.07 | Board sag is at estimated 1 to 1 ½ inches max. |
| 63:00 | +0.10 | Hair cracks starting on southeast section of board |
| 65:00 | +0.09 | Butt joint opening is at estimated ½ inches max. |
| 67:00 | +0.10 | More exposed board peeling at northeast section. Total board delamination is an estimated 15% max |
| 70:00 | | Test terminated. Some board delamination. No board fall off. |

Example 4

Sample Construction

Size 48 in. (122 cm) by 48⅝ in. (124 cm)
Studs: 358 ST, 20 gauge; Spacing: 24 in. (61 cm) on center
Runners: 358 CR, 20 gauge; Cavity: Void
Facing: (Fire Side) One layer 15/32 inch (12 mm) Plywood (A/C) Board; (Unexposed Side) One layer ⅝ in. (16 mm) SHEETROCK® FIRECODE® (Type X) panel.
TABLE 13 lists the boards employed in this example as test materials. The boards were subjected to heating as presented in TABLE 14. Observations from this heating are presented in TABLE 15.

TABLE 13

Example 4 Test Materials

| | Plywood Board 15/32" × 48" × 48-⅝" (16 mm × 122 cm × 124 cm) | SHEETROCK ® Brand Wallboard ⅝" × 48" × 120" (16 mm × 122 cm × 305 cm) Type X |
|---|---|---|
| Lbs/1000 sq. ft | 1644 | 2283 |
| Average board thickness, in. (mm) | 0.499 (12.6 mm) | 0.619 (16) |
| Average density, pcf (g/cc) | 39.544 (0.633) | 44.242 (0.709) |
| Average panel weight, lbs. (kgs.) | 52.50 (28.8) | 37.00 (16.78) |

TABLE 14

Example 4 Temperature Information

| | Average | Individual |
|---|---|---|
| Unexposed Surface Limiting Temperature Criteria Degrees 73° F. (26° C.) Ambient | 323° F. (182° C.) | 398° F. (229° C.) |
| Unexposed Surface Temperature Limits Reached | 23:42 (min:sec) | TC #3 at 23:31 (min:sec) |
| Finish Rating Limiting Temperature Criteria Degrees 76° F. (27° C.) Ambient | 325° F. (183° ) | 400° F. (230° C.) |
| Finish Rating Temperature Limits Reached | 6:40 (min:sec) | TC #7 at 7:10 (min:sec) |

FIRE TEST DURATION: 32 MIN, 0 SEC.
TEST TERMINATED: Board Fall Off

TABLE 15

Example 4 Observations

| Time (Min:Sec) | Furnace Pressure | Observations |
|---|---|---|
| 0:30 | +0.06 | Exposed boards are black in color, burnt charred surface. |
| 2:00 | +0.04 | Heavy smoke emitting from unexposed surface. |
| 4:00 | +0.08 | Exposed boards are flaming. Very heavy smoke emitting from unexposed surface. |
| 6:00 | +0.08 | Butt joint opening is at estimated ¼ in. max. |
| 8:00 | +0.08 | Very heavy flaming seen through furnace view ports. Sample can not be seen. |
| 9:00 | +0.07 | Exposed ½ inch plywood has fallen in furnace. Cavity is now exposed. |
| 14:00 | +0.08 | Still very heavy smoke and steam vapor emitting from unexposed surface. |
| 19:00 | +0.08 | The exposed wallboard has hairline haze cracking seen from exposed cavity. |
| 28:00 | +0.07 | Less smoke and steam vapor emitting from unexposed surface. The unexposed side wallboard is now brown in color. |
| 32:00 | | Test terminated. Board has fallen off. |

Example 5

Sample Construction

Size 48 in. (122 cm) by 48⅝ in. (124 cm)
Studs: 358 ST, 20 gauge; Spacing: 24 in. (61 cm) on center
Runners: 358 CR, 20 gauge; Cavity: Void
Facing: (Fire Side) One layer 31/64 inch (1.2 cm) Oriented Strand Board (OSB); (Unexposed Side) One layer ⅝ in. (16 mm) SHEETROCK® FIRECODE® (Type X) panel.
TABLE 16 lists the boards employed in this example as test materials. The boards were subjected to heating as presented in TABLE 17. Observations from this heating are presented in TABLE 18.

TABLE 16

Example 5 Test Materials

| | OSB Board 15/32" × 48" × 48-⅝" (12 mm × 122 cm × 124 cm) | SHEETROCK ® Brand Wallboard ⅝" × 48" × 120" (16 mm × 122 cm × 305 cm) Type X |
|---|---|---|
| Lbs/1000 sq. ft | 1644 | 2283 |
| Average board thickness, in. (cm) | 0.499 (12.6 mm) | 0.619 (0.157) |

TABLE 16-continued

Example 5 Test Materials

| | OSB Board 15/32" × 48" × 48-5/8" (12 mm × 122 cm × 124 cm) | SHEETROCK ® Brand Wallboard 5/8" × 48" × 120" (16 mm × 122 cm × 305 cm) Type X |
|---|---|---|
| Average density, pcf (g/cc) | 39.544 (0.633) | 44.242 (0.709) |
| Average panel weight, lbs. (kgs.) | 52.50 (28.8) | 37.00 (16.78) |

TABLE 17

Example 5 Temperature Information

| | Average | Individual |
|---|---|---|
| Unexposed Surface Limiting Temperature Criteria Degrees 77° F. (28° C.) Ambient | 327° F. (184° C.) | 402° F. (231° C.) |
| Unexposed Surface Temperature Limits Reached | 24:25 (min:sec) | TC #3 at 23:30 (min:sec) |
| Finish Rating Limiting Temperature Criteria Degrees 80° F. (30° C.) Ambient | 330° F. (186° C.) | 405° F. (233° C.) |
| Finish Rating Temperature Limits Reached | 6:50 (min:sec) | TC #8 at 8:12 (min:sec) |

FIRE TEST DURATION: 32 MIN, 0 SEC.
TEST TERMINATED: Board Fall Off

TABLE 18

Example 5 Observations

| Time (Min:Sec) | Furnace Pressure | Observations |
|---|---|---|
| 1:00 | +0.02 | Exposed board is smoking and black in color |
| 1:30 | +0.08 | Smoke is heavy, emitting from unexposed surface |
| 3:00 | +0.07 | The entire board is flaming. Surface is hard. |
| 5:00 | +0.08 | Butt joint opening is at estimated 1/8 to 1/4 inches max. |
| 6:00 | +0.08 | Very heavy smoke emitting from unexposed surface. |
| 8:00 | +0.15 | Board sag is at estimated 1 inch max. Still is flaming. |
| 9:30 | +0.08 | Exposed board has fallen out. Remaining perimeter boards still flaming. Exposed wallboard is seen from exposed cavity. |
| 15:00 | +0.07 | Still heavy smoke and steam emitting from unexposed surface. |
| 19:00 | +0.08 | Board crack running along the center stud on the unexposed surface. |
| 23:00 | +0.07 | Smoke and steam is starting to decrease at unexposed surface. |
| 25:00 | +0.08 | Unexposed board crack running the stud length is at estimated 1/8 inches max. |
| 29:00 | +0.07 | Hairline haze cracking is seen on wallboard viewed from exposed cavity. |
| 31:00 | +0.07 | The unexposed surface wallboard is now dark brown in color. Little smoke and steam vapor emitting from unexposed surface. |
| 32:00 | | Test terminated. Board has fallen off. |

Example 6

This example determines the horizontal diaphragm strength of a single floor diaphragm constructed as explained below using a Prototype 3/4 inch (1.9 cm) thick SCP panel by ASTM E 455-98 Static Load Testing of Framed Floor or Roof Diaphragm Construction for Buildings, single beam method.

Test Specimen Materials

A. Floor Diaphragm Materials:

Prototype 3/4" (1.9 cm) SCP—Structural Cement Panel of the present invention reinforced with fiberglass strands. A "V"-groove and tongue is located along the 8' dimension of the 4'×8' (122×244 cm) sheets. The formulation used in the SCP panel examples of this floor diaphragm test is listed in TABLE 18A.

TABLE 18A

| Ingredient | Weight Proportion (%) |
|---|---|
| Reactive Powder Blend | |
| Portland Cement | 29 |
| Calcium Sulfate Alpha Hemihydrate | 58 |
| Silica Fume | 12 |
| Lime | 1 |
| SCP Cementitious Composition | |
| Portland Cement | 12.2 |
| Calcium Sulfate Alpha Hemihydrate | 24.4 |
| Silica Fume | 5.1 |
| Lime | 0.4 |
| Ceramic Microspheres | 27.4 |
| Superplasticizer | 1.9 |
| Water | 24.2 |
| Alkali-Resistant Glass Fibers[1] | 4.4 |

[1]Weight proportion corresponds to 1.8% volume fraction of Alkali Resistant Glass Fibers in the composite.
Length of glass fibers used in the floor diaphragm test-36 mm.

Fasteners—#8-18×1 5/8" long (4.1 cm) BUGLE HEAD GRABBER SUPER DRIVE™ screws spaced 6" (15 cm) o.c. along the perimeter, and 12" (30 cm) o.c. in the field of the panels. All fasteners were placed a minimum of 3/4 inches in from panel edges and 1/2 inch (1.3 cm) in from seams. At panel corners the fasteners were inset 2 inches (5.1 cm).

Adhesive—ENERFOAM SF polyurethane foam adhesive manufactured by Flexible Products Company of Canada, Inc. was applied to all butt-joints, and tongue and groove joints. One (1) 3/8" (0.95 cm) bead was applied to the bottom of the groove before setting into place. A 3/8" gap was left at the butt-joint to allow one (1) 3/8" (0.95 cm) bead of adhesive to be applied in the gap, before sliding the joint together.

Figure 17:
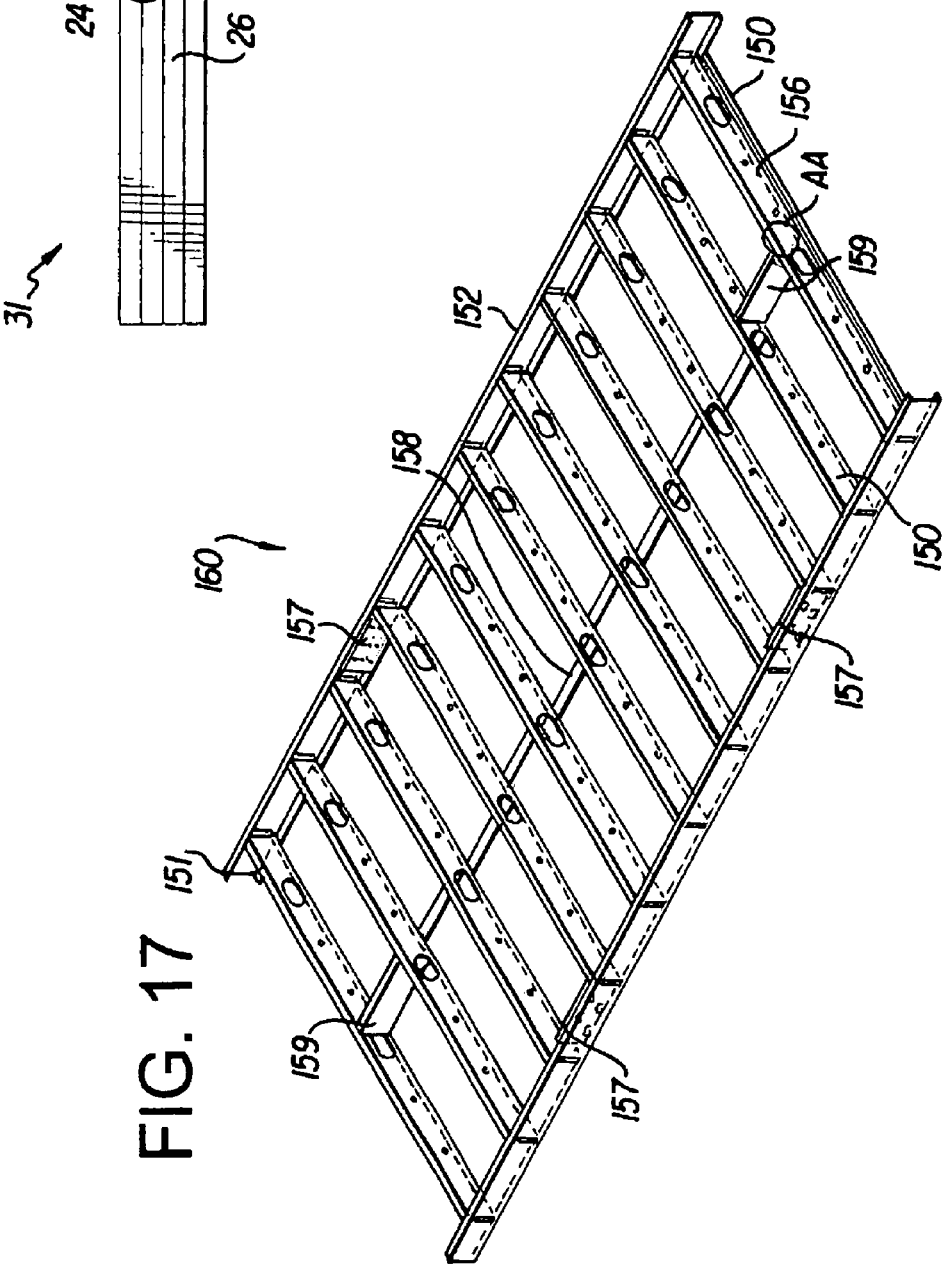
FIG. 17 shows assembled metal, e.g., steel, floor framing.

B. Floor Framing:

FIG. 17 shows assembled metal, e.g., steel, floor framing 160. This includes the following parts:

A. Transverse Joists 150—16 gauge×10 inches (25.4 cm) deep×10 foot (3.05 m) long TRADE READY™ Joists manufactured by Dietrich Industries. The joists were stamped Dietrich TDW5 W10 IN×L 10 FT 28324013 16 GAUGE G60 50KSI.

B. Longitudinal Rim Track 152—16 gauge×10 3/16" (25.9 cm) deep×16' (4.88 m) long manufactured by Dietrich Industries with pre-bent joist attachment locations spaced at 24" (0.61 m) o.c. The track was stamped Dietrich TD16 W 9 1/4 IN×L 16 FT 28323858 16 GAUGE 3 RD FI.

C. 0.125" thick×2"×2" (0.32×5.08×5.08 cm) steel angles 154 (FIG. 18) are located on each of the transverse end joists 156 spaced starting at the bearing side and spanning up to 3 inches (7.6 cm) from the load side angel and fixed to the respective end transverse joists with #10-1" (2.54 cm) DRIVALL screws at 6" (15.24 cm) o.c.

D. Fasteners

10-16×¾" (1.9 cm) long hex-head, DRIVALL screws for attaching framing.

10-16×¾" (1.9 cm) long wafer head, self-drilling screws for attaching to framing 6" (15.24 cm) on center (o.c.) around the outermost edge and on both sides of the butt joints.

Test Specimen Construction

One (1) test sample was constructed to an overall dimension of 10'-0"×20'-0" (3.05×6.1 m). FIG. 8 shows a perspective view of the metal frame.

Figure 17A:
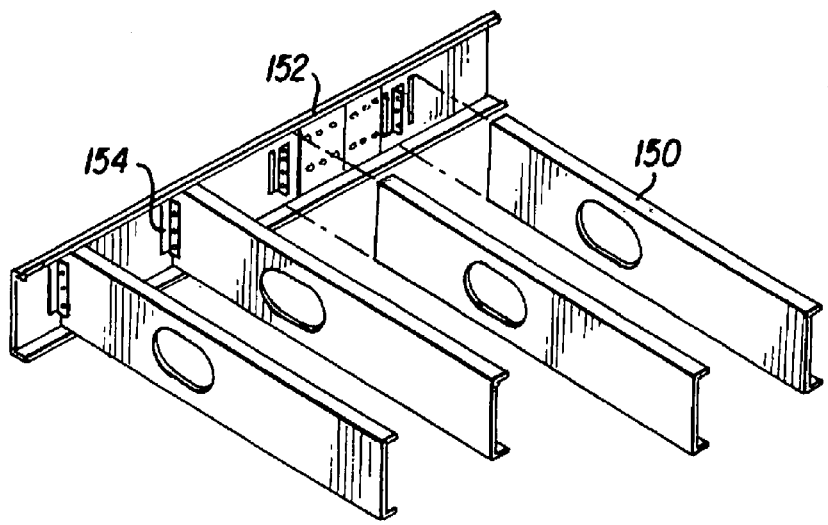
FIG. 17A shows attachment of the C-joist metal framing members to a header.

FIG. 17A shows an enlarged view of a portion of the frame of FIG. 17.

Figure 18:
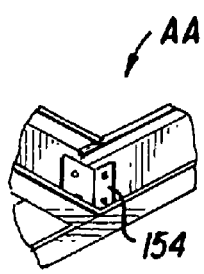
FIG. 18 shows an enlarged view of a portion of the frame of FIG. 17.

FIG. 18 shows an enlarged view of a portion AA of the frame of FIG. 17.

Figure 19:
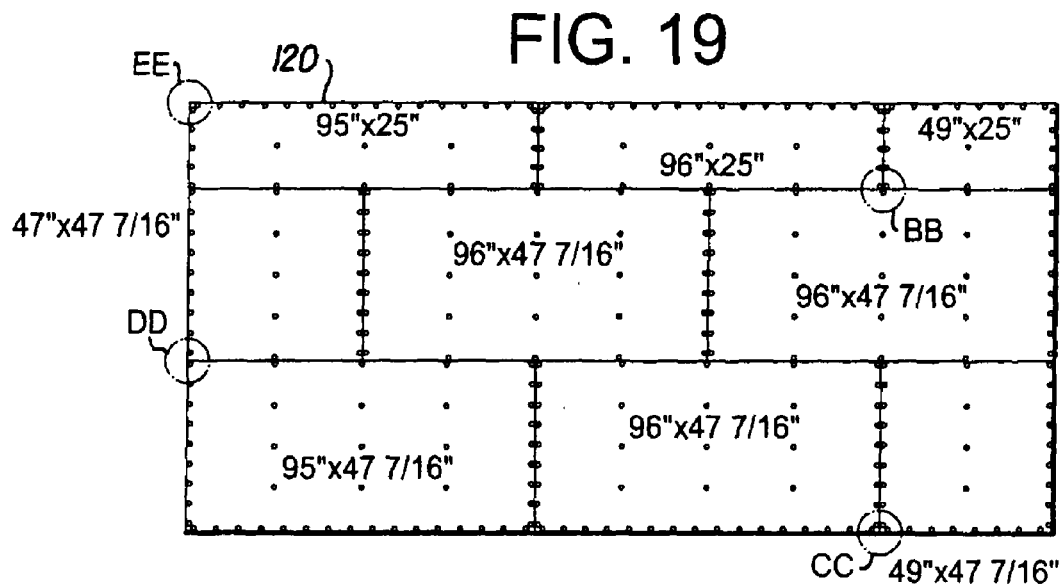
FIG. 19 shows a test SCP panel floor system configuration attached to the metal frame of FIG. 17.
Figure 20:
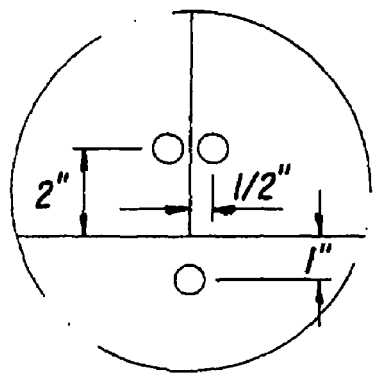
FIGS. 20, 21, 22 and 23 show enlarged views of respective portions of the floor of FIG. 19.
Figure 22:
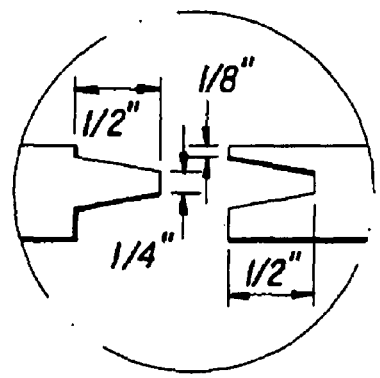
Figure 21:
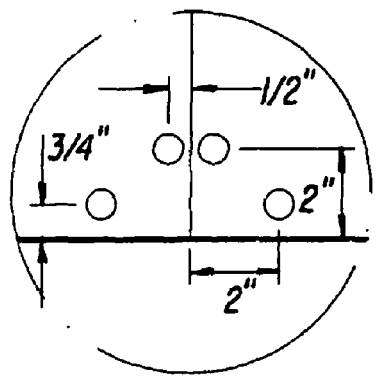
Figure 23:
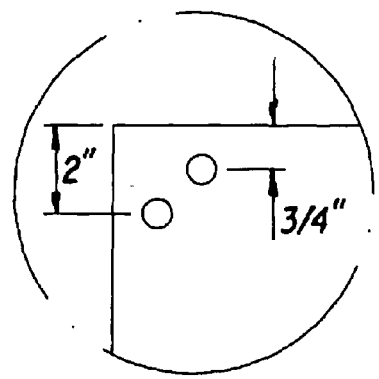

FIG. 19 shows a top view of the SCP panels 120 (with panel dimensions), but manufactured to have tongue and groove edges (not shown) attached to the metal frame.

FIGS. 20, 21, 22 and 23 show enlarged views of respective portions BB, CC, DD and EE of the floor of FIG. 19.

A. The joists were attached to the rim track using three (3) hex head #10-16×¾" (1.9 cm) long DRIVALL screws into the side of the joist through the pre-bent tab and one (1) #10-16× ¾" (1.9 cm) long wafer head self-drilling screws through the top of rim track into the joist, at each end. 0.078" thick×1½"× 4" (0.2×3.8×10.2 cm) steel angles 151 which are 5" (12.7 cm) long were also fastened to the respective joist 1" (2.54 cm) o.c. with ¾ inch (1.9 cm) long DRIVALL screws and one ¾ inch (1.9 cm) long DRIVALL screw to the rim track.

B. 1½ inch×2⅝ inch×21¾ inch (3.8×6.7×145 cm) KATZ blocking 158 with a 2 inch long×1¾ inch (5.1×4.5 cm) tab on each end was fastened to the bottom of the joists across the center line of the floor. The blocking 158 was attached using (1) #10-16×¾" (1.9 cm) long DRIVALL screw through the end of each Katz blocking member 158. In particular, the Katz blocking 158 is located between transverse joints 150 by being positioned staggered on either side of the midpoint and attached by one #10-16×¾ inch (1.9 cm) long DRIVALL screw per tab.

C. Additional horizontal blocking was added, in two locations, to the rim track 152 on the load side to strengthen the rim track 152 for point loading purposes. Namely, 24 inch blocking 157 for load support is provided along the longitudinal rim track between a number of transverse joists 150. 20 inch long blocking 159 is fixed between each transverse end joist 156 and the respective penultimate transverse end joist 150 generally along the longitudinal axis of the frame with four #10-16×¾ inch (1.9 cm) long DRIVALL screws on each end.

D. The frame was squared and then the prototype SCP panel was fastened to it as shown in FIG. 19. The prototype SCP was fastened at 6" o.c. (15.2 cm) around the perimeter inset 2" from the corners, and 12 inches o.c. (30.5 cm) in the field with #8-18×1⅝ inch long (4.1 cm) Bugle head GRABBER SUPER DRIVE™ screws (winged self drilling screws 162). Care was taken to ensure that the fasteners were kept flush or slightly below the surface of the prototype SCP and also did not strip out in the steel framing. At the butt-joints and tongue and groove locations, a ⅜ inch (0.95 cm) bead of ENERFOAM SF polyurethane foam adhesive manufactured by Flexible Products Company of Canada, Inc. was applied in the joint.

E. ⅛"×2"×2" (0.32×5.1×5.1 cm) angle iron was then fastened to the end joists flush to the bottom of the joists to minimize crumpling of the joists at the bearings and to represent the top plate member. An additional 6 inches long angle was fastened at the bearing side of the end joists flush to the top of the joist also to minimize crumpling.

F. The test sample set for a minimum of 36 hours to allow the adhesive to cure.

Figure 24:
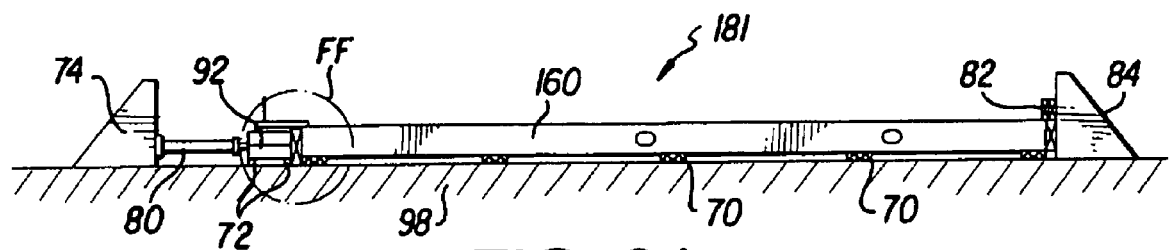
FIG. 24 shows the frame of FIG. 17 having the attached shear wall of FIG. 9 mounted on a shear wall diaphragm testing apparatus.

G. FIG. 24 shows the test sample 181, made of frame 160 of FIG. 17 having the attached floor 120 of FIG. 19, supported by appliance rollers 70 at 2 foot (0.6 m) on center (o.c.) around the perimeter of the sample 181 on a concrete floor 98 (FIG. 17).

Figure 25:
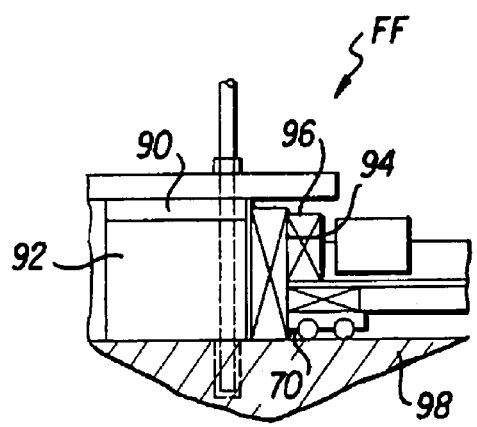
FIG. 25 shows an enlarged view of a portion of the apparatus of FIG. 24.

FIG. 25 shows an enlarged view of portion FF of FIG. 24. A bearing support 74, 84 was placed at both ends of the test sample 181. Three (3) loading cylinders 80 were located on the opposite side of the test sample 181. The load was applied from the cylinders 80 through steel-beams, to six (6) 18 inch (46 cm) bearing blocks to uniformly apply the load to the floor test sample 181. Five (5) dial indicators were placed along the bearing side of the test sample 181 to measure deflections. FIG. 24 shows hold down 92 provided with spacers 90. A gap 96 of about ⅛ inch (0.32 cm), and an 18 inch (46 cm) load block 94. The hold down 92 is mounted in cement 98. Another hold down 82 is provided at the other end of the test sample 181. The hold down 92 is supported on solid rollers 72.

Test Equipment

A. Three (3) ENERPAC Model P-39 hydraulic hand pumps.

B. Three (3) ENERPAC Model RC-1010 hydraulic cylinders.

C. Five dial indicators: 2 inches movement-0.001 inch increments.

D. Three (3) Omega digital meters.

E. Three (3) Omega pressure transducers.

F. Three (3) 6 ft. I-beams.

G. Five (5) rigid bearings bolted to floor.

Procedure

A. The loads were generated using three (3) 1½ inch (3.8 cm) diameter×10 inches (25.4 cm) stroke hydraulic cylinders 80, one at each load point. The applied forces were measured with three (3) digital meters and pressure transducers. A permanent record of the applied forces was made on the attached data sheets.

B. The loads were generated by applying hydraulic pressure to create mechanical force until the required load was indicated on the digital meters.

C. The entire floor assembly was loaded in increments of 700 lbs (317.5 kg). Each load was held for 1 minute before the deflection readings were taken. After the 14,000 lbs. (6350 kg) deflection reading was taken, the assembly was then loaded at a rate of approximately 2800 pounds (1270 kg) per minute, until a failure occurred.

Figure 27:
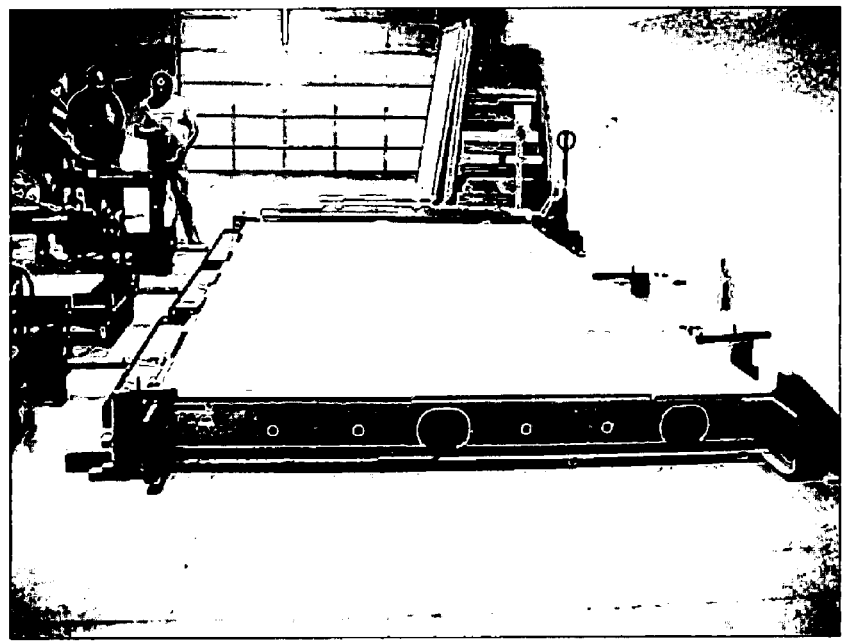
FIG. 27 shows a photograph of the SCP panel and metal frame shear wall mounted on the test apparatus of FIG. 24 at design load.

FIG. 27 shows a photograph of the SCP panel and metal frame floor mounted on the test apparatus of FIG. 24 at design load.

Figure 28:
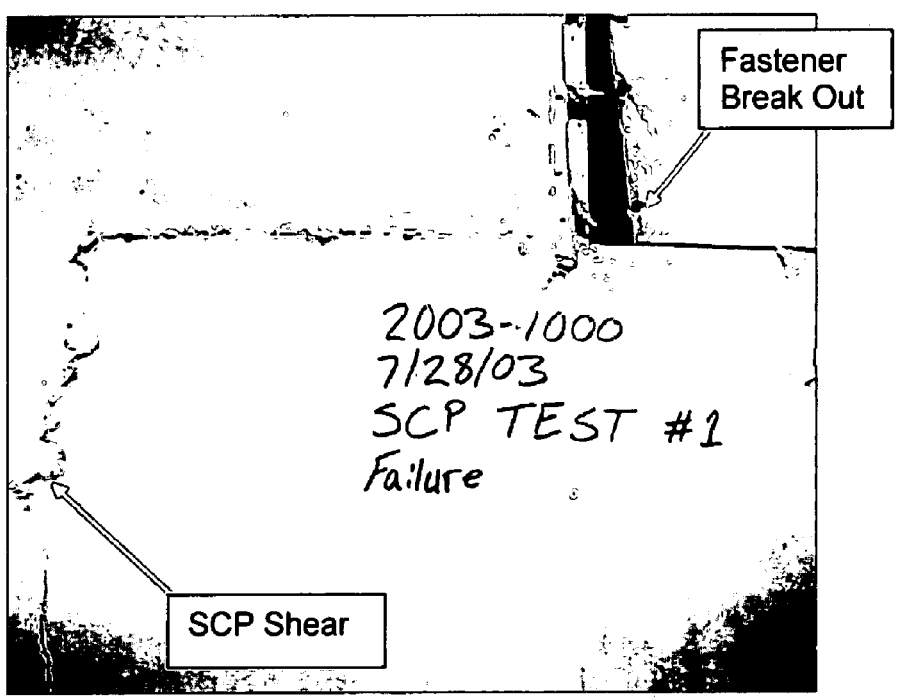
FIG. 28 shows a photograph of the SCP panel and metal frame shear wall mounted on the test apparatus of FIG. 24 at failure.

FIG. 28 shows a photograph of the SCP panel and metal frame floor mounted on the test apparatus of FIG. 24 at failure.

Test Results

TABLE 19 shows the results of a Floor Diaphragm Test of applying loads to the above-described entire floor assembly. The floor having a width of 120 inches (3.05 m).

Using a factor of safety of 3.0 the following values were obtained.

Ultimate Load=14,618.5 lbs./10.0 ft.=1,461.8 PLF (pounds per linear foot)(2,175 kg/linear meter)

Design Shear=1461.8/3.0 safety factor=487.2 PLF (725 kg per linear meter)

Design shear is calculated by dividing the ultimate load by a safety factor of 3.

TABLE 19

Floor Diagram Test
Floor Width: 120 inches (3.05 m); Design Load: 420 P.L.F. (estimated)

| Loading Increments | Total Ceiling Load (lbs.) | Floor Test Loads | | |
|---|---|---|---|---|
| | | Load No. 1 (lbs.) | Load No. 2 (lbs.) | Load No. 3 (lbs.) |
| No Load | 0 | 0 | 0 | 0 |
| 1 | 700 | 233 | 233 | 233 |
| 2 | 1400 | 467 | 467 | 467 |
| 3 | 2100 | 700 | 700 | 700 |
| 4 | 2800 | 933 | 933 | 933 |
| 5 | 3500 | 1167 | 1167 | 1167 |
| 6 | 4200 | 1400 | 1400 | 1400 |
| 7 | 4900 | 1633 | 1633 | 1633 |
| 8 | 5600 | 1867 | 1867 | 1867 |
| 9 | 6300 | 2100 | 2100 | 2100 |
| 10 | 7000 | 2333 | 2333 | 2333 |
| 11 | 7700 | 2567 | 2567 | 2567 |
| Design Load | 8400 | 2800 | 2800 | 2800 |
| 13 | 9100 | 3033 | 3033 | 3033 |
| 14 | 9800 | 3267 | 3267 | 3267 |
| 15 | 0500 | 3500 | 3500 | 3500 |
| 16 | 1200 | 3733 | 3733 | 3733 |
| 17 | 11900 | 3967 | 3967 | 3967 |
| 18 | 14000 | 4667 | 4667 | 4667 |
| Ultimate Load Design Load 487.3 P.L.F. | 29237 | 9717 | 9750 | 9770 |

Figure 26:
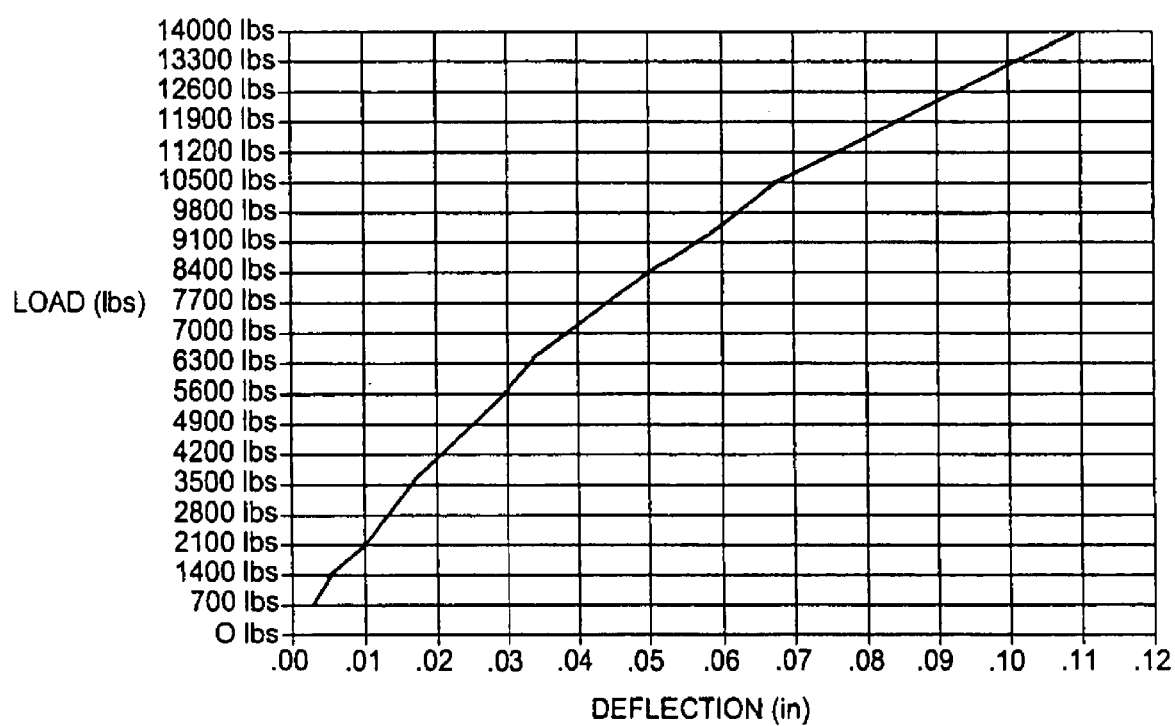
FIG. 26 shows experimental load versus deflection data from an example employing the floor diaphragm testing apparatus of FIG. 24.

TABLE 20 shows Resultant Deflection occurring due to the application of loads to the floor. FIG. 26 graphs the data of TABLE 20. FIG. 26 shows experimental load versus deflection data from the floor diaphragm test using ¾ inch (1.9 cm) structural cement panel (SCP panel) employing the floor diaphragm testing apparatus of FIG. 24.

TABLE 20

Temp. & Humidity During Construction: 71° F./32% Temp. & Humidity During Test: 73° F./35%; Sample Description: Prototype ¾ inch (1.9 cm) SCP adhered to 16 gauge- 10 inches (25.4 cm) steel joists, using ENERFOAM SF polyurethane foam adhesive

| Time Load/ Reading | Loading Increments | Load (lbs.) | Floor Test Loads | | | | | | RD* |
|---|---|---|---|---|---|---|---|---|---|
| | | | Clear Span | | | | | | |
| | | | Indicator #2 | | Indicator #3 | | Indicator #4 | | |
| | | | Read** | Def*** | Read** | Def*** | Read** | Def*** | |
| 9:30 | No Load | 0 | 0.100 | | 0.100 | | 0.100 | | |
| 9:31/9:32 | 1 | 700 | 0.168 | 0.068 | 0.155 | 0.055 | 0.133 | 0.033 | 0.003 |
| 9:33/9:34 | 2 | 1400 | 0.185 | 0.085 | 0.169 | 0.069 | 0.151 | 0.051 | 0.005 |
| 9:35/9:36 | 3 | 2100 | 0.203 | 0.103 | 0.185 | 0.085 | 0.163 | 0.063 | 0.009 |
| 9:37/9:38 | 4 | 2800 | 0.219 | 0.119 | 0.199 | 0.099 | 0.174 | 0.074 | 0.013 |
| 9:39/9:40 | 5 | 3500 | 0.231 | 0.131 | 0.210 | 0.110 | 0.184 | 0.084 | 0.016 |
| 9:41/9:42 | 6 | 4200 | 0.242 | 0.142 | 0.222 | 0.122 | 0.194 | 0.094 | 0.021 |
| 9:43/9:44 | 7 | 4900 | 0.253 | 0.153 | 0.233 | 0.133 | 0.204 | 0.104 | 0.025 |
| 9:45/9:46 | 8 | 5600 | 0.265 | 0.165 | 0.244 | 0.144 | 0.214 | 0.114 | 0.030 |
| 9:47/9:48 | 9 | 6300 | 0.276 | 0.176 | 0.255 | 0.155 | 0.224 | 0.124 | 0.034 |
| 9:49/9:50 | 10 | 7000 | 0.288 | 0.188 | 0.267 | 0.167 | 0.234 | 0.134 | 0.039 |
| 9:51/9:52 | 11 | 7700 | 0.300 | 0.200 | 0.279 | 0.179 | 0.244 | 0.144 | 0.045 |
| 9:53/9:54 | Design Load | 8400 | 0.311 | 0.211 | 0.290 | 0.190 | 0.255 | 0.155 | 0.050 |
| 9:55/9:56 | 13 | 9100 | 0.321 | 0.221 | 0.302 | 0.202 | 0.264 | 0.164 | 0.057 |
| 9:57/9:58 | 14 | 9800 | 0.334 | 0.234 | 0.314 | 0.214 | 0.275 | 0.175 | 0.062 |
| 9:59/10:00 | 15 | 10500 | 0.346 | 0.246 | 0.327 | 0.227 | 0.290 | 0.190 | 0.067 |
| 10:01/10:02 | 16 | 11200 | 0.359 | 0.259 | 0.343 | 0.243 | 0.306 | 0.206 | 0.076 |
| 10:03/10:04 | 17 | 11900 | 0.373 | 0.273 | 0.360 | 0.260 | 0.327 | 0.227 | 0.084 |
| 10:05/10:06 | 18 | 14000 | 0.412 | 0.312 | 0.413 | 0.313 | 0.387 | 0.287 | 0.111 |

Mode of Failure: End #2 - butt joint separation on the 4' (1.2 m) sheet in the middle row, and at the 95-½" (2.43 m) sheet on the load side as the tongue and groove joint slipped. Secondary Failure - Board shear about 6' (15.2 cm) in from the end on the bearing side (See FIG. 20).
*RD is an abbreviation for resultant deflection. The resultant deflection is equal to the average deflection of the bearings minus the greatest point of deflection across the clear span. FIG. 18 shows the data graphically.
**Read is an abbreviation for Reading
***Def. is an abbreviation for Deflection TABLE 21 shows average bearing deflection from applying loads at bearing points to the test sample floor.

Based on the data obtained from this single test sample a design shear of 487.2 PLF (pounds per linear foot) (725 kg per linear meter) can be achieved from the above-described single floor diaphragm sample.

TABLE 21

| Time Load/ Reading | Loading Increments | Load (lbs.) | Bearing Points | | | | Average Bearing Def*** |
|---|---|---|---|---|---|---|---|
| | | | Indicator #1 | | Indicator #5 | | |
| | | | Read** | Def*** | Read** | Def*** | |
| 9:30 | No Load | 0 | 0.000 | | 0.100 | | |
| 9:31/9:32 | 1 | 700 | 0.080 | 0.080 | 0.125 | 0.025 | 0.053 |
| 9:33/9:34 | 2 | 1400 | 0.096 | 0.096 | 0.132 | 0.032 | 0.064 |
| 9:35/9:36 | 3 | 2100 | 0.113 | 0.113 | 0.138 | 0.038 | 0.076 |
| 9:37/9:38 | 4 | 2800 | 0.127 | 0.127 | 0.145 | 0.045 | 0.086 |
| 9:39/9:40 | 5 | 3500 | 0.137 | 0.137 | 0.151 | 0.051 | 0.094 |
| 9:41/9:42 | 6 | 4200 | 0.145 | 0.145 | 0.158 | 0.058 | 0.102 |
| 9:43/9:44 | 7 | 4900 | 0.152 | 0.152 | 0.165 | 0.065 | 0.109 |
| 9:45/9:46 | 8 | 5600 | 0.158 | 0.158 | 0.171 | 0.071 | 0.115 |
| 9:47/9:48 | 9 | 6300 | 0.166 | 0.166 | 0.177 | 0.077 | 0.122 |
| 9:49/9:50 | 10 | 7000 | 0.174 | 0.174 | 0.183 | 0.083 | 0.129 |
| 9:51/9:52 | 11 | 7700 | 0.179 | 0.179 | 0.190 | 0.090 | 0.135 |
| 9:53/9:54 | Design Load | 8400 | 0.185 | 0.185 | 0.195 | 0.095 | 0.140 |
| 9:55/9:56 | 13 | 9100 | 0.191 | 0.191 | 0.200 | 0.100 | 0.146 |
| 9:57/9:58 | 14 | 9800 | 0.197 | 0.197 | 0.207 | 0.107 | 0.152 |
| 9:59/10:00 | 15 | 10500 | 0.203 | 0.203 | 0.217 | 0.117 | 0.160 |
| 10:01/10:02 | 16 | 11200 | 0.208 | 0.208 | 0.226 | 0.126 | 0.167 |
| 10:03/10:04 | 17 | 11900 | 0.214 | 0.214 | 0.238 | 0.138 | 0.176 |
| 10:05/10:06 | 18 | 14000 | 0.227 | 0.227 | 0.278 | 0.178 | 0.203 |

**Read is an abbreviation for Reading
***Def is an abbreviation for Deflection

Example 7

This example determines the effect of water exposure on the horizontal diaphragm strength of an assembly using ¾" inch (1.9 cm) thick SCP panel by ASTM E455-98 Static Load Testing of Framed Floor or Roof Diaphragm Construction for Buildings, single beam method.

Test Specimen Materials

A. Floor Diaphragm Materials:

¾ inch (1.9 cm) SCP panel reinforced with fiberglass strands. A "V"-groove and tongue are located along the 8' (2.4 m) dimension of the 4 foot×8 foot (1.2×2.4 m) sheets.

Fasteners employed included #8-18×1⅝ inch (4.1 cm) long Bugle head GRABBER SUPER DRIVE screws, available for GRABBER Construction Products, spaced 6 inches on center along the perimeter, and 12 inches on center in the field of the panels. All fasteners were placed a minimum of ¾ inches (1.9 cm) in from the panel edges and /1;2 inches (1.3 cm) from the seams. At panel corners the fasteners were inset 2 inches (5.1 cm). See FIG. 19 for fastener locations.

B. Floor Framing:

Joists included CSJ 16 gauge×8 inches deep×10 foot (16 gauge×20 cm×305 cm) rim track manufactured by Dietrich Industries.

Test Specimen Construction

Four (4) test samples were constructed to an overall dimension of 10'-0"×20'-0" (3.05×6.1 m) as was the test sample described above in Example 6. FIG. 17 shows a perspective view of a metal frame 160 similar to the frame used in this experiment.

The frame was squared and then the prototype SCP panel was fastened to it as shown in FIG. 19. The prototype SCP was fastened at 6" inches (15.2 cm) on center (o.c.) around the perimeter and inset 2 inches from the corners, 12 inches o.c. (30.5 cm) in the field with #8-18×⅝" (4.1 cm) long Bugle head Grabber SuperDrive screws (winged self drilling screws 162). Care was taken to ensure that the fasteners were kept flush or slightly below the surface of the prototype SCP and also did not strip out in the steel framing. In contrast to the test sample of Example 6, at the butt-joints and tongue and groove locations, a ⅜ inch (0.95 cm) bead of ENERFOAM SF polyurethane foam adhesive manufactured by Flexible Products Company of Canada, Inc. was not applied in the joint.

Test Equipment

A. Four (4) ENERPAC Model P-39 hydraulic hand pumps

B. Four (4) ENERPAC Model RC-1010 hydraulic cylinders

C. Five (5) dial indicators 2" movement—0.001 inch increments

D. Four (4) OMEGA digital meters

E. Four (4) OMEGA pressure transducers

F. Four (4) 6 ft I-Beams

G. Six (6) rigid bearings bolted to the floor

Procedure

A. Two of the test assemblies were tested in an "as received", or dry condition and two samples were tested after a 1" (2.54 cm) head of water was present for a minimum of 24 hours.

B. The loads were generated using four (4) 1½" (3.8 cm) diameter hydraulic cylinders, one at each loading point. The applied forces were measured with four (4) calibrated digital meters and pressure transducers. A permanent record of the applied forces was made on the attached data sheets.

C. The loads were generated be applying hydraulic pressure to create mechanical force until the required load was indicated on the digital meters.

D. The entire floor assembly was loaded in increments of 700 lbs. Each load was held for 1 minute before the deflection readings were taken. After the 14000 lb (6350 kg) deflection reading was taken, the assembly was then loaded at a rate of approximately 2800 pounds (1270 kg) per minute, until a failure occurred.

Test Results

TABLES 22-36 show the results of the floor diaphragm tests of applying loads to the above described entire floor assembly.

The floor had a width of 120 inches (305 cm).

Using a factor of safety of 3.0, the following values were obtained.

Average ultimate load of dry samples=15,908.2 lb/10 ft=1,590.8 PLF (2367 kg/linear m)

Design Shear of dry samples=1,590.8 PLF/3.0 safety factor=530.2 PLF (789 kg/linear m)

Average ultimate load of wet samples=14,544.5 lb/10 ft=1,454.4 PLF (2164 kg/linear m)

Design Shear of wet samples=1,454.4 PLF/3.0 safety factor=484.8 PLF (721 kg/linear m)

These results indicate than approximately 91% retention of diaphragm strength after continuous exposure to water for a 24 hour time period.

TABLE 22

Floor Diaphragm Test; Floor width 120 inches (304 cm); Design Load 420 P.L.F. 625 kg/linear m)(Dry Test 1)

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| NoLoad | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load | 28,665 | 7,039 | 7,317 | 7,262 | 7,047 |

Design Load 477.8 P.L.F. (711 kg/linear m)

There are two design loads in this table.
To set up the test and size the test equipment you initially hypothesize the first design load, here 420 P.L.F. (625 kg/linear m).
The measured 477.8 P.L.F. (711 kg/linear m) is the actual Design Load determined from actual measurements and adding a safety factor.

TABLE 23

Floor Diaphragm Test (Dry Test 1) Clear Span

| Load Increment | Load (lbs.) | Indicator #2 Read** | Indicator #2 Def*** | Indicator #3 Read** | Indicator #3 Def*** | Indicator #4 Read** | Indicator #4 Def*** | RD* |
|---|---|---|---|---|---|---|---|---|
| No Load | 0 | 0.154 | — | 0.084 | — | 0.094 | — | — |
| 1 | 700 | 0.187 | 0.033 | 0.128 | 0.044 | 0.148 | 0.054 | 0.044 |
| 2 | 1400 | 0.225 | 0.071 | 0.165 | 0.081 | 0.182 | 0.088 | 0.081 |
| 3 | 2100 | 0.244 | 0.090 | 0.187 | 0.103 | 0.202 | 0.108 | 0.103 |
| 4 | 2800 | 0.260 | 0.106 | 0.211 | 0.127 | 0.223 | 0.129 | 0.127 |
| 5 | 3500 | 0.275 | 0.121 | 0.228 | 0.144 | 0.242 | 0.148 | 0.144 |
| 6 | 4200 | 0.291 | 0.137 | 0.250 | 0.166 | 0.265 | 0.171 | 0.166 |
| 7 | 4900 | 0.308 | 0.154 | 0.274 | 0.190 | 0.292 | 0.198 | 0.190 |
| 8 | 5600 | 0.325 | 0.171 | 0.295 | 0.211 | 0.316 | 0.222 | 0.211 |
| 9 | 6300 | 0.338 | 0.184 | 0.309 | 0.225 | 0.326 | 0.232 | 0.224 |
| 10 | 7000 | 0.354 | 0.200 | 0.327 | 0.243 | 0.341 | 0.247 | 0.241 |
| 11 | 7700 | 0.369 | 0.215 | 0.344 | 0.260 | 0.356 | 0.262 | 0.258 |
| Design Load | 8400 | 0.386 | 0.232 | 0.362 | 0.278 | 0.372 | 0.278 | 0.276 |
| 13 | 9100 | 0.402 | 0.248 | 0.380 | 0.296 | 0.385 | 0.291 | 0.293 |
| 14 | 9800 | 0.425 | 0.271 | 0.405 | 0.321 | 0.410 | 0.316 | 0.313 |
| 15 | 10500 | 0.454 | 0.300 | 0.442 | 0.358 | 0.449 | 0.355 | 0.325 |
| 16 | 11200 | 0.495 | 0.341 | 0.490 | 0.406 | 0.502 | 0.408 | 0.348 |
| 17 | 11900 | 0.512 | 0.358 | 0.521 | 0.437 | 0.535 | 0.441 | 0.367 |
| 18 | 14000 | 0.569 | 0.415 | 0.596 | 0.512 | 0.614 | 0.520 | 0.422 |

Temp. and Humidity During Construction: 65° F./31%;
Temp. and Humidity During Test: 65° F./31%
Sample Description ¾ inch SCP panel fastened to 16 gauge - 10 inch steel joints
Mode of failure: Several of the butt-joints opened up in several locations causing cement board core failure at the fasteners along the edges of the cement board.
*RD is an abbreviation for Resultant Deflection. The resultant deflection is equal to the average deflection of the bearings minus the greatest point of deflection across the clear span.
**Read is an abbreviation for Reading
***Def is an abbreviation for Deflection

TABLE 24

Floor Diaphragm Test (Dry Test 1)

| Load Increment | Load (lbs.) | Bearing Points | | | | Average Bearing Deflection |
|---|---|---|---|---|---|---|
| | | Indicator #1 | | Indicator #5 | | |
| | | Reading | Deflection | Reading | Deflection | |
| No Load | 0 lbs | 0.069 | — | 0.266 | — | — |
| 1 | 700 | 0.069 | 0.000 | 0.266 | 0.000 | 0.000 |
| 2 | 1400 | 0.069 | 0.000 | 0.266 | 0.000 | 0.000 |
| 3 | 2100 | 0.069 | 0.000 | 0.266 | 0.000 | 0.000 |
| 4 | 2800 | 0.069 | 0.000 | 0.266 | 0.000 | 0.000 |
| 5 | 3500 | 0.069 | 0.000 | 0.266 | 0.000 | 0.000 |
| 6 | 4200 | 0.069 | 0.000 | 0.266 | 0.000 | 0.000 |
| 7 | 4900 | 0.069 | 0.000 | 0.266 | 0.000 | 0.000 |
| 8 | 5600 | 0.069 | 0.000 | 0.266 | 0.000 | 0.000 |
| 9 | 6300 | 0.070 | 0.001 | 0.267 | 0.001 | 0.001 |
| 10 | 7000 | 0.072 | 0.003 | 0.267 | 0.001 | 0.002 |
| 11 | 7700 | 0.072 | 0.003 | 0.267 | 0.001 | 0.002 |
| Design Load | 8400 | 0.073 | 0.004 | 0.267 | 0.001 | 0.003 |
| 13 | 9100 | 0.075 | 0.006 | 0.267 | 0.001 | 0.004 |
| 14 | 9800 | 0.083 | 0.014 | 0.268 | 0.002 | 0.008 |
| 15 | 10500 | 0.094 | 0.025 | 0.307 | 0.041 | 0.033 |
| 16 | 11200 | 0.105 | 0.036 | 0.346 | 0.080 | 0.058 |
| 17 | 11900 | 0.107 | 0.038 | 0.369 | 0.103 | 0.071 |
| 18 | 14000 | 0.114 | 0.045 | 0.402 | 0.136 | 0.091 |

Bearing Indictors 2, 3 and 4 (labeled "Clear Span") of TABLE 23 are the instruments along the test specimen in the area between the support points at the two opposed ends of the frame. Bearing Indicators 1 and 5 of TABLE 24 are at the support points of this test specimen.

TABLE 25

Floor Diaphragm Test; Floor width 120 inches (3.05 m); Design Load 420 P.L.F. (Dry Test 2)
Floor Test Loads

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| No Load | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load | 34,968 | 8,900 | 8,653 | 8,715 | 8,700 |

Design Load 582.8 P.L.F.

TABLE 26

Floor Diaphragm Test (Dry Test 2)

| Load Increment | Load (lbs.) | Clear Span | | | | | | RD* |
|---|---|---|---|---|---|---|---|---|
| | | Indicator #2 | | Indicator #3 | | Indicator #4 | | |
| | | Read** | Def*** | Read** | Def*** | Read** | Def*** | |
| No Load | 0 | 0.290 | — | 0.127 | — | 0.231 | — | — |
| 1 | 700 | 0.322 | 0.032 | 0.156 | 0.029 | 0.250 | 0.019 | 0.028 |
| 2 | 1400 | 0.342 | 0.052 | 0.178 | 0.051 | 0.270 | 0.039 | 0.050 |
| 3 | 2100 | 0.365 | 0.075 | 0.202 | 0.075 | 0.292 | 0.061 | 0.073 |
| 4 | 2800 | 0.381 | 0.091 | 0.222 | 0.095 | 0.312 | 0.081 | 0.092 |
| 5 | 3500 | 0.398 | 0.108 | 0.244 | 0.117 | 0.334 | 0.103 | 0.113 |
| 6 | 4200 | 0.414 | 0.124 | 0.265 | 0.138 | 0.354 | 0.123 | 0.133 |
| 7 | 4900 | 0.429 | 0.139 | 0.285 | 0.158 | 0.375 | 0.144 | 0.152 |
| 8 | 5600 | 0.446 | 0.156 | 0.307 | 0.180 | 0.396 | 0.165 | 0.173 |
| 9 | 6300 | 0.463 | 0.173 | 0.328 | 0.201 | 0.415 | 0.184 | 0.192 |
| 10 | 7000 | 0.478 | 0.188 | 0.345 | 0.218 | 0.433 | 0.202 | 0.209 |
| 11 | 7700 | 0.493 | 0.203 | 0.363 | 0.236 | 0.450 | 0.219 | 0.225 |
| Design Load | 8400 | 0.510 | 0.220 | 0.486 | 0.259 | 0.471 | 0.240 | 0.247 |
| 13 | 9100 | 0.525 | 0.235 | 0.404 | 0.277 | 0.490 | 0.259 | 0.265 |
| 14 | 9800 | 0.543 | 0.253 | 0.429 | 0.302 | 0.513 | 0.282 | 0.289 |
| 15 | 10500 | 0.562 | 0.272 | 0.454 | 0.327 | 0.540 | 0.309 | 0.313 |
| 16 | 11200 | 0.581 | 0.291 | 0.478 | 0.351 | 0.564 | 0.333 | 0.337 |

TABLE 26-continued

Floor Diaphragm Test (Dry Test 2)

| Load Increment | Load (lbs.) | Clear Span | | | | | | RD* |
|---|---|---|---|---|---|---|---|---|
| | | Indicator #2 | | Indicator #3 | | Indicator #4 | | |
| | | Read** | Def*** | Read** | Def*** | Read** | Def*** | |
| 17 | 11900 | 0.600 | 0.310 | 0.500 | 0.373 | 0.585 | 0.354 | 0.358 |
| 18 | 14000 | 0.655 | 0.365 | 0.565 | 0.438 | 0.640 | 0.409 | 0.421 |

Temp. and Humidity During Construction: 70° F./50%;
Temp. and Humidity During Test: 70° F./48%
Sample Description: ¾ inch SCP panel fastened to 16 gauge - 8 inch steel joints
Mode of failure: Several of the butt-joints opened up in several locations causing cement board core failure at the fasteners along the edges of the cement board.
*RD is an abbreviation for Resultant Deflection. The resultant deflection is equal to the average deflection of the bearings minus the greatest point of deflection across the clear span.
**Read is an abbreviation for Reading
***Def is an abbreviation for Deflection

TABLE 27

Floor Diagram Test (Dry Test 2)

| Load Increment | Load (lbs.) | Bearing Points | | | | Average Bearing Deflection |
|---|---|---|---|---|---|---|
| | | Indicator #1 | | Indicator #5 | | |
| | | Reading | Deflection | Reading | Deflection | |
| No Load | 0 | 0.124 | — | 0.201 | — | — |
| 1 | 700 | 0.125 | 0.001 | 0.202 | 0.001 | 0.001 |
| 2 | 1400 | 0.125 | 0.001 | 0.203 | 0.002 | 0.002 |
| 3 | 2100 | 0.127 | 0.003 | 0.203 | 0.002 | 0.003 |
| 4 | 2800 | 0.128 | 0.004 | 0.203 | 0.002 | 0.003 |
| 5 | 3500 | 0.129 | 0.005 | 0.204 | 0.003 | 0.004 |
| 6 | 4200 | 0.131 | 0.006 | 0.205 | 0.004 | 0.005 |
| 7 | 4900 | 0.132 | 0.007 | 0.206 | 0.005 | 0.006 |
| 8 | 5600 | 0.134 | 0.010 | 0.206 | 0.005 | 0.007 |
| 9 | 6300 | 0.136 | 0.012 | 0.207 | 0.006 | 0.009 |
| 10 | 7000 | 0.137 | 0.013 | 0.208 | 0.006 | 0.009 |
| 11 | 7700 | 0.139 | 0.015 | 0.208 | 0.007 | 0.011 |
| Design Load | 8400 | 0.141 | 0.017 | 0.208 | 0.007 | 0.012 |
| 13 | 9100 | 0.141 | 0.017 | 0.208 | 0.007 | 0.012 |
| 14 | 9800 | 0.143 | 0.019 | 0.208 | 0.007 | 0.013 |
| 15 | 10500 | 0.145 | 0.021 | 0.209 | 0.008 | 0.015 |
| 16 | 11200 | 0.145 | 0.021 | 0.209 | 0.008 | 0.015 |
| 17 | 11900 | 0.147 | 0.023 | 0.209 | 0.008 | 0.016 |
| 18 | 14000 | 0.150 | 0.026 | 0.209 | 0.008 | 0.017 |

Temp. and Humidity During Construction: 70° F./50%
Temp. and Humidity During Test: 70° F./48%
Sample Description: ¾ inch (1.9 cm) SCP panel fastened to 16 gauge - 8 inch (20.3 cm) steel joints
Mode of failure: Several of the butt-joints opened up in several locations causing cement board core failure at the fasteners along the edges of the cement board.
*The resultant deflection is equal to the average deflection of the bearings minus the greatest point of deflection across the clear span.

TABLE 28

Floor Diaphragm Test (Wet Test 1);
Floor width 120 inches (305 cm);
Design Load 420 P.L.F. (625 kg per linear m)
Floor Test Loads

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| No Load | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load | 27,893 | 7,097 | 6,878 | 6,850 | 7,068 |

Design Load 464.9 P.L.F. (692 kg per linear m)

TABLE 29

Floor Diaphragm Comparison Test (Wet Test 1)

| Load Increment | Load (lbs.) | Clear Span | | | | | | |
|---|---|---|---|---|---|---|---|---|
| | | Indicator #2 | | Indicator #3 | | Indicator #4 | | |
| | | Read** | Def*** | Read** | Def*** | Read** | Def*** | RD* |
| No Load | 0 | 0.211 | — | 0.185 | — | 0.268 | — | — |
| 1 | 700 | 0.239 | 0.028 | 0.208 | 0.023 | 0.287 | 0.019 | 0.023 |
| 2 | 1400 | 0.245 | 0.034 | 0.225 | 0.040 | 0.293 | 0.025 | 0.040 |
| 3 | 2100 | 0.267 | 0.056 | 0.239 | 0.054 | 0.316 | 0.048 | 0.053 |
| 4 | 2800 | 0.287 | 0.076 | 0.260 | 0.075 | 0.336 | 0.068 | 0.073 |
| 5 | 3500 | 0.304 | 0.093 | 0.280 | 0.095 | 0.354 | 0.086 | 0.093 |
| 6 | 4200 | 0.320 | 0.109 | 0.300 | 0.115 | 0.372 | 0.104 | 0.113 |
| 7 | 4900 | 0.335 | 0.124 | 0.318 | 0.133 | 0.388 | 0.120 | 0.131 |
| 8 | 5600 | 0.354 | 0.143 | 0.339 | 0.154 | 0.405 | 0.137 | 0.152 |
| 9 | 6300 | 0.369 | 0.158 | 0.356 | 0.171 | 0.421 | 0.153 | 0.168 |
| 10 | 7000 | 0.388 | 0.177 | 0.378 | 0.193 | 0.441 | 0.173 | 0.188 |
| 11 | 7700 | 0.405 | 0.194 | 0.398 | 0.213 | 0.458 | 0.190 | 0.207 |
| Design Load | 8400 | 0.430 | 0.219 | 0.426 | 0.241 | 0.481 | 0.213 | 0.230 |
| 13 | 9100 | 0.469 | 0.258 | 0.463 | 0.278 | 0.508 | 0.240 | 0.252 |
| 14 | 9800 | 0.500 | 0.289 | 0.497 | 0.312 | 0.536 | 0.268 | 0.275 |
| 15 | 10500 | 0.521 | 0.310 | 0.522 | 0.337 | 0.558 | 0.290 | 0.298 |
| 16 | 11200 | 0.545 | 0.334 | 0.549 | 0.364 | 0.582 | 0.314 | 0.323 |
| 17 | 11900 | 0.569 | 0.358 | 0.579 | 0.394 | 0.610 | 0.342 | 0.351 |
| 18 | 14000 | 0.635 | 0.424 | 0.668 | 0.483 | 0.692 | 0.424 | 0.431 |

Temp. and Humidity During Construction: 65° F./31% RH (18° C./31%)
Temp. and Humidity During Test: 65° F./31% RH (18° C./31%)
Sample Description ¾ inch (1.9 cm) SCP panel fastened to 16 gauge - 8 inch (20.2 cm) steel joints
Several of the butt-joints opened up in several locations causing cement board core failure at the fasteners along the edges of the cement board.
*RD is an abbreviation for Resultant Deflection. The resultant deflection is equal to the average deflection of the bearings minus the greatest point of deflection across the clear span.
**Read is an abbreviation for Reading
***Def is an abbreviation for Deflection

TABLE 30

Floor Diaphragm Test (Wet Test 1)

| Load Increment | Load (lbs.) | Bearing Points | | | | Average Bearing Deflection |
|---|---|---|---|---|---|---|
| | | Indicator #1 | | Indicator #5 | | |
| | | Reading | Deflection | Reading | Deflection | |
| No Load | 0 | 0.199 | — | 0.341 | — | — |
| 1 | 700 | 0.199 | 0.000 | 0.342 | 0.001 | 0.001 |
| 2 | 1400 | 0.199 | 0.000 | 0.342 | 0.001 | 0.001 |
| 3 | 2100 | 0.199 | 0.000 | 0.343 | 0.002 | 0.001 |
| 4 | 2800 | 0.199 | 0.000 | 0.345 | 0.004 | 0.002 |
| 5 | 3500 | 0.199 | 0.000 | 0.345 | 0.004 | 0.002 |
| 6 | 4200 | 0.199 | 0.000 | 0.345 | 0.004 | 0.002 |
| 7 | 4900 | 0.199 | 0.000 | 0.346 | 0.005 | 0.002 |
| 8 | 5600 | 0.199 | 0.000 | 0.346 | 0.005 | 0.002 |
| 9 | 6300 | 0.200 | 0.001 | 0.347 | 0.006 | 0.003 |
| 10 | 7000 | 0.203 | 0.004 | 0.347 | 0.006 | 0.005 |
| 11 | 7700 | 0.204 | 0.005 | 0.348 | 0.007 | 0.006 |
| Design Load | 8400 | 0.214 | 0.015 | 0.348 | 0.007 | 0.011 |
| 13 | 9100 | 0.244 | 0.045 | 0.349 | 0.008 | 0.027 |
| 14 | 9800 | 0.265 | 0.066 | 0.349 | 0.008 | 0.037 |
| 15 | 10500 | 0.268 | 0.069 | 0.350 | 0.009 | 0.039 |
| 16 | 11200 | 0.272 | 0.073 | 0.351 | 0.010 | 0.042 |
| 17 | 11900 | 0.275 | 0.076 | 0.352 | 0.011 | 0.044 |
| 18 | 14000 | 0.289 | 0.090 | 0.355 | 0.014 | 0.052 |

Temp. and Humidity During Construction: 65° F./31% RH (18° C./31%)
Temp. and Humidity During Test: 65° F./31% RH (18° C./31%)
Sample Description ¾ inch SCP (1.9 cm) panel fastened to 16 gauge - 8 inch (20.2 cm) steel joints
Several of the butt-joints opened up in several locations causing cement board core failure at the fasteners along the edges of the cement board.
*The resultant deflection is equal to the average deflection of the bearings minus the greatest point of deflection across the clear span.

TABLE 31

Floor Diaphragm Test (Wet); Floor Width; Design Load 420 P.L.F. (625 kg per linear m)(Wet Test 2)
Floor Test Loads

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| No Load | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load | 30,285 | 7,327 | 7,707 | 7,740 | 7,511 |

Design Load 504.8 P.L.F. (751 kg per linear m)

TABLE 32

Floor Diaphragm Comparison Test (Wet Test 2)

| | | Clear Span | | | | | |
|---|---|---|---|---|---|---|---|
| | | Indicator #2 | | Indicator #3 | | Indicator #4 | |
| Load Increment | Load (lbs.) | Read** | Def*** | Read** | Def*** | Read** | Def*** | RD* |
| No Load | 0 | 0.166 | — | 0.136 | — | 0.129 | — | — |
| 1 | 700 | 0.180 | 0.014 | 0.144 | 0.008 | 0.140 | 0.011 | 0.007 |
| 2 | 1400 | 0.193 | 0.027 | 0.156 | 0.020 | 0.150 | 0.021 | 0.019 |
| 3 | 2100 | 0.210 | 0.044 | 0.173 | 0.037 | 0.167 | 0.038 | 0.035 |
| 4 | 2800 | 0.228 | 0.062 | 0.192 | 0.056 | 0.181 | 0.052 | 0.054 |
| 5 | 3500 | 0.240 | 0.074 | 0.210 | 0.074 | 0.195 | 0.066 | 0.071 |
| 6 | 4200 | 0.268 | 0.102 | 0.233 | 0.197 | 0.213 | 0.084 | 0.094 |
| 7 | 4900 | 0.312 | 0.146 | 0.270 | 0.134 | 0.237 | 0.108 | 0.130 |
| 8 | 5600 | 0.337 | 0.171 | 0.293 | 0.157 | 0.255 | 0.126 | 0.152 |
| 9 | 6300 | 0.370 | 0.204 | 0.326 | 0.190 | 0.280 | 0.151 | 0.184 |
| 10 | 7000 | 0.387 | 0.221 | 0.345 | 0.209 | 0.295 | 0.166 | 0.201 |
| 11 | 7700 | 0.406 | 0.240 | 0.367 | 0.231 | 0.314 | 0.185 | 0.223 |
| Design Load | 8400 | 0.423 | 0.257 | 0.386 | 0.250 | 0.330 | 0.201 | 0.241 |
| 13 | 9100 | 0.440 | 0.274 | 0.406 | 0.270 | 0.351 | 0.222 | 0.260 |
| 14 | 9800 | 0.451 | 0.285 | 0.427 | 0.291 | 0.368 | 0.239 | 0.279 |
| 15 | 10500 | 0.471 | 0.309 | 0.448 | 0.312 | 0.387 | 0.258 | 0.298 |
| 16 | 11200 | 0.491 | 0.325 | 0.468 | 0.332 | 0.405 | 0.276 | 0.316 |
| 17 | 11900 | 0.512 | 0.346 | 0.494 | 0.358 | 0.429 | 0.300 | 0.341 |
| 18 | 14000 | 0.569 | 0.393 | 0.553 | 0.417 | 0.482 | 0.353 | 0.396 |

Temp. and Humidity During Construction: 70° F./50%;
Temp. and Humidity During Test: 70° F./48%
Sample Description: ¾ inch SCP panel fastened to 16 gauge - 8 inch steel joints
Mode of failure: The butt-joints on the load side of the floor at end #1 opened up causing core failure to the cement board around the screws along the joint. The screws along the end joist at end #1 pulled through the cement board due to core
*RD is an abbreviation for Resultant Deflection. The resultant deflection is equal to the average deflection of the bearings minus the greatest point of deflection across the clear span.
**Read is an abbreviation for Reading
***Def is an abbreviation for Deflection

TABLE 33

Floor Diaphragm Test (Wet Test 2)

| | | Bearin Points | | | | Average |
|---|---|---|---|---|---|---|
| | | Indicator #1 | | Indicator #5 | | Bearing |
| Load Increment | Load (lbs.) | Read** | Def*** | Read** | Def*** | Deflection |
| No Load | 0 lbs | 0.075 | — | 0.110 | — | — |
| 1 | 700 lbs. | 0.077 | 0.002 | 0.110 | 0.000 | 0.001 |
| 2 | 1400 | 0.078 | 0.003 | 0.110 | 0.000 | 0.002 |
| 3 | 2100 | 0.078 | 0.003 | 0.111 | 0.001 | 0.002 |
| 4 | 2800 | 0.078 | 0.003 | 0.111 | 0.001 | 0.002 |
| 5 | 3500 | 0.079 | 0.004 | 0.112 | 0.002 | 0.003 |
| 6 | 4200 | 0.079 | 0.004 | 0.112 | 0.002 | 0.003 |
| 7 | 4900 | 0.080 | 0.005 | 0.113 | 0.003 | 0.004 |
| 8 | 5600 | 0.083 | 0.008 | 0.113 | 0.003 | 0.006 |
| 9 | 6300 | 0.084 | 0.009 | 0.114 | 0.004 | 0.007 |
| 10 | 7000 | 0.086 | 0.011 | 0.115 | 0.005 | 0.008 |
| 11 | 7700 | 0.087 | 0.012 | 0.115 | 0.005 | 0.009 |
| Design Load | 8400 | 0.089 | 0.014 | 0.115 | 0.005 | 0.010 |
| 13 | 9100 | 0.090 | 0.015 | 0.116 | 0.006 | 0.011 |
| 14 | 9800 | 0.092 | 0.017 | 0.118 | 0.008 | 0.013 |
| 15 | 10500 | 0.095 | 0.020 | 0.119 | 0.009 | 0.015 |
| 16 | 11200 | 0.097 | 0.022 | 0.120 | 0.010 | 0.016 |
| 17 | 11900 | 0.099 | 0.024 | 0.120 | 0.010 | 0.017 |
| 18 | 14000 | 0.105 | 0.030 | 0.123 | 0.013 | 0.022 |

Bearing Indictors 2, 3 and 4 (labeled "Clear Span") of Table 32 are the instruments along the test specimen in the area between the support points at the two opposed ends of the frame. Bearing Indicators 1 and 5 of TABLE 33 are at the support points of this test specimen.
**Read is an abbreviation for Reading
***Def is an abbreviation for Deflection

TABLE 34

Water Absorption Results - ¾ inch (1.9 cm) thick SCP panel

| Specimen | Weight Before Soak | Weight After Soak | Weight Gain | Weight Gain Percentage |
|---|---|---|---|---|
| A | 2069.0 g | 2082.3 g | 13.3 g | 0.6% |
| B | 2109.1 g | 2112.6 g | 3.5 g | 0.2% |
| C | 2145.0 g | 2149.9 g | 4.9 g | 0.2% |
| Average Water Absorption | | | | 0.3% |

This data is for moisture content tests done on specimens A, B and C which are 12 inch × 12 inch specimens of the SCP panel of the composition tested in the above "Wet" and "Dry" tests. In the moisture content tests the specimens are soaked 24 hours under a two inch head of water.

TABLE 35

Moisture Content ¾ inch (1.9 cm) thick SCP panel

| | | Before Soak Test | | | After Soak Test | | |
|---|---|---|---|---|---|---|---|
| Specimen | Weight After Drying (g) | Weight of samples before soak (g) | Weight Loss (g) | Weight Loss % | Weight of samples after soak (g) | Weight Loss (g) | Wt. Loss % |
| A | 1801.9 | 2069.0 | 267.1 | 12.9% | 2082.3 | 280.4 | 13.5% |
| B | 1875.5 | 2109.1 | 230.6 | 10.9% | 2112.6 | 234.1 | 11.1% |
| C | 1904.5 | 2145.0 | 240.5 | 11.2% | 2149.9 | 245.4 | 11.4% |
| Average Moisture Content | | | | 11.7% | | | 12.0% |

TABLE 36

Board Expansion ¾ inch (1.9 cm) thick SCP panel (dimensions in inches)

| Specimen | Width 1 | Width 2 | Thick 1 | Thick 2 | Thick 3 | Thick 4 |
|---|---|---|---|---|---|---|
| A-Before Soak | 12.146 | 11.907 | 0.717 | 0.715 | 0.697 | 0.704 |
| A-After Soak | 12.146 | 11.907 | 0.717 | 0.715 | 0.697 | 0.704 |
| Difference | 0.000 | 0.000 | 0.000 | 0.000 | 0.000 | 0.000 |
| B-Before Soak | 12.072 | 11.940 | 0.710 | 0.740 | 0.732 | 0.715 |
| B-After Soak | 12.072 | 11.940 | 0.710 | 0.740 | 0.732 | 0.715 |
| Difference | 0.000 | 0.000 | 0.000 | 0.000 | 0.000 | 0.000 |
| C-Before Soak | 12.065 | 11.970 | 0.755 | 0.740 | 0.730 | 0.750 |
| C-After Soak | 12.065 | 11.970 | 0.755 | 0.740 | 0.730 | 0.750 |
| Difference | 0.000 | 0.000 | 0.000 | 0.000 | 0.000 | 0.000 |

Example 8

To determine the shear strength and shear stiffness of a floor diaphragm assembly using steel framing and SCP sheathing a test according to the AISI TS-7-02 Cantilever Test Method for Cold-Formed Steel Diaphragms was performed on ten (10) specimens. This data can be indicative of shear performance as a shear wall.

Figure 32:
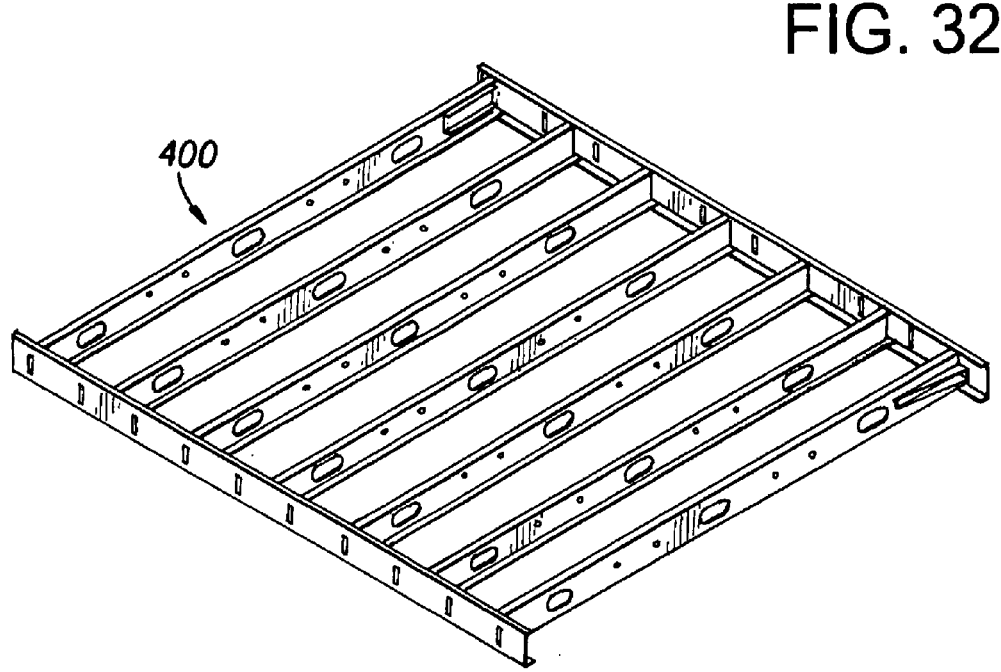
FIG. 32 shows a floor framing used in the AISI TS-7 tests.

FIG. 32 shows a floor framing 400 used in the AISI TS-7 tests.

Floor Diaphragm Materials

Prototype ¾" (1.9 cm) SCP—Structural Cement Panel reinforced with fiberglass strands. A "V"-groove and tongue is located along the 8' (2.4 m) dimension of the 4'×8' (1.2×2.4 m) sheets.

¾" (1.9 cm) Plywood—²³⁄₃₂" (1.83 cm) GP PLUS, Tongue and Groove (Quick Fit). APA Rated Sturd-I-Floor™, Exposure 1, PS1-95 Underlayment, Sanded Face, PRP-108 and manufactured by Georgia Pacific Corporation.

Fasteners—#8-18×1⅝" (4.1 cm) long, winged driller Bugle head Grabber Super Drive™ (Lox drive) screws, Item No. CHS8158JBW spaced 4", 6" and 12" (10.1, 15.4 and 30.5 cm) o.c. along the perimeter, and 12" (30.5 cm) o.c. in the field of the panels. All fasteners were placed a minimum of ¾" (1.9 cm) in from panel edges and ½" (1.3 cm) in from seams. At panel corners the fasteners were inset 2" (5.08 cm).

Adhesive—PL Polyurethane Premium Construction Adhesive, manufactured by OSI Sealants. A ¼" (0.635 cm) bead was applied to all framing members with a double bead applied at panel butt-joints. A minimum of 24 hours of cure time was provided prior to any loading.

Floor Framing

Joists—16 ga.×10" (25.4 cm) deep×10' long TRADE READY™ Joists manufactured by Dietrich Industries. The joists were stamped Dietrich TDJ5 W 9¼ inches (23.5 cm)×L 11 foot 10½ inches (6.02 m) 14453223 16 GAUGE G60 50KSI. The average tested yield strength was 51.0 ksi (352 Mpa).

Rim Track—16 gauge×10³⁄₁₆" deep×16' long with pre-bent joist attachment locations spaced at 24" o.c. The track was stamped Dietrich D16 W 9¼ IN (23.5 cm)×L 16 FT (4.88 m) 14453203 16 GAUGE G60. The average tested yield strength was 62.7 ksi (432 MPa). Fasteners—#10-16×¾" (1.9 cm) long hex-head, DRIVALL screws.

Test Specimen Construction

Ten (10) test samples were constructed to an overall dimension of 11'-11"×12'-0" (3.63 m×3.66 m). The rim track had the prebent tabs at 16" (41 cm) o.c. so, clip angles were welded at the 24" (61 cm) o.c. spacing.

The joists were attached to the track using three (3) hex-head #10-16×¾" (1.9 cm) long DRIVALL screws into the side of the joist through the pre-bent tab. A Simpson Strong-Tie Holdown Part No. S/HD15 was fastened to the Tension side of the floor using 48-#10×¾" (1.9 cm) long hex-head self-drilling screws. A 6⅛"×16" long, 12 ga stud was attached to the compression joist using (14)-#10×¾" (1.9 cm) long hex-head self-drilling screws. This was added as a stiffener to avoid crushing the end joist prior to diaphragm failure. The frame was squared and then the prototype SCP or plywood was fastened to it. The floor sheathing was fastened at 4", 6" or 12" (10.1, 15.2 or 30.5 cm) o.c. around the perimeter inset 2" (5.08 cm) from the corners, and 12" (30.5 cm) o.c. in the field with #8-18×1⅝" (4.1 cm) long Bugle head Grabber Super Drive™ screws. Care was taken to ensure that the fasteners were kept flush or slightly below the surface of the floor sheathing and also did not strip out in the steel framing. See attached drawings no. B6-B11 for details. The test samples using adhesive were allowed to set for a minimum of 24 hours to provide the recommended adhesive to cure.

Figure 33:
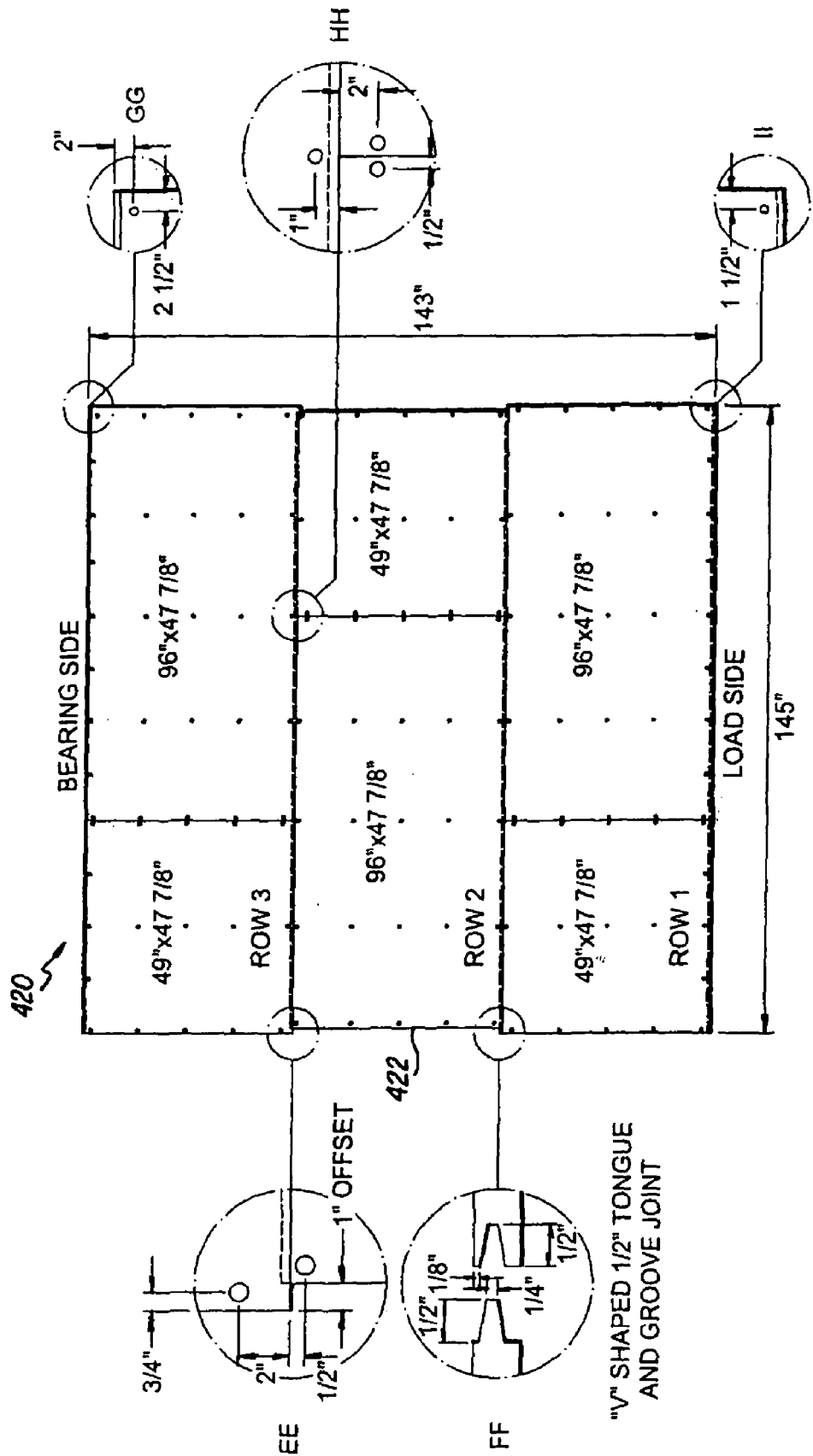
FIG. 33 shows one of the SCP Floors used in the AISI TS-7 tests.

FIG. 33 shows one of the SCP Floors 420 used in the AISI TS-7 tests with adhesive placement. The boards 442 were SCP panels having 0.670 inch-0.705 inch (1.70-1.79 cm) thickness. View EE shows offset panels at a joint. View FF shows "V"-shaped ½ inch (1.27 cm) tongue and groove joint. View GG shows a corner. View HH shows where three SCP panels meet. View II shows a corner.

Test Set-Up

Figure 34:
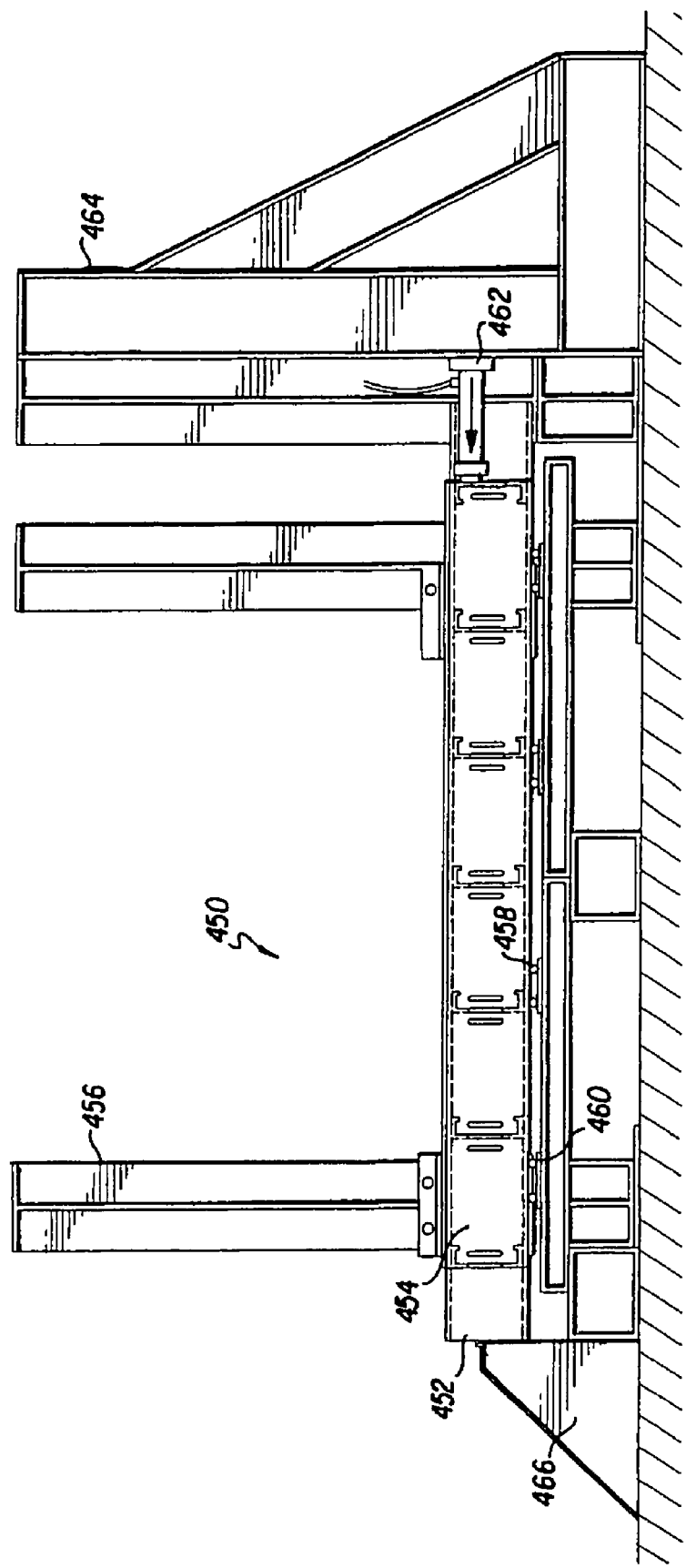
FIG. 34 shows the testing apparatus used in the AISI TS-7 tests.

FIG. 34 shows the testing apparatus 450 used in the AISI TS-7 tests. Test apparatus 450 has two 8 inch×72 inch (20.3× 183 cm) long loading beams 454. A test specimen 452 is placed on 1 inch rollers 458 a steel plate 460 is provided under the rollers 458. A rigid bearing 466 and test fixture 456 and I-beam fixture are also provided. A hydraulic cylinder 462 applies pressure to the test specimen 452. An I-beam fixture for bearing 464 is also provided.

The test sample was positioned in the test fixture with one of the rim tracks set flush to the top of a 10"-30 lb./foot (25.4 cm-44.6 kg/m) C-channel. The rim track was then attached to the C-channel using #12-24, T5 hex head screws spaced 12" (30.5 cm) o.c. Two (2) 8"×72" (20.3×183 cm) long I-beams were then attached to the other rim track, flush to the top, using #10×¾" (1.9 cm) long hex-head self-drilling screws. The fasteners were set 6" (15.2 cm) o.c. alternating sides of the I-beam flange. The I-beams were also bolted together. A hydraulic cylinder was positioned on a reaction beam in-line with the I-beams.

1" (2.54 cm) diameter threaded rod was placed through the Simpson Holdown and connected to the rigid steel fixture. No specific torque was applied to the coupling nuts on the threaded rod. The rim track on the load side was positioned on double sets of rollers spaced approximately 48" apart. A hold down was placed over the sheathing on the compression side to prevent uplift. Two (2) 1" (2.54 cm) diameter rollers were placed between the hold down tube and a steel plate on the floor sheathing.

Four (4) Linear transducers were placed on floor diaphragms assembly in the following locations:

1—In-line with the Tension Joist,

2—In-line with the fixed rim track,

3—In-line with the loaded rim track on a clip angle, and

4—In-line with the Compression Joist.

The Linear transducers and hydraulic pressure transducer were connected to a data acquisition system.

Test Equipment

Four (4) Linear transducers were placed on floor diaphragms assembly in the following locations:

One (1) ENERPAC Model P-39 hydraulic hand pumps.

Three (3) EnerPac Model RC-1010 hydraulic cylinders.

Four (4) Linear transducers.

Five (5) rigid bearings bolted to floor.

One (1) C10×30 rigid channel bolted to three (3) of the bearings.

One (1) Omega digital meter.

One (1) Omega pressure transducer.

Two (2) 6 foot (1.83 m) I-beams.

Procedure

The loads were generated using a hydraulic cylinder, at the load point. The applied forces were measured with data acquisition equipment, and a pressure transducer. A permanent record of the applied forces was made on the attached data sheets. The loads were generated by applying hydraulic pressure to create mechanical force until the required load was indicated on the digital meter. The entire floor assembly was loaded in at a constant rate until no further gain in load could be attained.

Test Results

TABLE 37 summarizes the test results.

TABLE 37

Summary of Tests Nos. 1-10
Specimen: ¾" (1.9 cm) Prototype SCP (T&G) fastened to 16 ga. Steel Joists, set 24" (61 cm) o. c., with #8 × 1-⅝" (4.1 cm) screws with various spacing around the perimeter and 12" (30.5 cm) o.c. in the field. The rows defined in the failure descriptions are #1-#3 with #1 the load side and Spacing Field. See FIGs. 35-37 for details.

| Test No. | Fastener Perimeter (inches) | Spacing Field (inches) | Adhesive to Framing | Sn Shear Strength (plf) | G' Shear Stiffness (plf) |
|---|---|---|---|---|---|
| 1 | 4" | 12" | No | 623.9 | 241,328 |
| 2 | | | | 637.9 | 178,433 |
| 3 | | | | 783.3 | 147,670 |
| 4 | 6" | 12" | No | 699.0 | 202,407 |
| 5 | | | | 544.8 | 121,526 |
| 6 | | | | 711.4 | 107,653 |
| 10 Plywood | | | | 527.9 | 78,880 |
| 7 | 4" | 12" | Yes | 1886.0 | 581,716 |
| 8 | 6" | | | 1612.5 | 803,716 |
| 9 | 12" | | | 1327.0 | 432,444 |

Figure 35:
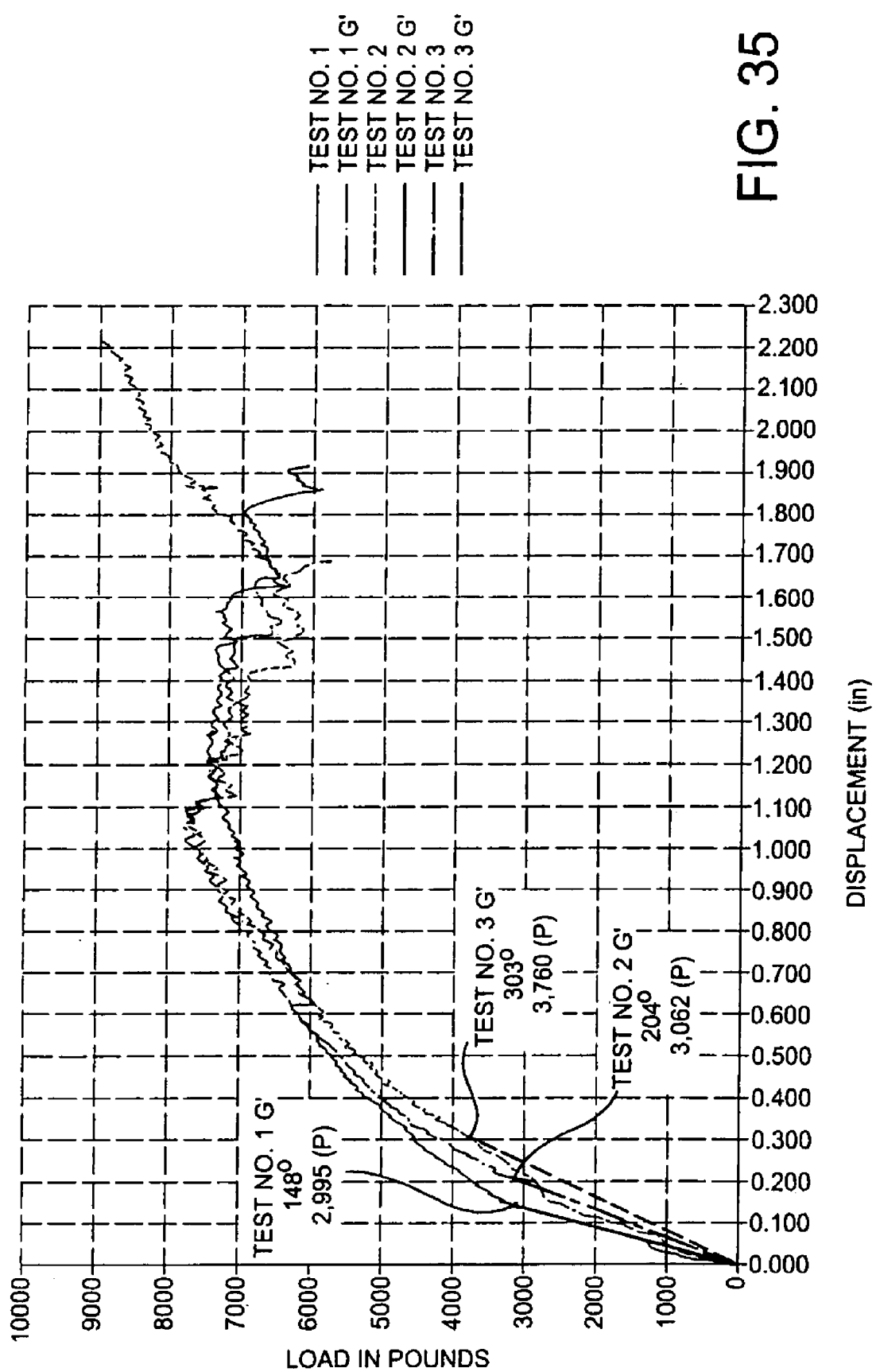
FIG. 35 shows data from AISI TS-7 Cantilever Floor Diaphragm test using ¾ inch (1.9 cm) SCP panel with a 4 inch-12 inch (10.1-30.5 cm) fastening schedule.
Figure 36:
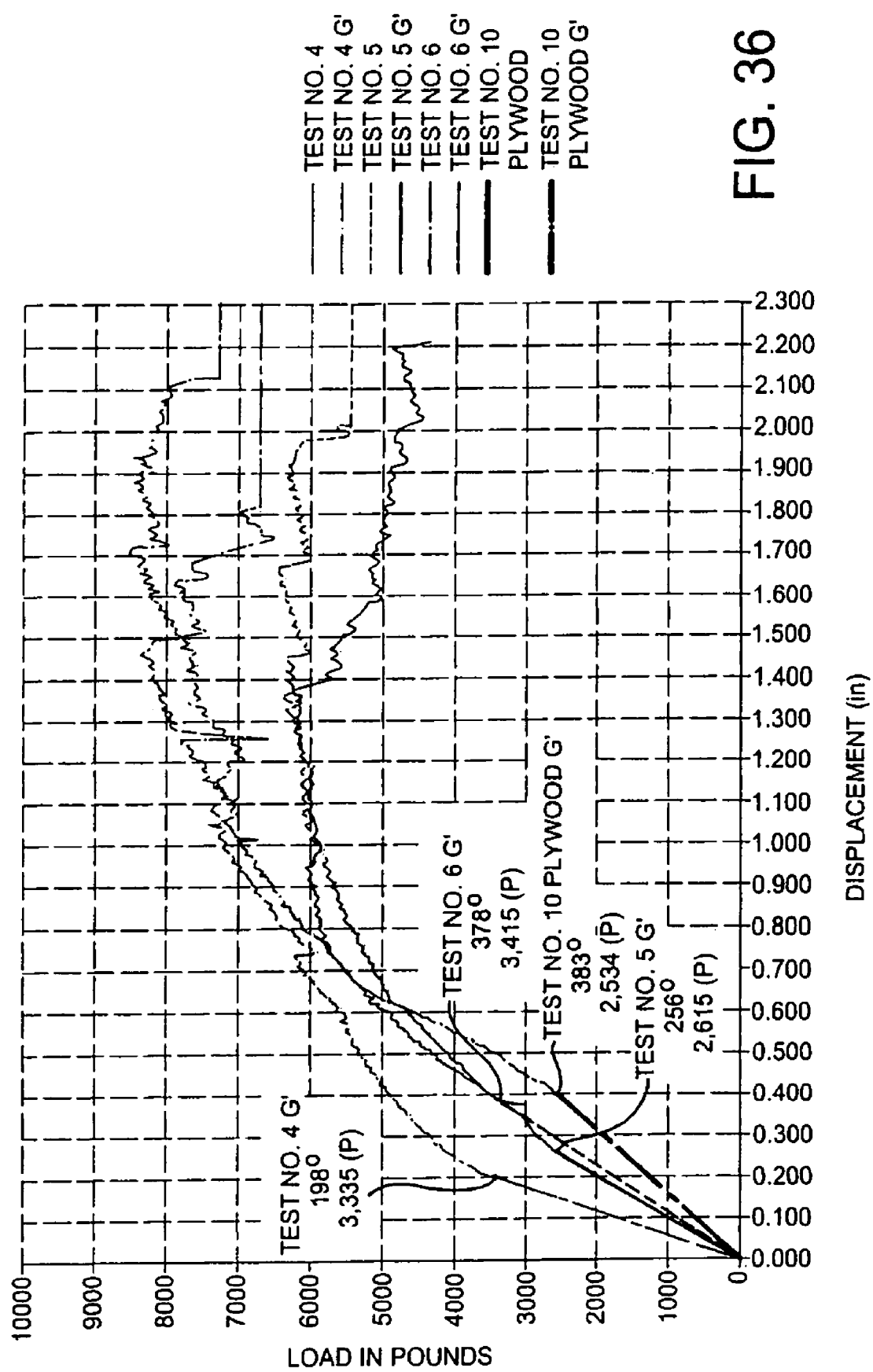
FIG. 36 shows data from AISI TS-7 Cantilever Floor Diaphragm test using ¾ inch (1.9 cm) SCP panel compared to ¾ inch (1.9 cm) plywood with a 6 inch-12 inch (10.1-30.5 cm) fastening schedule.
Figure 37:
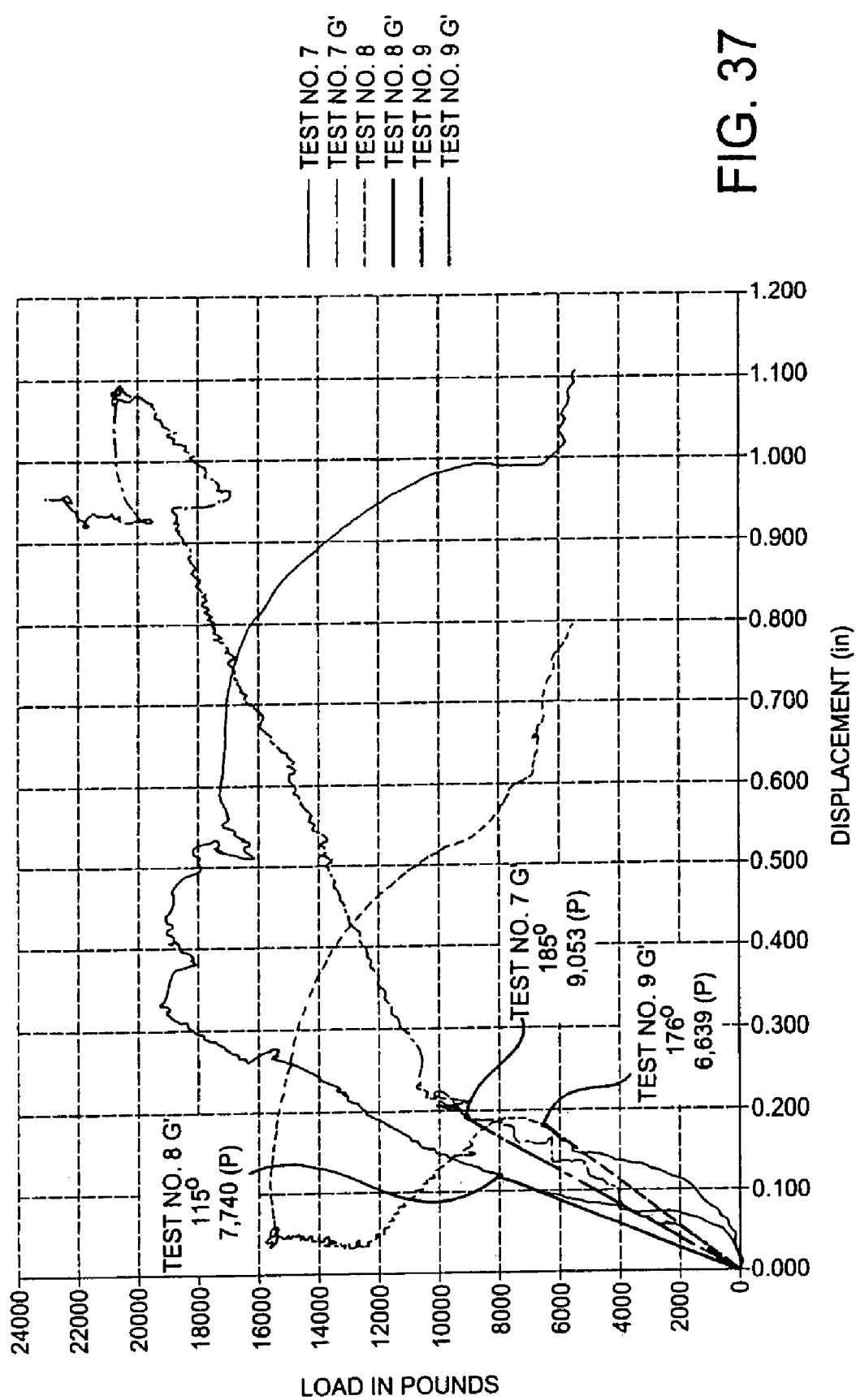
FIG. 37 shows data from AISI TS-7 Cantilever Floor Diaphragm test using 0.75 inch (1.9 cm) SCP panel with adhesive.

FIGS. 35-37 show Load in Pounds v. Displacement data used to generate the values summarized in TABLE 37.

FIG. 35 shows data from AISI TS-7 Cantilever Floor Diaphragm test using ¾ inch (1.9 cm) SCP panel with a 4 inch-12 inch (10.2-30.5 cm) fastening schedule.

FIG. 36 shows data from AISI TS-7 Cantilever Floor Diaphragm test using ¾ inch (1.9 cm) SCP panel compared to ¾ inch (1.9 cm) plywood with a 6 inch-12 inch fastening schedule. FIG. 37 shows data from AISI TS-7 Cantilever Floor Diaphragm test using ¾ inch (1.9 cm) SCP panel with adhesive.

TABLES 38-47 show in table form the data of FIGS. 35, 36 and 37 in 0.001 inch increments.

TABLE 38

Test No. 1: Specimen: ¾"(1.91 cm) SCP (T&G) fastened to 16 ga. Steel Joists, set 24"(61 cm) o.c., with #8 × 1-⅝" (4.1 cm) screws spaced 4" (10.2 cm) o.c. around the perimeter and 12" o.c. (30.5 cm) in the field.
Test Conditions: 70° F. (21.1° C.); 41% Relative Humidity
Diaphragm Width 143 inches (3.63 m); Diaphragm Length 144 inches (3.66 m); Load Time (min:sec): 7:46

| Load in Pounds (lbf) | Deflection in Inches-Indicator Number | | | | Net Shear Deflection |
|---|---|---|---|---|---|
| | 1 | 2 | 3 | 4 | |
| 0 | 0.000 | 0.000 | 0.000 | 0.000 | 0.000 |
| 214 | 0.001 | −0.001 | 0.015 | 0.012 | 0.003 |
| 500 | 0.001 | −0.003 | 0.041 | 0.032 | 0.012 |
| 723 | 0.002 | −0.004 | 0.061 | 0.043 | 0.019 |
| 982 | 0.004 | −0.006 | 0.089 | 0.046 | 0.045 |
| 1205 | 0.005 | −0.006 | 0.109 | 0.049 | 0.061 |
| 1481 | 0.007 | −0.007 | 0.132 | 0.052 | 0.080 |
| 1704 | 0.008 | −0.007 | 0.147 | 0.055 | 0.091 |
| 1945 | 0.009 | −0.006 | 0.159 | 0.057 | 0.099 |
| 2204 | 0.011 | −0.004 | 0.180 | 0.061 | 0.113 |
| 2489 | 0.012 | −0.003 | 0.194 | 0.063 | 0.122 |
| 2739 | 0.013 | 0.000 | 0.211 | 0.066 | 0.131 |
| 2980 | 0.015 | 0.004 | 0.237 | 0.070 | 0.148 |
| 3230 | 0.017 | 0.008 | 0.259 | 0.074 | 0.160 |
| 3498 | 0.018 | 0.013 | 0.295 | 0.079 | 0.185 |
| 3739 | 0.020 | 0.016 | 0.328 | 0.083 | 0.210 |
| 3997 | 0.022 | 0.020 | 0.365 | 0.087 | 0.237 |
| 4229 | 0.023 | 0.023 | 0.407 | 0.093 | 0.269 |
| 4488 | 0.025 | 0.025 | 0.445 | 0.096 | 0.299 |
| 4729 | 0.027 | 0.029 | 0.493 | 0.100 | 0.338 |
| 4961 | 0.028 | 0.033 | 0.531 | 0.104 | 0.367 |
| 5247 | 0.030 | 0.044 | 0.600 | 0.109 | 0.418 |
| 5461 | 0.031 | 0.050 | 0.645 | 0.112 | 0.452 |

TABLE 38-continued

Test No. 1: Specimen: ¾" (1.91 cm) SCP (T&G) fastened to 16 ga. Steel Joists, set 24" (61 cm) o.c., with #8 × 1-⅝" (4.1 cm) screws spaced 4" (10.2 cm) o.c. around the perimeter and 12" o.c. (30.5 cm) in the field.
Test Conditions: 70° F. (21.1° C.); 41% Relative Humidity
Diaphragm Width 143 inches (3.63 m); Diaphragm Length 144 inches (3.66 m); Load Time (min:sec): 7:46

| Load in Pounds (lbf) | Deflection in Inches-Indicator Number | | | | Net Shear Deflection |
|---|---|---|---|---|---|
| | 1 | 2 | 3 | 4 | |
| 5746 | 0.033 | 0.054 | 0.710 | 0.115 | 0.509 |
| 5987 | 0.035 | 0.059 | 0.768 | 0.119 | 0.556 |
| 2,995 (P) | 0.015 | 0.004 | 0.237 | 0.070 | 0.148 |

Ultimate Load (Pn) = 7,486 lbs (3396 kg).; P = 0.4(Pn) = 2,995 lbs. (1359 kg); Shear Strength (Sn) = 623.9 lbs/ft (928 kg/m); Shear Stiffness (G') = 241,328 plf (359,096 kg/linear m)
Failure: SCP failure on row #2 on the compression side around the screws. Both T&G edges shifted due to screw shear and rotation into the SCP (typically limited to the fasteners at or within 12" (30.5 cm) of the T&G). SCP corner break on row #1 on the tension side at the T&G location. Corner Break on all, but two, of row number 2 panels. Row #3 corner break at compression side T and G location

TABLE 39

Test No. 2: Specimen: ¾" (1.91 cm) SCP (T&G) fastened to 16 ga. Steel Joists, set 24" (61 cm) o.c., with #8 × 1-⅝" (4.1 cm) screws spaced 4" (10.2 cm) o.c. around the perimeter and 12" o.c. (30.5 cm) in the field.
Test Conditions: 67° F. (19.4° C.); 45% Relative Humidity
Diaphragm Width 143 inches (3.63 m); Diaphragm Length 144 inches (3.66 m); Load Time (min:sec): 10:11

| Load in Pounds (lbf) | Deflection in Inches-Indicator Number | | | | Net Shear Deflection |
|---|---|---|---|---|---|
| | 1 | 2 | 3 | 4 | |
| 0 | 0.000 | 0.000 | 0.000 | 0.000 | 0.000 |
| 232 | 0.002 | 0.003 | 0.051 | 0.047 | −0.001 |
| 500 | 0.003 | 0.009 | 0.134 | 0.114 | 0.009 |
| 732 | 0.005 | 0.012 | 0.171 | 0.129 | 0.027 |
| 991 | 0.006 | 0.015 | 0.187 | 0.132 | 0.036 |
| 1196 | 0.007 | 0.019 | 0.212 | 0.136 | 0.051 |
| 1472 | 0.008 | 0.025 | 0.253 | 0.138 | 0.083 |
| 1722 | 0.009 | 0.032 | 0.284 | 0.142 | 0.103 |
| 1981 | 0.010 | 0.039 | 0.312 | 0.145 | 0.119 |
| 2222 | 0.012 | 0.046 | 0.342 | 0.150 | 0.136 |
| 2480 | 0.013 | 0.053 | 0.370 | 0.153 | 0.152 |
| 2739 | 0.015 | 0.061 | 0.410 | 0.157 | 0.179 |
| 2989 | 0.016 | 0.067 | 0.446 | 0.161 | 0.203 |
| 3167 | 0.016 | 0.073 | 0.469 | 0.163 | 0.217 |
| 3471 | 0.018 | 0.080 | 0.506 | 0.167 | 0.242 |
| 3702 | 0.019 | 0.084 | 0.530 | 0.170 | 0.258 |
| 3988 | 0.021 | 0.090 | 0.572 | 0.175 | 0.289 |
| 4238 | 0.022 | 0.094 | 0.604 | 0.177 | 0.312 |
| 4479 | 0.023 | 0.099 | 0.639 | 0.179 | 0.340 |
| 4684 | 0.024 | 0.103 | 0.668 | 0.182 | 0.361 |
| 4987 | 0.026 | 0.109 | 0.725 | 0.184 | 0.407 |
| 5219 | 0.027 | 0.113 | 0.761 | 0.188 | 0.435 |
| 5478 | 0.028 | 0.118 | 0.812 | 0.191 | 0.476 |
| 5745 | 0.029 | 0.122 | 0.870 | 0.197 | 0.523 |
| 5950 | 0.031 | 0.127 | 0.928 | 0.201 | 0.570 |
| 3,062 (P) | 0.016 | 0.069 | 0.450 | 0.162 | 0.204 |

Ultimate Load (Pn) = 7,655 lbs. (3472 kg); P = 0.4(Pn) = 3,062 lbs. (1389 kg); Shear Strength (Sn) = 637.9 lbs. lineal foot (949 kg/m); Shear Stiffness (G') = 178,433 plf (265,508 kg/m)
Failure: SCP failure on row #2 on the compression side around the screws. Both T&G edges shifted due to screw shear and rotation into the SCP (typically limited to the fasteners at or within 12" (30.5 cm) of the T&G). SCP corner break on row #1 on the tension side at the T&G location. Corner Break on row #2 and Row #3 at the compression side T & G location.

TABLE 40

Test No. 3: Specimen: ¾" (1.91 cm) SCP (T&G) fastened to 16 ga. Steel Joists, set 24" (61 cm) o.c., with #8 × 1-⅝" (4.1 cm) screws spaced 4" (10.2 cm) o.c. around the perimeter and 12" o.c. (30.5 cm) in the field.
Test Conditions: 67° F. (19.4° C.); 45% Relative Humidity
Diaphragm Width 143 inches (3.63 m); Diaphragm Length 144 inches (3.66 m); Load Time (min:sec): 7:58

| Load in Pounds (lbf) | Deflection in Inches-Indicator Number | | | | Net Shear Deflection |
|---|---|---|---|---|---|
| | 1 | 2 | 3 | 4 | |
| 0 | 0.000 | 0.000 | 0.000 | 0.000 | 0.000 |
| 232 | 0.001 | 0.007 | 0.069 | 0.059 | 0.002 |
| 499 | 0.003 | 0.012 | 0.115 | 0.090 | 0.010 |
| 749 | 0.005 | 0.018 | 0.152 | 0.096 | 0.033 |
| 972 | 0.005 | 0.023 | 0.174 | 0.100 | 0.047 |
| 1240 | 0.007 | 0.030 | 0.210 | 0.104 | 0.070 |
| 1489 | 0.009 | 0.038 | 0.238 | 0.106 | 0.086 |
| 1703 | 0.010 | 0.044 | 0.270 | 0.108 | 0.109 |
| 1980 | 0.011 | 0.052 | 0.302 | 0.109 | 0.131 |
| 2194 | 0.012 | 0.058 | 0.331 | 0.111 | 0.151 |
| 2471 | 0.013 | 0.064 | 0.365 | 0.112 | 0.177 |
| 2729 | 0.014 | 0.068 | 0.391 | 0.113 | 0.196 |
| 2979 | 0.016 | 0.074 | 0.425 | 0.114 | 0.223 |
| 3247 | 0.017 | 0.080 | 0.464 | 0.116 | 0.252 |
| 3416 | 0.019 | 0.083 | 0.486 | 0.117 | 0.268 |
| 3737 | 0.020 | 0.089 | 0.531 | 0.119 | 0.303 |
| 3960 | 0.021 | 0.092 | 0.562 | 0.121 | 0.330 |
| 4228 | 0.024 | 0.096 | 0.601 | 0.123 | 0.359 |
| 4442 | 0.025 | 0.100 | 0.628 | 0.127 | 0.378 |
| 4728 | 0.026 | 0.106 | 0.675 | 0.130 | 0.415 |
| 4968 | 0.027 | 0.108 | 0.711 | 0.131 | 0.446 |
| 5236 | 0.029 | 0.111 | 0.773 | 0.137 | 0.497 |
| 5495 | 0.030 | 0.115 | 0.821 | 0.139 | 0.538 |
| 5655 | 0.031 | 0.118 | 0.856 | 0.140 | 0.568 |
| 5932 | 0.033 | 0.119 | 0.902 | 0.143 | 0.608 |
| 3,760 (P) | 0.020 | 0.089 | 0.531 | 0.119 | 0.303 |

Ultimate Load (Pn) = 9,399 lbs. (4263 kg); P = 0.4(Pn) = 3,760 lbs. (1706 kg); Shear Strength (Sn) = 783.9 lbs. lineal foot (1166 kg/m); Shear Stiffness (G') = 147,670 plf (219732 kg/m)
Failure: SCP failure on row #2 on the compression side around the screws. Both T&G edges shifted due to screw shear and rotation into the SCP (typically limited to the fasteners at or within 12" of the T&G).
SCP corner break on row #1 on the tension side at the T&G location.
Butt-Joint separation on row #2 with SCP failure around the fasteners.

TABLE 41

Test No. 4: Specimen: ¾" (1.91 cm) SCP (T&G) fastened to 16 ga. Steel Joists, set 24" (61 cm) o.c., with #8 × 1-⅝" (4.1 cm) screws spaced 6" (15.2 cm) o.c. around the perimeter and 12" o.c. (30.5 cm) in the field.
Test Conditions: 70° F. (21.1° C.); 41% Relative Humidity
Diaphragm Width 143 inches (3.63 in); Diaphragm Length 144 inches (3.66 in); Load Time (min:sec): 7:12

| Load in Pounds (lbf) | Deflection in Inches-Indicator Number | | | | Net Shear Deflection |
|---|---|---|---|---|---|
| | 1 | 2 | 3 | 4 | |
| 0 | 0.000 | 0.000 | 0.000 | 0.000 | 0.000 |
| 232 | 0.000 | 0.003 | 0.038 | 0.016 | 0.019 |
| 473 | 0.001 | 0.006 | 0.075 | 0.023 | 0.046 |
| 714 | 0.002 | 0.008 | 0.111 | 0.028 | 0.073 |
| 982 | 0.004 | 0.011 | 0.146 | 0.032 | 0.098 |
| 1231 | 0.005 | 0.015 | 0.174 | 0.036 | 0.118 |
| 1499 | 0.007 | 0.018 | 0.196 | 0.041 | 0.131 |
| 1749 | 0.008 | 0.022 | 0.217 | 0.045 | 0.144 |
| 1981 | 0.009 | 0.025 | 0.234 | 0.050 | 0.151 |
| 2249 | 0.012 | 0.032 | 0.261 | 0.057 | 0.162 |
| 2481 | 0.012 | 0.035 | 0.277 | 0.059 | 0.171 |
| 2668 | 0.013 | 0.040 | 0.294 | 0.064 | 0.177 |
| 2998 | 0.015 | 0.047 | 0.313 | 0.066 | 0.184 |
| 3230 | 0.016 | 0.051 | 0.328 | 0.070 | 0.191 |
| 3498 | 0.017 | 0.056 | 0.348 | 0.070 | 0.205 |
| 3730 | 0.019 | 0.061 | 0.377 | 0.073 | 0.224 |

TABLE 41-continued

Test No. 4: Specimen: ¾" (1.91 cm) SCP (T&G) fastened to
16 ga. Steel Joists, set 24" (61 cm) o.c., with #8 × 1-⅝"
(4.1 cm) screws spaced 6" (15.2 cm) o.c. around the perimeter
and 12" o.c. (30.5 cm) in the field.
Test Conditions: 70° F. (21.1° C.); 41% Relative Humidity
Diaphragm Width 143 inches (3.63 in); Diaphragm Length
144 inches (3.66 in); Load Time (min:sec): 7:12

| Load in Pounds (lbf) | Deflection in Inches-Indicator Number | | | | Net Shear Deflection |
|---|---|---|---|---|---|
| | 1 | 2 | 3 | 4 | |
| 3980 | 0.020 | 0.067 | 0.411 | 0.076 | 0.248 |
| 4229 | 0.022 | 0.072 | 0.444 | 0.079 | 0.272 |
| 4488 | 0.023 | 0.079 | 0.498 | 0.083 | 0.314 |
| 4747 | 0.023 | 0.083 | 0.553 | 0.085 | 0.364 |
| 4997 | 0.025 | 0.088 | 0.617 | 0.088 | 0.417 |
| 5238 | 0.026 | 0.092 | 0.672 | 0.090 | 0.465 |
| 5470 | 0.028 | 0.095 | 0.751 | 0.093 | 0.536 |
| 5720 | 0.029 | 0.100 | 0.858 | 0.097 | 0.633 |
| 5987 | 0.030 | 0.104 | 0.900 | 0.098 | 0.669 |
| 3,355 (P) | 0.017 | 0.053 | 0.337 | 0.070 | 0.198 |

Ultimate Load (Pn) = 8,387 lbs. (3804 kg); P = 0.4(Pn) = 3,355 lbs. (1522 kg) Shear Strength (Sn) = 699.0 lbs lineal foot 1040 kg/m); Shear Stiffness (G') = 202,407 plf (301,181 kg/m)
Failure: All butt-joints separated with SCP failure around the fasteners.
Fastener shear and rotation into the SCP along both T&G edges (typically limited to the fasteners at or within 12" (30.5 cm) of the T&G). SCP failure around fasteners on Row #2 at the compression side. SCP corner breaks along both T&G edges.

TABLE 42

Test No. 5: Specimen: ¾" (1.9 cm) SCP (T&G) fastened to
16 ga. Steel Joists, set 24" (0.61 m) o.c., with #8 ×
1-⅝" (4.1 cm) screws spaced 6" (15.2 cm) o.c. around
the perimeter and 12" (0.305 m) o.c. in the field.
Test Conditions: 70° F. (21.1° C.); 38% Relative Humidity
Diaphragm Width 143 inches (3.63 m); Diaphragm Length
144 inches (3.66 m); Load Time (min:sec): 5:28

| Load in Pounds (lbf) | Deflection in Inches-Indicator Number | | | | Net Shear Deflection |
|---|---|---|---|---|---|
| | 1 | 2 | 3 | 4 | |
| 0 | 0.000 | 0.000 | 0.000 | 0.000 | 0.000 |
| 249 | 0.001 | 0.001 | 0.016 | 0.001 | 0.013 |
| 490 | 0.001 | 0.001 | 0.039 | 0.005 | 0.032 |
| 748 | 0.002 | 0.000 | 0.067 | 0.011 | 0.054 |
| 980 | 0.004 | 0.000 | 0.093 | 0.016 | 0.073 |
| 1239 | 0.006 | 0.000 | 0.127 | 0.023 | 0.098 |
| 1471 | 0.008 | 0.000 | 0.148 | 0.028 | 0.113 |
| 1721 | 0.009 | 0.000 | 0.173 | 0.032 | 0.134 |
| 1997 | 0.011 | −0.001 | 0.212 | 0.036 | 0.167 |
| 2184 | 0.012 | −0.001 | 0.250 | 0.042 | 0.199 |
| 2416 | 0.012 | −0.001 | 0.278 | 0.044 | 0.225 |
| 2746 | 0.014 | −0.001 | 0.336 | 0.047 | 0.276 |
| 2961 | 0.015 | −0.002 | 0.378 | 0.049 | 0.316 |
| 3237 | 0.015 | −0.002 | 0.420 | 0.052 | 0.354 |
| 3487 | 0.017 | −0.002 | 0.463 | 0.056 | 0.391 |
| 3746 | 0.019 | −0.003 | 0.508 | 0.060 | 0.433 |
| 3978 | 0.021 | −0.004 | 0.553 | 0.063 | 0.474 |
| 4209 | 0.022 | −0.004 | 0.587 | 0.065 | 0.505 |
| 4477 | 0.022 | −0.004 | 0.640 | 0.070 | 0.553 |
| 4718 | 0.025 | −0.005 | 0.681 | 0.072 | 0.590 |
| 4977 | 0.026 | 0.001 | 0.767 | 0.078 | 0.622 |
| 5209 | 0.027 | 0.007 | 0.850 | 0.081 | 0.736 |
| 5494 | 0.029 | 0.012 | 0.928 | 0.084 | 0.804 |
| 2,615 (P) | 0.013 | −0.001 | 0.314 | 0.045 | 0.256 |

Ultimate Load (Pn) = 6,538 lbs (2966 kg).; P = 0.4(Pn) = 2,615 lbs. (1186 kg) Shear Strength (Sn) = 544.8 plf (811 kg/m); Shear Stiffness (G') = 121,526 plf (180,830 kg/m)
Failure: Row #3 butt-joint separation with SCP failure around the fasteners.
Fastener shear and rotation into the SCP along Row #1-2 T&G edge (typically limited to the fasteners at or within 12" (30.5 cm) of the T&G). SCP failure around fasteners on Row #2 at the compression side. SCP corner breaks along both T&G edges.

TABLE 43

Test No. 6: Specimen: ¾" (1.9 cm) SCP (T&G) fastened to
16 ga. Steel Joists, set 24" (0.61 m) o.c., with #8 × 1-⅝"
(4.1 cm) screws spaced 6" (15.2 cm) o.c. around the
perimeter and 12" (0.305 m) o.c. in the field.
Test Conditions: 70° F. (21.1° C.); 38% Relative Humidity
Diaphragm Width 143 inches (3.63 m); Diaphragm Length
144 inches (3.66 m); Load Time (min:sec): 6:02

| Load in Pounds (lbf) | Deflection in Inches-Indicator Number | | | | Net Shear Deflection |
|---|---|---|---|---|---|
| | 1 | 2 | 3 | 4 | |
| 0 | 0.000 | 0.000 | 0.000 | 0.000 | 0.000 |
| 223 | 0.001 | 0.003 | 0.023 | 0.011 | 0.008 |
| 482 | 0.003 | 0.011 | 0.066 | 0.011 | 0.042 |
| 749 | 0.003 | 0.020 | 0.099 | 0.011 | 0.066 |
| 999 | 0.004 | 0.027 | 0.135 | 0.011 | 0.094 |
| 1240 | 0.005 | 0.037 | 0.180 | 0.011 | 0.128 |
| 1499 | 0.007 | 0.045 | 0.220 | 0.011 | 0.157 |
| 1749 | 0.009 | 0.053 | 0.263 | 0.011 | 0.190 |
| 1972 | 0.010 | 0.062 | 0.298 | 0.011 | 0.216 |
| 2239 | 0.012 | 0.072 | 0.339 | 0.011 | 0.244 |
| 2480 | 0.013 | 0.079 | 0.375 | 0.011 | 0.272 |
| 2748 | 0.014 | 0.087 | 0.411 | 0.011 | 0.299 |
| 2988 | 0.017 | 0.096 | 0.453 | 0.011 | 0.330 |
| 3203 | 0.018 | 0.103 | 0.489 | 0.011 | 0.357 |
| 3479 | 0.019 | 0.111 | 0.532 | 0.011 | 0.391 |
| 3702 | 0.021 | 0.117 | 0.563 | 0.011 | 0.414 |
| 3997 | 0.022 | 0.125 | 0.608 | 0.011 | 0.451 |
| 4237 | 0.023 | 0.131 | 0.650 | 0.011 | 0.486 |
| 4469 | 0.025 | 0.135 | 0.685 | 0.011 | 0.514 |
| 4701 | 0.026 | 0.142 | 0.724 | 0.011 | 0.546 |
| 4951 | 0.027 | 0.148 | 0.778 | 0.011 | 0.593 |
| 5236 | 0.029 | 0.154 | 0.837 | 0.011 | 0.643 |
| 5477 | 0.030 | 0.158 | 0.885 | 0.011 | 0.687 |
| 5700 | 0.032 | 0.164 | 0.941 | 0.011 | 0.735 |
| 5941 | 0.033 | 0.167 | 0.985 | 0.011 | 0.775 |
| 3,415 (P) | 0.019 | 0.108 | 0.515 | 0.011 | 0.378 |

Ultimate Load (Pn) = 8,537 lbs (3872 kg).; P = 0.4(Pn) = 3,415 lbs. (1549 kg)
Shear Strength (Sn) = 711.4 plf (1059 kg/m); Shear Stiffness (G') = 107,653 plf (160188 kg/m)
Failure: Row #2&3 butt-joint separation with SCP failure around the fasteners.
Fastener shear and rotation into the SCP along Row #2-3 T&G edge 8' in from compression and the remaining 4' shifted along Row #1-2 T&G edge (typically limited to the fasteners at or within 12" (30.5 cm) of the T&G). SCP failure around fasteners on Row #2&3 at the compression side. SCP corner breaks along both T&G edges.

TABLE 44

Test No. 7: ¾" (1.9 cm) SCP (T&G) fastened to 16 ga.
Steel Joists, set 24" (0.61 m) o.c., with #8 × 1-⅝" (4.1 cm)
screws spaced 4" (10.2 cm) o.c. around the perimeter and
12" (0.305 m) o.c. in the field.
Test Conditions: 69° F. (20.6° C.); 44% Relative Humidity
Diaphragm Width 143 inches (3.63 m); Diaphragm Length
144 inches (3.66 m); Load Time (min:sec): 10:14

| Load in Pounds (lbf) | Deflection in Inches-Indicator Number | | | | Net Shear Deflection |
|---|---|---|---|---|---|
| | 1 | 2 | 3 | 4 | |
| 0 | 0.000 | 0.000 | 0.000 | 0.000 | 0.000 |
| 446 | 0.000 | 0.004 | 0.028 | 0.010 | 0.014 |
| 981 | −0.001 | 0.008 | 0.049 | 0.016 | 0.026 |
| 1472 | −0.002 | 0.014 | 0.068 | 0.019 | 0.037 |
| 1980 | −0.004 | 0.019 | 0.086 | 0.022 | 0.049 |
| 2480 | −0.002 | 0.025 | 0.103 | 0.024 | 0.057 |
| 2962 | −0.001 | 0.028 | 0.119 | 0.027 | 0.065 |
| 3497 | 0.001 | 0.032 | 0.169 | 0.030 | 0.106 |
| 3987 | 0.004 | 0.040 | 0.178 | 0.035 | 0.100 |
| 4478 | 0.005 | 0.046 | 0.196 | 0.040 | 0.105 |
| 4978 | 0.008 | 0.052 | 0.226 | 0.046 | 0.119 |
| 5459 | 0.011 | 0.060 | 0.259 | 0.052 | 0.137 |
| 5995 | 0.013 | 0.066 | 0.276 | 0.056 | 0.141 |
| 6414 | 0.015 | 0.071 | 0.314 | 0.063 | 0.165 |
| 6985 | 0.018 | 0.077 | 0.322 | 0.070 | 0.158 |
| 7466 | 0.021 | 0.083 | 0.342 | 0.076 | 0.163 |

TABLE 44-continued

Test No. 7: ¾" (1.9 cm) SCP (T&G) fastened to 16 ga. Steel Joists, set 24" (0.61 m) o.c., with #8 × 1-⅝" (4.1 cm) screws spaced 4" (10.2 cm) o.c. around the perimeter and 12" (0.305 m) o.c. in the field.
Test Conditions: 69° F. (20.6° C.); 44% Relative Humidity
Diaphragm Width 143 inches (3.63 m); Diaphragm Length 144 inches (3.66 m); Load Time (min:sec): 10:14

| Load in Pounds | Deflection in Inches-Indicator Number | | | | Net Shear |
|---|---|---|---|---|---|
| (lbf) | 1 | 2 | 3 | 4 | Deflection |
| 7957 | 0.025 | 0.088 | 0.383 | 0.085 | 0.187 |
| 8483 | 0.027 | 0.094 | 0.403 | 0.093 | 0.190 |
| 8956 | 0.040 | 0.109 | 0.506 | 0.172 | 0.186 |
| 9483 | 0.044 | 0.113 | 0.544 | 0.185 | 0.204 |
| 9920 | 0.053 | 0.158 | 0.597 | 0.185 | 0.203 |
| 10401 | 0.057 | 0.160 | 0.623 | 0.185 | 0.224 |
| 10919 | 0.063 | 0.164 | 0.702 | 0.185 | 0.293 |
| 11400 | 0.068 | 0.169 | 0.734 | 0.185 | 0.314 |
| 11909 | 0.073 | 0.172 | 0.774 | 0.185 | 0.346 |
| 9,053 (P) | 0.040 | 0.109 | 0.507 | 0.174 | 0.185 |

Ultimate Load (Pn) = 22,631 lbs (10265 kg).;
P = 0.4(Pn) = 9,053 lbs. (4106 kg);
Shear Strength (Sn) = 1,886.0 plf (2806 kg/m);
Shear Stiffness (G') = 581,716 plf 865593 kg/m)
Failure: Adhesion failure to SCP along bearing side of the floor (Row #3) near the tension side. Fastener pull-through along the same edge. The tension joist was severely deformed around the Simpson Strong-Tie connection.

TABLE 45

Test No. 8: Specimen: ¾" (1.9 cm) SCP (T&G) fastened to 16 ga. Steel Joists, set 24" (0.61 m) o.c., with #8 × 1-⅝" (4.1 cm) screws spaced 6" (15.2 cm) o.c. around the perimeter and 12" (0.305 m) o.c. in the field.
Test Conditions: 73° F. (22.8° C.); 45% Relative Humidity
Diaphragm Width 143 inches (3.63 m); Diaphragm Length 144 inches (3.66 m); Load Time (min:sec): 5:45

| Load in Pounds | Deflection in Inches-Indicator Number | | | | Net Shear |
|---|---|---|---|---|---|
| lbf | 1 | 2 | 3 | 4 | Deflection |
| 0 | 0.000 | 0.000 | 0.000 | 0.000 | 0.000 |
| 421 | 0.010 | 0.013 | 0.074 | 0.008 | 0.043 |
| 992 | 0.016 | 0.025 | 0.118 | 0.020 | 0.057 |
| 1483 | 0.024 | 0.040 | 0.156 | 0.024 | 0.068 |
| 1964 | 0.029 | 0.054 | 0.179 | 0.023 | 0.073 |
| 2446 | 0.033 | 0.064 | 0.192 | 0.021 | 0.074 |
| 2892 | 0.038 | 0.074 | 0.205 | 0.020 | 0.073 |
| 3463 | 0.042 | 0.085 | 0.220 | 0.019 | 0.074 |
| 3963 | 0.046 | 0.092 | 0.232 | 0.019 | 0.075 |
| 4444 | 0.050 | 0.101 | 0.251 | 0.019 | 0.080 |
| 4962 | 0.056 | 0.111 | 0.269 | 0.020 | 0.083 |
| 5452 | 0.061 | 0.121 | 0.286 | 0.020 | 0.085 |
| 5916 | 0.067 | 0.130 | 0.310 | 0.021 | 0.093 |
| 6478 | 0.072 | 0.141 | 0.333 | 0.021 | 0.099 |
| 6978 | 0.076 | 0.149 | 0.350 | 0.021 | 0.104 |
| 7477 | 0.081 | 0.157 | 0.371 | 0.021 | 0.113 |
| 7879 | 0.085 | 0.164 | 0.386 | 0.021 | 0.116 |
| 8485 | 0.091 | 0.173 | 0.411 | 0.021 | 0.126 |
| 8985 | 0.095 | 0.181 | 0.429 | 0.021 | 0.133 |
| 9413 | 0.100 | 0.191 | 0.447 | 0.021 | 0.135 |
| 9913 | 0.106 | 0.201 | 0.472 | 0.021 | 0.146 |
| 10394 | 0.111 | 0.210 | 0.496 | 0.021 | 0.155 |
| 10903 | 0.115 | 0.218 | 0.519 | 0.021 | 0.166 |
| 11438 | 0.119 | 0.227 | 0.544 | 0.021 | 0.178 |
| 11946 | 0.126 | 0.242 | 0.578 | 0.021 | 0.191 |
| 7,740 (P) | 0.084 | 0.161 | 0.380 | 0.021 | 0.115 |

Ultimate Load (Pn) = 19,351 lbs (8777 kg).; P = 0.4(Pn) = 7,740 lbs. (3511 kg); Shear Strength (Sn) = 1,612.5 plf (2399 kg/m); Shear Stiffness (G') = 803,716 plf (1,195900 kg/m)
Failure: Adhesion failure to SCP along bearing side of the floor (Row #3) near the tension side. Fastener pull-through and SCP failure around the fasteners along the same edge. The tension joist was severely deformed around the Simpson Strong-Tie connection.

TABLE 46

Test No. 9: Specimen: ¾" (1.9 cm) SCP (T&G) fastened to 16 ga. Steel Joists, set 24" (0.61 m) o.c., with #8 × 1-⅝" (4.1 cm) screws spaced 12" (0.305 m) o.c. around the perimeter and 12" (0.305 m) o.c. in the field.
Test Conditions: 73° F. (22.8° C.); 45% Relative Humidity
Diaphragm Width 143 inches (3.63 m); Diaphragm Length 144 inches (3.66 m); Load Time (min:sec): 4:19

| Load in Pounds | Deflection in Inches-Indicator Number | | | | Net Shear |
|---|---|---|---|---|---|
| lbf | 1 | 2 | 3 | 4 | Deflection |
| 0 | 0.000 | 0.000 | 0.000 | 0.000 | 0.000 |
| 170 | 0.002 | 0.002 | 0.035 | −0.002 | 0.033 |
| 455 | 0.007 | 0.006 | 0.068 | −0.008 | 0.063 |
| 750 | 0.013 | 0.009 | 0.084 | −0.011 | 0.074 |
| 901 | 0.017 | 0.015 | 0.097 | −0.013 | 0.078 |
| 1214 | 0.024 | 0.022 | 0.116 | −0.017 | 0.086 |
| 1499 | 0.035 | 0.032 | 0.145 | −0.021 | 0.099 |
| 1722 | 0.041 | 0.038 | 0.166 | −0.023 | 0.109 |
| 1972 | 0.051 | 0.050 | 0.191 | −0.024 | 0.115 |
| 2159 | 0.056 | 0.056 | 0.209 | −0.023 | 0.119 |
| 2471 | 0.065 | 0.065 | 0.231 | −0.020 | 0.121 |
| 2685 | 0.071 | 0.071 | 0.248 | −0.018 | 0.123 |
| 2953 | 0.077 | 0.081 | 0.267 | −0.014 | 0.124 |
| 3212 | 0.081 | 0.087 | 0.286 | −0.010 | 0.129 |
| 3497 | 0.084 | 0.093 | 0.298 | −0.008 | 0.130 |
| 3729 | 0.088 | 0.099 | 0.317 | −0.003 | 0.134 |
| 3934 | 0.090 | 0.105 | 0.330 | 0.000 | 0.135 |
| 4113 | 0.091 | 0.109 | 0.337 | 0.002 | 0.136 |
| 4416 | 0.095 | 0.117 | 0.361 | 0.009 | 0.142 |
| 4719 | 0.098 | 0.124 | 0.380 | 0.014 | 0.145 |
| 4925 | 0.100 | 0.129 | 0.393 | 0.018 | 0.147 |
| 5246 | 0.103 | 0.136 | 0.409 | 0.024 | 0.147 |
| 5495 | 0.106 | 0.145 | 0.425 | 0.031 | 0.145 |
| 5736 | 0.110 | 0.150 | 0.460 | 0.036 | 0.165 |
| 5995 | 0.113 | 0.156 | 0.477 | 0.041 | 0.169 |
| 6,369 (P) | 0.116 | 0.161 | 0.496 | 0.045 | 0.176 |

Ultimate Load (Pn) = 15,924 lbs. (7223 kg); P = 0.4(Pn) = 6,369 lbs. (2889 kg)
Shear Strength (Sn) = 1,327.0 plf (1975 kg/m); Shear Stiffness (G') = 432,444 plf (643,477 kg/m)
Failure: Adhesion failure to SCP along bearing side of the floor (Row #3). Fastener pull-through and shear along the same edge. The tension joist was severely deformed around the Simpson Strong-Tie connection. The fastener shear near the compression side of the floor.

TABLE 47

Test No. 10 Specimen: ¾" (1.9 cm) SCP (T&G) fastened to 16 ga. Steel Joists, set 24" (0.61 m) o.c., with #8 × 1-⅝" (4.1 cm) screws spaced 6" (15.2 cm) o.c. around the perimeter and 12" (0.305 m) o.c. in the field.
Test Conditions: 68° F. (20° C.); 43% Relative Humidity
Diaphragm Width 143 inches (3.63 m); Diaphragm Length 144 inches (3.66 m); Load Time (min:sec): 6:43

| Load in Pounds | Deflection in Inches-Indicator Number | | | | Net Shear |
|---|---|---|---|---|---|
| lbf | 1 | 2 | 3 | 4 | Deflection |
| 0 | 0.000 | 0.000 | 0.000 | 0.000 | 0.000 |
| 223 | 0.008 | −0.003 | 0.058 | 0.061 | −0.008 |
| 491 | 0.010 | 0.003 | 0.109 | 0.081 | 0.016 |
| 723 | 0.011 | 0.007 | 0.152 | 0.083 | 0.051 |
| 973 | 0.012 | 0.013 | 0.219 | 0.087 | 0.107 |
| 1222 | 0.013 | 0.017 | 0.276 | 0.089 | 0.158 |
| 1481 | 0.015 | 0.023 | 0.335 | 0.092 | 0.206 |
| 1722 | 0.016 | 0.027 | 0.392 | 0.095 | 0.255 |
| 1990 | 0.018 | 0.034 | 0.455 | 0.098 | 0.307 |
| 2231 | 0.020 | 0.039 | 0.498 | 0.100 | 0.340 |
| 2489 | 0.021 | 0.046 | 0.552 | 0.104 | 0.383 |
| 2713 | 0.023 | 0.052 | 0.593 | 0.106 | 0.413 |
| 2971 | 0.025 | 0.058 | 0.634 | 0.110 | 0.442 |
| 3203 | 0.026 | 0.063 | 0.669 | 0.112 | 0.470 |
| 3498 | 0.027 | 0.069 | 0.709 | 0.115 | 0.498 |
| 3748 | 0.028 | 0.074 | 0.737 | 0.117 | 0.519 |

TABLE 47-continued

Test No. 10 Specimen: ¾" (1.9 cm) SCP (T&G) fastened to
16 ga. Steel Joists, set 24" (0.61 m) o.c., with #8 ×
1-⅝" (4.1 cm) screws spaced 6" (15.2 cm) o.c. around the
perimeter and 12" (0.305 m) o.c. in the field.
Test Conditions: 68° F. (20° C.); 43% Relative Humidity
Diaphragm Width 143 inches (3.63 m); Diaphragm Length
144 inches (3.66 m); Load Time (min:sec): 6:43

| Load in Pounds | Deflection in Inches-Indicator Number | | | | Net Shear |
|---|---|---|---|---|---|
| lbf | 1 | 2 | 3 | 4 | Deflection |
| 3971 | 0.030 | 0.079 | 0.769 | 0.120 | 0.542 |
| 4238 | 0.031 | 0.086 | 0.810 | 0.124 | 0.569 |
| 4444 | 0.033 | 0.091 | 0.836 | 0.127 | 0.586 |
| 4658 | 0.033 | 0.095 | 0.860 | 0.130 | 0.602 |
| 4988 | 0.035 | 0.102 | 0.903 | 0.134 | 0.633 |
| 5220 | 0.035 | 0.107 | 0.933 | 0.137 | 0.655 |
| 5479 | 0.038 | 0.112 | 0.971 | 0.139 | 0.683 |
| 5711 | 0.038 | 0.116 | 1.018 | 0.143 | 0.722 |
| 5960 | 0.039 | 0.121 | 1.156 | 0.146 | 0.850 |
| 2,534 (P) | 0.021 | 0.046 | .552 | 0.104 | 0.383 |

Ultimate Load (Pn) = 6,335 lbs. (2874 kg); P = 0.4(Pn) = 2,534 lbs. (1149 kg); Shear Strength (Sn) = 527.9 plf (786 kg/m); Shear Stiffness (G') = 78,880 plf (pounds per linear foot) (117400 kg/m)
Failure: Fastener shear and rotation into the Plywood along Row #1-2 T&G edge, on row #2 side 6 feet in from compression and the remaining 6 feet (3.66 m) shifted on Row #1 T&G edge (typically limited to the fasteners at or within 12" (30.5 cm) of the T&G). Plywood failure around fasteners on Row #2 at the compression side.

Example 9

TABLE 48 shows testing that relates to the racking shear performance of cold formed steel framed walls using FORTACRETE brand structural cementitious panels as sheathing. The results included both ASTM E 72 wall racking tests, and AISI TS-07 Cantilever Tests. The results include blocked and unblocked specimens, with nominal shear strengths ranging from approximately 450 lbs/ft (670 kg/m) to over 1100 lbs/ft (1640 kg/m).

Using a factor of safety of 2.5 yields an allowable shear strength ranging from approximately 180 lbs/ft (268 kg/m) to over 450 lbs/ft (670 kg/m), depending on the panel orientation and if blocking is used.

Significantly higher shear loads, double or more, could be obtained by tightening the fastener spacing, adding more blocking, or putting FORTACRETE brand structural cementitious panels on both sides of the studs. (All these tests were done with FORTACRETE brand structural cementitious panels on one side only). The results demonstrate that the cold formed steel wall, sheathed with FORTACRETE brand structural cementitious panels, provides sufficient shear capacity to contribute significantly to resisting lateral and/or shear loads in residential and light commercial buildings.

The ASTM E 72 tests were conducted on walls oriented with the wall in a vertical position. The wall studs were 3⅝" (9.2 cm) deep, with flanges 1⅝" (4.12 cm) long made of 16 gauge steel. Standard runner track was used with a 3⅝" (9.2 cm) width, 1¼" (3.2 cm) legs, and a gauge of 16. Wall studs were fastened to the runner track with a single screw at each flange, top and bottom. Full 4'×8' (122×244 cm) sheets of FORTACRETE Structural Panels were used for each test specimen. All specimens were sheathed on only one side of the framing. The walls were braced per Steel Stud Manufacturers Association (SSMA) requirements for cold-rolled lateral bracing, as referenced in the Steel Stud Manufacturers Association Product Technical Information, Copyright 2001, page 50. 1½ inch (3.8 cm) clip angles were used to attach the bridging to the studs. Screws used to attach the sheathing to the framing were #8-18×1⅝" (4.1 cm) long winged driller Grabber Super Drive Lox Drive screws Item # CH58158JBWG2. Screws used to attach wall studs to track and bridging were self drilling pan head # 8 sheet metal screws.

The AISI TS-07 tests were conducted on test assemblies placed in a horizontal position. The cantilever load applied to them makes the result applicable to walls in a vertical position as well. AISI TS-07 test assembly details are described above in Example 8.

For the data of TABLE 48, all test panels were on 3⅝ inch (9.2 cm) 16 gauge steel stud framing at 24 inches (61 cm) apart on center (o.c.). All test panels were attached to the framing by fasteners spaced apart 6 inches (15 cm) o.c. about the perimeter and 12 inches (30 cm) o.c. in the field. "FS" stands for factor of safety and an FS of 2.5 was used for this particular set of tests. TABLE 48 expresses parameters with the following units: Ultimate load—pounds, Shear Strength—pounds per lineal foot, Stiffness—pounds per lineal foot.

TABLE 48

Shear Wall Testing ANSI TS-07 Cantilever Test Method and ASTM E-72 Racking Load Test Method

| Test | Sample | Ultimate Load | Shear Strength | FS = 2.5 | Stiffness | Notes |
|---|---|---|---|---|---|---|
| ASTM E-72 | A | 5109 | 639 | 255 | 135,039 | Panels installed horizontally with no blocking |
| | B | 5087 | 636 | 254 | 132,390 | |
| | C | 5579 | 698 | 280 | 132,697 | |
| | Average | 5258 | 658 | 263 | 133,375 | |
| AISI TS-07 | 2A | 5630 | 476 | 190 | 115,206 | No blocking |
| | 2B | 5884 | 497 | 199 | 127,212 | |
| | 2C | 7007 | 592 | 237 | 103,277 | |
| | Average | 6174 | 522 | 209 | 115,232 | |
| ANSI TS-07 | 2D | 5729 | 484 | 194 | 285,468 | No blocking |
| | 2E | 5520 | 466 | 186 | 309,243 | |
| | 2F | 4949 | 418 | 167 | 492,320 | |
| | Average | 5399 | 456 | 182 | 362,344 | |
| AISI TS-07 | 10 | 6335 | 527 | 211 | 78,880 | No blocking |
| | Average | 6335 | 527 | 211 | 78,880 | |
| ASTM E-72 | D | 8550 | 1069 | 428 | 239,773 | Panels installed Vertically |
| | Average | 8550 | 1069 | 428 | 239,773 | |
| AISI TS-07 | 21A | 13222 | 1117 | 447 | 420,508 | 4" wide 16 gauge flat strap blocking |
| | 21B | 13811 | 1167 | 467 | 494,469 | |
| | 21C | 13731 | 1160 | 464 | 348,323 | |
| | Average | 13588 | 1148 | 459 | 421,100 | |

Notes:
Samples A, B, C and D were 8 foot long by 8 foot wide × ¾ inch thick FORTACRETE brand structural cementitious panels.
Samples 2A, 2B, 2D, 2E, 2F, 21A, 21B and 21C were 12 foot long by 12 foot wide × ¾ inch thick FORTACRETE brand structural cementitious panels.
Sample 10 was a 12 foot long by 12 foot wide × 3/4 inch thick plywood panel.

While a particular embodiment of the system employing a horizontal diaphragm of fiber-reinforced structural cement panels on a metal frame has been shown and described, it will be appreciated by those skilled in the art that changes and modifications may be made thereto without departing from the invention in its broader aspects and as set forth in the following claims.

What is claimed is:

1. A foundation system for a commercial or residential building, the foundation system comprising:
   at least one vertical exterior wall comprising a first exterior vertical wall diaphragm, a metal frame, and a second interior vertical wall diaphragm; the metal frame comprising vertical metal studs, the first diaphragm and the second diaphragm at supported on opposed sides of the metal frame studs, ground in contact with at least a below ground level portion of an outer surface of the at least one exterior wall diaphragm, footings in contact with ground below the footings, the at least one exterior vertical wall diaphragm comprising at least one reinforced, lightweight, dimensionally stable structural cementitious panel, and the frame further comprising upper horizontal members above the studs and lower horizontal members below the studs, the studs attached to the upper and lower horizontal members, the lower horizontal members resting on the footings, the studs attached to the upper and lower horizontal members, the upper and lower horizontal members selected from at least one member of the group consisting of a C-joist and a plate;

metal bugle head screw fasteners with winged drillers located above the point and below the threads of the screw and protrude laterally from a shaft of the screw for fastening the structural cementitious panel to the metal studs;

the second interior vertical wall diaphragm of the exterior wall comprising a layer of Type X fire rated gypsum wallboard, the Type X fire rated gypsum wallboard is only attached to the one side of the vertical metal studs opposed to the structural cementitious panel, the structural cementitious panel having a density of 65 to 90 pounds per cubic foot and capable of resisting shear loads when fastened to framing and comprising a continuous phase resulting from the curing of an aqueous mixture comprising, on a dry basis, 49 to 68 weight % a blend of reactive powders, 23 to 36.1 weight % lightweight filler particles comprising uniformly distributed ceramic microspheres, and 5 to 20 weight % alkali-resistant glass fibers, and optional superplasticizer, the continuous phase being uniformly reinforced with the glass fibers, wherein the glass fibers are monofilaments having a diameter of about 5 to 25 microns (micrometers) and a length of about 0.25 to 3 inches (6.3 to 76 mm), the lightweight filler particles having a particle specific gravity of from 0.02 to 1.00 and an average particle size of about 10 to 500 microns (micrometers), wherein the reactive powders comprise, on a dry basis,
45 to 75 wt. % calcium sulfate alpha-hemihydrate,
20 to 40 wt. % Portland cement,
0.2 to 3.5 wt. % lime, and
5 to 25 wt. % of an active pozzolan comprising silica fume, wherein the structural cementitious panel has a flexural strength, after being soaked in water for 48 hours, of at least 1650 psi (11.4 MPa) as measured by the ASTM C 947-03 test, effective 2003, and wherein the foundation system meets the 2 hour fire resistance test rating under ASTM E-119, effective 2003, wherein the structural cementitious panel has a thickness of about ½ to 1½ inches.

2. The system of claim 1, wherein the aqueous mixture consists of water and, on a dry basis:
58 to 68 wt. % reactive powders,
23 to 35 weight % lightweight filler particles consisting of uniformly distributed ceramic microspheres, and
6 to 17 weight % alkali-resistant glass fibers, and
optional superplasticizer;
the reactive powders consisting of, on a dry basis,
65 to 75 wt. % calcium sulfate alpha hemihydrate,
20 to 25 wt. % hydraulic cement,
0.75 to 1.25 wt. % lime, and
10 to 15 wt. % of silica fume active pozzolan;
wherein the ceramic microspheres have at least one feature selected from the group consisting of a mean particle size from 50 to 250 microns and falling within a particle size range of 10 to 500 microns,
wherein the vertical metal studs are 16 gauge steel, and
wherein the metal bugle head screw fasteners with winged drillers are winged self drilling screws.

3. The system of claim 2, wherein the ceramic microspheres have a mean particle size from 50 to 250 microns and/or fall within a particle size range of 10 to 500 microns, wherein the aqueous mixture contains, on a dry basis, 7 to 12 wt. % of the glass fibers.

4. The system of claim 1, wherein the aqueous mixture comprises water and, on a dry basis,
54 to 58 wt. % reactive powders,
6 to 17 wt. % glass fibers, and
33.8 to 36.1 wt. % of at least one said lightweight filler,
said lightweight filler comprising ceramic microspheres and up to 1.0 wt. % at least one member selected from the group consisting of glass microspheres, fly ash cenospheres or perlite, and
optional superplasticizer.

5. The system of claim 1, wherein the lower horizontal member comprises the plate.

6. The system of claim 1, further comprising a floor comprising poured cement.

7. The system of claim 1, wherein the cementitious panel comprises a core comprising the continuous phase resulting from the curing of the aqueous mixture, and
wherein the panel further comprises at least one outer layer, each said outer layer comprising a second continuous phase resulting from the curing of a second aqueous mixture of reactive powders comprising water and, on a dry basis,
49 to 68 weight % a second blend of reactive powders,
23 to 36.1 weight % uniformly distributed lightweight filler particles comprising
uniformly distributed ceramic microspheres, and
5 to 20 weight % uniformly distributed alkali-resistant glass fibers, and
optional superplasticizer,
the second blend of reactive powders comprising, on a dry basis,
45 to 75 wt. % calcium sulfate alpha hemihydrate,
20 to 40 wt. % Portland cement,
0.2 to 3.5 wt. % lime, and
5 to 25 wt. % of an active pozzolan comprising silica fume,
the second continuous phase being uniformly reinforced with the alkali-resistant glass fibers, and the lightweight filler particles comprising ceramic microspheres having a particle specific gravity of from 0.02 to 1.00 and an average particle size of about 10 to 500 microns (micrometers),
at least one outer layer having reduced phase density relative to the core, wherein each outer layer has a thickness of about 1/32 to 4/32 inches (0.8 to 3.2 mm).

8. The system of claim 1, wherein the first exterior wall diaphragm has an first layer and an second layer, each said layer comprising the cementitious panels, and wherein seams of the first layer are offset relative to seams of the second layer.

9. The system of claim 1, wherein the metal frame for the walls comprises staggered studs, wherein a first plurality of said metal studs is attached to the first diaphragm and separated from the second diaphragm, and a second plurality of the metal studs is attached to the second diaphragm and separated from the first diaphragm, wherein the metal studs of the first and second pluralities of studs comprise C-studs, each C-stud comprising a back wall and side walls to define a C-configuration, the back walls of the C-studs of the first plurality respectively opposed to the back walls of the C-studs of the second plurality, a spacer between and in contact with the back wall of each C-stud of the first plurality and the back wall of the respective C-stud of the second plurality to space the back wall of the C-stud of the first plurality and the back wall of the respective C-stud of the second plurality a distance of 0.25 to 0.5 inches, the first exterior diaphragm separated from the opposed second interior diaphragm a distance of 6 to 12 inches.

10. The system of claim 1, further comprising a horizontal exterior foundation floor diaphragm comprising a horizontal plurality of the structural cementitious panels, the foundation floor diaphragm has a horizontal design shear capacity of 300 to 1000 pounds per linear foot, the metal floor frame comprising horizontal metal floor joists, a lower surface of the horizontal plurality of said structural cementitious panels supported on, the metal floor frame, the horizontal plurality of said structural cementitious panels attached to the metal floor frame, the horizontal exterior foundation floor diaphragm lower surface directly facing ground underneath the metal floor frame;

the horizontal metal floor joists being attached to the vertical metal studs at a level spaced a distance above the footer;

metal bugle head screw fasteners with winged drillers fasten the cementitious panel to the horizontal metal floor joists;

wherein the winged drillers are located above the point and below the threads of the screw and protrude laterally from a shaft of the screw.

11. The system of claim 1,
wherein the reactive powders consist of
65 to 75 wt. % calcium sulfate hemihydrate,
20 to 25 wt. % Portland cement,
0.75 to 1.25 wt. % lime, and
10 to 15 wt. % of silica fume active pozzolan.

12. The system of claim 1, wherein the system will not absorb more than 0.7 pounds per square foot of water when exposed to water in a test wherein a 2 inch (5.08 cm) head of water is maintained over ¾ inch (19 mm) thick panels fastened on a 10 foot by 20 foot (3.05 by 6.1 m) metal frame for a period of 24 hours.

13. The system of claim 1, wherein a 10 foot wide by 20 foot long by ¾ inch thick (3.05 by 6.1 m by 1.9 cm) diaphragm of the panels attached to a 10 foot by 20 foot (3.05 by 6.1 m) said metal frame will not swell more than 5% when exposed to a 2 inch (5.08 cm) head of water maintained over the SCP panels fastened on the metal frame for a period of 24 hours.

14. The system of claim 1, wherein the cementitious panel comprises:
a core layer comprising the continuous phase resulting from the curing of the aqueous mixture, the continuous phase comprising 5 to 17 wt % glass fibers, on a dry basis, and
at least one outer layer of respectively a second continuous phase resulting from the curing of an aqueous mixture comprising, on a dry basis,
49 to 68 weight % second blend of reactive powder,
23 to 36.1 weight percent lightweight filler comprising ceramic microspheres, and
7 to 20 weight % alkali-resistant glass fibers, and
optional superplasticizer;
the continuous phase being reinforced with the glass fibers and containing the lightweight filler particles,
the second the lightweight filler particles having a particle specific gravity of from 0.02 to 1.00 and an average particle size of about 10 to 500 microns (micrometers) on each opposed side of the inner layer,
wherein the at least one outer layer has a higher percentage of glass fibers than the core layer.

15. The system of claim 1, wherein a first edge of a first said cementitious panel has a first groove and a second edge of a second said panel has a second groove, wherein said first groove and said second groove are opposed and adjacent and contain a backer rod made of closed cell polymer material for waterproofing the panel.

16. The system of claim 1, wherein a first said framing member and a second said framing member are adjacent and a gasket made of closed cell polymer material is located between opposed sides of said first framing member and said second framing member to form a seal for waterproofing the cementitious panels of the foundation system.

17. The system of claim 1, further comprising a floor comprising said cementitious panels placed on a corrugated metal sheet.

18. The system of claim 1, comprising
straight wall sections comprising said structural cementitious panels attached to metal studs by metal bugle head screw fasteners with winged drillers and a corner piece attached to metal studs by metal bugle head screw fasteners with winged drillers,
the corner piece comprising legs of the reinforced, lightweight, dimensionally stable cementitious panel which define an L-shaped cross-section, having a first surface relief in outer surfaces which join at an outer corner of the corner piece and a second surface relief in inner surfaces which join at an inner corner of the corner piece, the two panels of the corner piece are joined using a fiber glass polymer cement embedded into the surface relief to create a single corner panel that has a finished panel thickness of the same dimension as the panels of the straight wall sections.

19. The system of claim 1, wherein the at least one exterior wall is at least one said vertical wall, further comprising a layer of waterproofing material, selected from the group consisting of a liquid applied bitumen-type water barrier and an adhered waterproof polymer sheet, on an exterior surface of at least one said vertical wall.

20. A foundation floor system for a commercial or residential building, the foundation floor system comprising:
below ground level footings,
ground below the footings,
the footings in contact with the ground below the footings;
a foundation floor diaphragm comprising at least one exterior horizontal reinforced, lightweight, dimensionally stable structural cementitious panel, wherein the floor diaphragm has a horizontal design shear capacity of 300 to 1000 pounds per linear foot,
a horizontal metal frame having opposed upper and lower surfaces, the at least one structural cementitious panel supported on the upper surface of the metal frame, the lower surface of the metal frame opposed to ground below the metal frame;

at least a portion of the at least one structural cementitious panel being below ground level; and the metal frame comprising a perimeter of horizontal metal rim joists resting on the footings and horizontal metal floor joists attached to the metal rim joists;

a lower surface of the at least one structural cementitious panel supported on, the metal floor frame, the at least one structural cementitious panel attached to the metal floor frame, the horizontal exterior foundation floor diaphragm having a lower surface directly facing ground underneath the metal floor frame; and metal bugle head screw fasteners with winged drillers for fastening the at least one structural cementitious panel to the horizontal metal floor joists;

wherein the winged drillers are located above the point and below the threads of the screw and protrude laterally from a shaft of the screw, the at least one structural cementitious panel having a density of 65 to 90 pounds per cubic foot and capable of resisting shear loads when fastened to framing and comprising a continuous phase resulting from the curing of an aqueous mixture comprising water and, on a dry basis, 49 to 68 weight % a blend of reactive powders, 23 to 36.1 weight % lightweight filler particles comprising uniformly distributed ceramic microspheres, and 5 to 20 weight % alkali-resistant glass fibers, and optional superplasticizer, the continuous phase being uniformly reinforced with the glass fibers, wherein the glass fibers are monofilaments having a diameter of about 5 to 25 microns (micrometers) and a length of about 0.25 to 3 inches (6.3 to 76 mm), the lightweight filler particles having a particle specific gravity of from 0.02 to 1.00 and an average particle size of about 10 to 500 microns (micrometers), wherein the blend of reactive powders comprise, on a dry basis, 45 to 75 wt. % calcium sulfate alpha-hemihydrate, 20 to 40 wt. % Portland cement, 0.2 to 3.5 wt. % lime, and 5 to 25 wt. % of an active pozzolan comprising silica fume, wherein the panel has a flexural strength, after being soaked in water for 48 hours, of at least 1650 psi (11.4 MPa) as measured by the ASTM C 947-03 test, effective 2003, and wherein the structural cementitious panel has a thickness of about ½ to 1½ inches.

21. The foundation system of claim 20, wherein a ¾ inch (19 mm) thick said panel when tested according to ASTM 661-88, effective 1988 (reapproved 1997), and APA S-1, effective Aug. 12, 1980, test methods over a span of 16 inches (406.4 mm) on centers, has an ultimate load capacity greater than 550 lb (250 kg), under static loading, an ultimate load capacity greater than 400 lb (182 kg) under impact loading, and a deflection of less than 0.078 inches (1.98 mm) under both static and impact loading with a 200 lb. (90.9 kg) load, wherein the system meets the 2 hour fire resistance test rating under ASTM E-119, effective 2003.

22. The foundation system of claim 20, further comprising a median footing, wherein each floor joist has opposed first and second ends, the first end of the floor joist is attached to the metal rim joist and the second end of each floor joist rests on the median footing, wherein each floor joist second end is attached to the second end of another said floor joist.

23. The foundation system of claim 20, wherein the horizontal shear diaphragm load carrying capacity of the system will not be lessened by more than 25% when exposed to water in a test wherein a 2 inch head of water is maintained over ¾ inch thick SCP panels fastened on a 10 foot by 20 foot metal frame for a period of 24 hours.

24. The foundation system of claim 20, wherein the continuous phase results from the curing of the aqueous mixture consisting of on a dry basis:

58 to 68 wt. % reactive powders, 23 to 35 weight % lightweight filler particles consisting of uniformly distributed ceramic microspheres, 6 to 17 weight % alkali-resistant glass fibers, and optional superplasticizer;

the reactive powders consisting of, on a dry basis, 65 to 75 wt. % calcium sulfate alpha hemihydrate, 20 to 25 wt. % hydraulic cement, 0.75 to 1.25 wt. % lime, and 10 to 15 wt. % of silica fume active pozzolan;

wherein the ceramic microspheres have at least one feature selected from the group consisting of a mean particle size from 50 to 250 microns and falling within a particle size range of 10 to 500 microns, wherein the vertical metal studs are 16 gauge steel, and wherein the metal bugle head screw fasteners with winged drillers are winged self drilling screws.

25. The foundation system of claim 20, wherein the footers comprise a plurality of separated footers and a horizontal header is placed on top of the plurality of separated footers and the rim joist rests on the horizontal header.

26. The foundation system of claim 20, wherein the aqueous mixture comprises water and, on a dry basis, 54 to 58 wt. % reactive powders, 6 to 17 wt. % glass fibers, and 33.8 to 36.1 wt. % of at least one said lightweight filler, said lightweight filler comprising ceramic microspheres and up to 1.0 wt. % at least one member selected from the group consisting of glass microspheres, fly ash cenospheres or perlite, and optional superplasticizer.

27. An SCP panel having a density of 65 to 90 pounds per cubic foot and capable of resisting shear loads when fastened to framing and comprising a continuous phase resulting from the curing of an aqueous mixture comprising, on a dry basis, 49 to 68 weight % reactive powders, 23 to 36.1 weight % lightweight filler comprising uniformly distributed ceramic microspheres, and 5 to 20 weight % alkali-resistant glass fibers, the continuous phase being uniformly reinforced with the glass fibers, the lightweight filler particles having a particle specific gravity of from 0.02 to 1.00 and an average particle size of about 10 to 500 microns (micrometers), wherein the reactive powders comprise, on a dry basis, 45 to 75 wt. % calcium sulfate alpha-hemihydrates, 20 to 40 wt. % Portland cement, 0.2 to 3.5 wt. % lime, and 5 to 25 wt. % of an active pozzolan comprising silica fume, wherein said panel has first and second opposed edges, said first edge has a first groove and said second edge has a second groove, wherein a backer rod is located in at least one member of the group consisting of said first groove and said second groove and is made of closed cell polymer material for waterproofing the panel, wherein the panel has a flexural strength, after being soaked in water for 48 hours, of at least 1650 psi (11.4 MPa) as measured by the ASTM C 947-03 test, effective 2003.

28. A method of building a foundation system to give a building a foundation having fire resistance which meets the 2 hour fire resistance test rating under ASTM E-119, effective 2003, comprising the step of:

assembling an exterior vertical wall by attaching reinforced, lightweight, dimensionally stable structural cementitious panels to vertical metal studs of a metal frame to form a first vertical shear diaphragm;

locating at least a portion of the first vertical shear diaphragm below ground level and in contact with ground;

providing below ground level footings, the footings in contact with the ground below the footings;

the frame further comprising upper horizontal members above the studs and lower horizontal members below the studs, the studs attached to the upper and lower horizontal members, the lower horizontal members resting on the footings, the studs attached to the upper and lower horizontal members, the upper and lower horizontal members selected from at least one member of the group consisting of a C-joist and a plate;

wherein the cementitious panel is attached to the metal framing member by screws with winged drillers located above the point and below the threads of the screw and which protrude laterally from a shaft of the screw; to provide the vertical wall as a shear load bearing system, further comprising a layer of Type X fire rated gypsum wallboard attached to a side of the vertical metal studs opposed to said first shear diaphragm to form a second diaphragm, and wherein the Type X fire rated gypsum wallboard is only on the one side of the vertical metal studs of the frame opposed to the structural cementitious panel, the cementitious panel having a density of 65 to 90 pounds per cubic foot and capable of resisting shear loads when fastened to framing and comprising a continuous phase resulting from the curing of an aqueous mixture comprising, on a dry basis, 49 to 68 weight % reactive powder, 23 to 36.1 weight % lightweight filler particles comprising ceramic microspheres having a particle density of 0.50 to 0.80 g/ml and an average particle size of about 10 to 500 microns (micrometers), and 5 to 20 weight % glass fibers comprising alkali-resistant glass fibers, the continuous phase being reinforced with the glass fibers, wherein the glass fibers are monofilaments having a diameter of about 5 to 25 microns (micrometers) and a length of about 0.25 to 3 inches (6.3 to 76 mm), and optional superplasticizer, wherein the reactive powders comprise, on a dry basis,
45 to 75 wt. % calcium sulfate alpha-hemihydrate,
20 to 40 wt. % Portland cement,
0.2 to 3.5 wt. % lime, and
5 to 25 wt. % of an active pozzolan comprising silica fume, wherein the structural cementitious panel has a flexural strength, after being soaked in water for 48 hours, of at least 1650 psi (11.4 MPa) as measured by the ASTM C 947-03 test, effective 2003, and wherein the foundation system meets the 2 hour fire resistance test rating under ASTM E-119, effective 2003, wherein the structural cementitious panel has a thickness of about ½ to 1½ inches.

29. The method of claim 28, wherein the aqueous mixture consists of water and, on a dry basis:

58 to 68 wt. % reactive powders,
23 to 35 weight % lightweight filler particles consisting of uniformly distributed ceramic microspheres, and
6 to 17 weight % alkali-resistant glass fibers, and
optional superplasticizer;
the reactive powders consisting of, on a dry basis,
65 to 75 wt. % calcium sulfate alpha hemihydrate,
20 to 25 wt. % hydraulic cement,
0.75 to 1.25 wt. % lime, and
10 to 15 wt. % of silica fume active pozzolan;

wherein the ceramic microspheres have at least one feature selected from the group consisting of a mean particle size from 50 to 250 microns and falling within a particle size range of 10 to 500 microns, wherein the vertical metal studs are 16 gauge steel, and wherein the metal bugle head screw fasteners with winged drillers are winged self drilling screws.

30. The method of claim 28, further comprising building at least one horizontal exterior floor member, wherein the at least one panel is part of a floor diaphragm of the foundation and the foundation floor diaphragm has a horizontal design shear capacity of 300 to 1000 pounds per linear foot, supporting the at least one floor member on a metal floor frame, placing at least a portion of the at least one floor member being below ground level, the at least one floor member comprising said reinforced, lightweight, dimensionally stable structural cementitious panel; and the metal floor frame comprising horizontal metal floor joists, attaching the horizontal metal floor joists to the vertical metal studs at a level spaced a distance above the footer;

fastening the panel to the horizontal metal floor joists with metal bugle head screw fasteners with winged drillers;

wherein the winged drillers are located above the point and below the threads of the screw and protrude laterally from a shaft of the screw.

31. A method of building a foundation floor system, comprising the steps of:

attaching reinforced, lightweight, dimensionally stable structural cementitious panels to horizontal metal framing elements to assemble a floor diaphragm of the foundation, the foundation floor diaphragm has a horizontal design shear capacity of 300 to 1000 pounds per linear foot, the dimensionally stable structural cementitious panels supported on the metal frame, placing footings below ground level, contacting the footings with the ground directly below the footings;

at least a portion of the floor diaphragm being below ground level; and the metal frame comprising a perimeter of horizontal metal rim joists resting on the footings and horizontal metal floor joists attached to the metal rim joists;

metal bugle head screw fasteners with winged drillers for fastening the panel to the horizontal metal floor joists; wherein the winged drillers are located above the point and below the threads of the screw and protrude laterally from a shaft of the screw, the panel having a density of 65 to 90 pounds per cubic foot and capable of resisting shear loads when fastened to framing and comprising a continuous phase resulting from the curing of an aqueous mixture comprising, on a dry basis, 49 to 68 wt % a blend of reactive powder, 23 to 36.1 wt % lightweight filler, the lightweight filler particles having a particle specific gravity of from 0.02 to 1.00 and an average particle size of about 10 to 500 microns (micrometers), and 5 to 20 wt % glass fibers, the continuous phase being reinforced with the glass fibers; and optional superplasticizer;

wherein the blend of reactive powders comprise, on a dry basis, 45 to 75 wt. % calcium sulfate alpha-hemihydrates, 20 to 40 wt. % Portland cement, 0.2 to 3.5 wt. % lime, and 5 to 25 wt. % of an active pozzolan comprising silica fume, wherein the panel has a flexural strength, after being soaked in water for 48 hours, of at least 1650 psi (11.4 MPa) as measured by the ASTM C 947-03 test, effective 2003, and wherein the structural cementitious panel has a thickness of about ½ to 1½ inches;

wherein the foundation floor diaphragm has a horizontal design shear capacity of 300-1000 pounds per linear foot according to ASTM E-455.

32. The method of claim 31, wherein the aqueous mixture consists of water and, on a dry basis:

58 to 68 wt. % reactive powders, 23 to 35 weight % lightweight filler particles consisting of uniformly distributed ceramic microspheres, and 6 to 17 weight % alkali-resistant glass fibers, and optional superplasticizer;

the reactive powders consisting of, on a dry basis, 65 to 75 wt. % calcium sulfate alpha hemihydrate, 20 to 25 wt. % hydraulic cement, 0.75 to 1.25 wt. % lime, and 10 to 15 wt. % of silica fume active pozzolan;

wherein the ceramic microspheres have at least one feature selected from the group consisting of a mean particle size from 50 to 250 microns and falling within a particle size range of 10 to 500 microns, wherein the vertical metal studs are 16 gauge steel, and wherein the metal bugle head screw fasteners with winged drillers are winged self drilling screws.

* * * * *

UNITED STATES PATENT AND TRADEMARK OFFICE
CERTIFICATE OF CORRECTION

PATENT NO. : 7,870,698 B2  Page 1 of 1
APPLICATION NO. : 11/763548
DATED : January 18, 2011
INVENTOR(S) : Timothy D. Tonyan et al.

It is certified that error appears in the above-identified patent and that said Letters Patent is hereby corrected as shown below:

Title Page, correct Item (75) Inventors, to read:

--(75) Inventors:   Timothy D. Tonyan, Wheaton, IL (US);
James M. Ullett, McHenry, IL (US);
James E. Reicherte, Cary, IL (US);
Ashish Dubey, Grayslake, IL (US)--.

Signed and Sealed this
Twenty-first Day of April, 2015

Michelle K. Lee
*Director of the United States Patent and Trademark Office*